US012540169B2

(12) United States Patent
Gershovich et al.

(10) Patent No.: US 12,540,169 B2
(45) Date of Patent: Feb. 3, 2026

(54) ALTERNATIVE INTRACELLULAR SIGNALLING DOMAIN OF A CHIMERIC ANTIGEN RECEPTOR

(71) Applicant: Limited Liability Company «ANABION» (LLC «ANABION»), Saint Petersburg (RU)

(72) Inventors: Pavel Mikhailovich Gershovich, St.Petersburg (RU); Aleksandr Vladimirovich Karabelskii, g. Gatchina (RU); Andrei Borisovich Ulitin, g. Pushchino (RU); Dmitrij Aleksandrovich Madera, Moscow (RU); Roman Alexeevich Ivanov, Moscow (RU); Dmitry Valentinovich Morozov, St.Petersburg (RU)

( * ) Notice: Subject to any disclaimer, the term of this patent is extended or adjusted under 35 U.S.C. 154(b) by 1176 days.

(21) Appl. No.: 17/438,398

(22) PCT Filed: Mar. 13, 2020

(86) PCT No.: PCT/RU2020/000136
§ 371 (c)(1),
(2) Date: Sep. 10, 2021

(87) PCT Pub. No.: WO2020/185121
PCT Pub. Date: Sep. 17, 2020

(65) Prior Publication Data
US 2022/0127329 A1 Apr. 28, 2022

(30) Foreign Application Priority Data
Mar. 13, 2019 (RU) ................................. 2019107136

(51) Int. Cl.
*C07K 14/705* (2006.01)
*A61K 35/17* (2025.01)
*A61K 39/00* (2006.01)
*C07K 14/725* (2006.01)
*C07K 16/28* (2006.01)
*C07K 16/30* (2006.01)
*C12N 5/0783* (2010.01)

(52) U.S. Cl.
CPC ........ *C07K 14/70557* (2013.01); *A61K 35/17* (2013.01); *A61K 39/0011* (2013.01); *A61K 39/001112* (2018.08); *C07K 14/7051* (2013.01); *C07K 14/70517* (2013.01); *C07K 14/70521* (2013.01); *C07K 14/70578* (2013.01); *C07K 16/2803* (2013.01); *C07K 16/30* (2013.01); *C12N 5/0636* (2013.01); *A61K 2039/5154* (2013.01); *A61K 2039/5156* (2013.01); *A61K 2039/5158* (2013.01); *C07K 2317/55* (2013.01); *C07K 2317/622* (2013.01); *C07K 2319/02* (2013.01); *C07K 2319/03* (2013.01)

(58) Field of Classification Search
CPC ...................... C07K 14/70557; C07K 14/7051
See application file for complete search history.

(56) References Cited

U.S. PATENT DOCUMENTS

| 5,350,674 A | 9/1994 | Boenisch et al. |
| 5,585,362 A | 12/1996 | Wilson et al. |
| 2013/0266551 A1* | 10/2013 | Campana ........... C07K 16/2896 435/328 |
| 2016/0145348 A1* | 5/2016 | Stephan ............... A61K 9/1271 514/44 R |
| 2016/0280798 A1* | 9/2016 | Orentas .................. A61K 40/31 |
| 2017/0107286 A1 | 4/2017 | Kochenderfer |

FOREIGN PATENT DOCUMENTS

| WO | 2015/187528 A1 | 12/2015 |
| WO | 2017/112741 A1 | 6/2017 |
| WO | 2018/132506 A1 | 7/2018 |

OTHER PUBLICATIONS

Love PE, Hayes SM. ITAM-mediated signaling by the T-cell antigen receptor. Cold Spring Harb Perspect Biol. Jun. 2010;2(6):a002485. doi: 10.1101/cshperspect.a002485. Epub Apr. 28, 2010. PMID: 20516133; PMCID: PMC2869518. (Year: 2010).*
Fuke H, Ohno M. Role of poly (A) tail as an identity element for mRNA nuclear export. Nucleic Acids Res. Feb. 2008;36(3):1037-49. doi: 10.1093/nar/gkm1120. Epub Dec. 20, 2007. PMID: 18096623; PMCID: PMC2241894. (Year: 2007).*
Corresponding Japanese application No. 2021-555415 extended European search report dated Mar. 12, 2024.
Corresponding Japanese application No. 2021-555415 extended European search report dated Nov. 6, 2024.
International application No. PCT/RU2020/000136 International Search Report dated Sep. 10, 2020.
International application No. PCT/RU2020/000136 Translation of the International Search Report dated Sep. 10, 2020.
International application No. PCT/RU2020/000136 Written Opinion of the International Searching Authority dated Sep. 10, 2020.
Bridgeman J. S. et al. CD3ζ-based chimeric antigen receptors mediate T cell activation via cis- and trans-signalling mechanisms: implications for optimization of receptor structure for adoptive cell therapy. Clinical & Experimental Immunology,2014, vol. 175, No. 2, p. 258-267, doi: 10.1111/cei.12216.

(Continued)

*Primary Examiner* — Fereydoun G Sajjadi
*Assistant Examiner* — Qinhua Gu
(74) *Attorney, Agent, or Firm* — Anglehart et al.

(57) ABSTRACT

The present invention relates to the field of biotechnology, specifically to an isolated alternative intracellular signalling domain of a chimeric antigen receptor (CAR) and to a chimeric antigen receptor (CAR) comprising, said signalling domain. The invention also relates to a nucleic acid coding an alternative intracellular signalling domain of a chimeric antigen receptor, and to a nucleic acid coding a chimeric antigen receptor with the above-mentioned signalling domain, to an expression vector, to a delivery vector, and also a genetically modified cell which comprises the above-mentioned chimeric antigen receptor, and to a method for producing said cell.

22 Claims, 29 Drawing Sheets

Specification includes a Sequence Listing.

(56) References Cited

OTHER PUBLICATIONS

Bertoni Alessandra et al. Integrins in T Cell Physiology. International Journal of Molecular Sciences, 2018, vol. 19, No. 2, p. 485 (1-17), doi: 10.3390/ijms19020485.

Sadelain M. et al., The promise and potential pitfalls of chimeric antigen receptors. Current Opinion in Immunology. vol. 21, Issue 2, Apr. 2009, pp. 215-223.

Maher J, et al., Human T-lymphocyte cytotoxicity and proliferation directed by a single chimeric TCRζ/CD28 receptor. Nature Biotechnology vol. 20, pp. 70-75 (2002).

Imai C, et al. Chimeric receptors with 4-1BB signaling capacity provoke potent cytotoxicity against acute lymphoblastic leukemia. Leukemia vol. 18, pp. 676-684 (2004).

Kowolik CM, et al., CD28 Costimulation Provided through a CD19-Specific Chimeric Antigen Receptor Enhances In vivo Persistence and Antitumor Efficacy of Adoptively Transferred T Cells. Cancer Research. Nov. 2006. vol. 66, Issue 22. p 10995-11004.

Sadelain M, et al. The Basic Principles of Chimeric Antigen Receptor Design. Cancer Discovery. Apr. 2013. vol. 3, Issue 4. p. 388-398.

Davila ML, et al., Efficacy and Toxicity Management of 19-28z CAR T Cell Therapy in B Cell Acute Lymphoblastic Leukemia. Science Translational Medicine. Feb. 19, 2014.vol. 6, Issue 224. p. 224ra25.

Maude SL. Et al., Chimeric Antigen Receptor T Cells for Sustained Remissions in Leukemia. Oct. 16, 2014. N Engl J Med 2014; 371: p. 1507-1517.

Zhang T, et al., Efficiency of CD19 chimeric antigen receptor-modified T cells for treatment of B cell malignancies in phase I clinical trials: a meta-analysis. Oncotarget. Oct. 20, 2015; 6(32): 33961-33971.

Van der Stegen SJC, et al., The pharmacology of second-generation chimeric antigen receptors. Nature Reviews Drug Discovery vol. 14, pp. 499-509 (2015).

Yamasaki S, et al., The kinase, SH3, and SH2 domains of Lck play critical roles in T-cell activation after ZAP-70 membrane localization. Molecular and Cellular Biology, Dec. 1996, p. 7151-7160.

Visco C, et al., Activation of Zap-70 Tyrosine Kinase Due to a Structural Rearrangement Induced by Tyrosine Phosphorylation and/or ITAM Binding. Biochemistry. Mar. 14, 2000;39(10), 2784-2791.

Katz ZB, et al., A cycle of Zap70 kinase activation and release from the TCR amplifies and disperses antigenic stimuli. Nature Immunology vol. 18, pp. 86-95 (2017).

Deindl S, et al., Stability of an autoinhibitory interface in the structure of the tyrosine kinase ZAP-70 impacts T cell receptor response. PNAS Dec. 8, 2009 106 (49) 20699-20704.

Szabo M, et al., Fine-tuning of proximal TCR signaling by ZAP-70 tyrosine residues in Jurkat cells. International Immunology, vol. 24, Issue 2, Feb. 2012, pp. 79-87.

Liu XY, et al., Identification of a functionally important sequence in the cytoplasmic tail of integrin beta 3 by using cell-permeable peptide analogs. PNAS Oct. 15, 1996 93 (21) 11819-11824.

Durrant TN, et al., Integrin αIIbβ3 outside-in signaling. Blood. Oct. 5, 2017;130(14):1607-1619.

Bird et al., Single-Chain Antigen-Binding Proteins (1988). Science. Oct. 21, 1988. vol. 242, Issue 4877. pp. 423-426.

Huston et al., Protein engineering of antibody binding sites: recovery of specific activity in an anti-digoxin single-chain Fv analogue produced in *Escherichia coli*. (1988) PNAS Aug. 1, 1988 85 (16) 5879-5883.

Burks et al., In vitro scanning saturation mutagenesis of an antibody binding pocket. PNAS Jan. 21, 1997 94 (2) 412-417.

Wu et al., Stepwise in vitro affinity maturation of Vitaxin, an αvβ3-specific humanized mAb. PNAS May 26, 1998 95 (11) 6037-6042.

Sofia Mumtazet al., Design of liposomes for circumventing the reticuloendothelial cells. Glycobiology, Nov. 1, 1991, 1 (5):505-510.

Corresponding European application No. 20770459.4 extended European search report dated Mar. 21, 2023.

Woodside Darren G et al., The N-terminal SH2 Domains of Syk and ZAP-70 Mediate Phosphotyrosine-independent Binding to Integrin β Cytoplasmic Domains. Journal of Biological Chemistry, American Society for Biochemistry and Molecular Biology, US, vol. 227, No. 42, Jan. 1, 2022, pp. 39401-39408.

* cited by examiner

ALTERNATIVE INTRACELLULAR SIGNALLING DOMAIN OF A CHIMERIC ANTIGEN RECEPTOR

FIELD OF INVENTION

The present invention relates to the field of biotechnology, specifically to an isolated alternative intracellular signaling domain of a chimeric antigen receptor (CAR) and to a chimeric antigen receptor (CAR) comprising said signaling domain. The invention also relates to a nucleic acid encoding an alternative intracellular signaling domain of a chimeric antigen receptor, and to a nucleic acid encoding a chimeric antigen receptor with the above-mentioned signaling domain, to an expression vector, to a delivery vector, as well as to a genetically modified cell which comprises the above-mentioned chimeric antigen receptor, and to a method for producing said cell.

BACKGROUND OF INVENTION

Chimeric antigen receptors (CARs) are recombinant protein molecules that target cell surface antigens (Sadelain M, Brentjens R, Rivière I. The promise and potential pitfalls of chimeric antigen receptors. Curr Opin Immunol [Internet]. 2009; 21:215-23.

CAR generally consists of several domains that perform specific functions. The extracellular domain of the CAR is typically represented by a single-chain variable fragment of an antibody specific for a tumor antigen (single-chain variable fragment, scFv) and provides target recognition independently of the major histocompatibility complex molecules. Intracellular domains are responsible for signal transduction when binding to a target antigen and effective activation of CAR-expressing immune cells. The intracellular portion of the receptor consists of a CD3ζ-chain (CD3-zeta chain) and additional costimulatory domains typically derived from natural proteins CD28 and 4-1BB. It was found that the presence of a costimulatory domain in the CAR receptor significantly increases the activity of CAR-expressing immune cells in comparison with that of CARs, the intracellular portion of which consists only of the CD3 ζ-chain (CD3-zeta chain) (Maher J, Brentjens R J, Gunset G, Rivière I, Sadelain M. Human T-lymphocyte cytotoxicity and proliferation directed by a single chimeric TCRζ CD28 receptor. Nat Biotechnol [Internet]. 2002; 20:70-5. Imai C, Mihara K, Andreansky M, Nicholson I C, Pui C-H, Geiger T L, et al. Chimeric receptors with 4-1BB signaling capacity provoke potent cytotoxicity against acute lymphoblastic leukemia. Leukemia [Internet]. 2004; 18:676-84. Available from: Kowolik C M, Topp M S, Gonzalez S, Pfeiffer T, Olivares S, Gonzalez N, et al. CD28 costimulation provided through a CD19-specific chimeric antigen receptor enhances in vivo persistence and antitumor efficacy of adoptively transferred T cells. Cancer Res. 2006; 66:10995-1004).

Both variations of the CAR receptor design showed pronounced antitumor activity and high efficacy in preclinical and clinical studies (Sadelain M, Brentjens R, Rivi?re I. The Basic Principles of Chimeric Antigen Receptor Design. Cancer Discov [Internet]. 2013; 3:388-98. It has been shown that there are significant differences between CAR receptors containing the costimulatory domain of CD28 and 4-1BB.

The results of clinical studies obtained in the treatment of lymphoproliferative diseases using CD19-specific CAR-T therapy showed that 4-1BB-CD3ζ (CD3-zeta chain) CAR provides a longer persistence of CAR-T lymphocytes in vivo (more than 6 months for most patients) and its use enables a less pronounced cytokine release syndrome as compared to that when using CD28-CD3ζ CAR (CD3-zeta chain) (Davila M L, Riviere I, Wang X, Bartido S, Park J, Curran K, et al. Efficacy and Toxicity Management of 19-28z CAR T Cell Therapy in B Cell Acute Lymphoblastic Leukemia. Sci Transl Med [Internet]. 2014; 6:224ra25-224ra25.

Maude S L. Chimeric Antigen Receptor T Cells for Sustained Remissions in Leukemia. N Engl J Med [Internet]. 2014; 371:1507-17. Available from: Zhang T, Cao L, Xie J, Shi N, Zhang Z, Luo Z, et al. Efficiency of CD19 chimeric antigen receptor-modified T cells for treatment of B cell malignancies in phase I clinical trials: a meta-analysis. Oncotarget [Internet]. 2015; 6:33961-71.

According to cumulative data, CD28-CD3ζ (CD3-zeta chain) CAR receptor can provide earlier activation of CAR-T lymphocytes, as compared to that when using 4-1BB-CD3ζ (CD3-zeta chain) CAR, due to the release of cytokines and a pronounced cytotoxic effect (van der Stegen S J C, Hamieh M, Sadelain M. The pharmacology of second-generation chimeric antigen receptors. Nat Rev Drug Discov [Internet]. Nature Publishing Group; 2015; 14:499-509., which fact, in turn, may provide increased therapeutic efficacy.

A moderate decrease in the level of activation of CAR-T cells and the release of cytokines, while maintaining the rate of transduction of the activation signal through the CD28-based costimulatory domain without loss of cytotoxic activity, enables significantly improved therapeutic properties of adoptive immunotherapy of oncological diseases based on CD28-CD3ζ (CD3-zeta chains) CAR receptor-expressing immune cells.

The interaction of natural T-cell receptors (TCRs) with components of the major histocompatibility complex (MHC) further results in binding of the CD8 co-receptor and activation of the LcK tyrosine kinase. The latter phosphorylates peptide sequences, i.e. immunoreceptor tyrosine-based activation motifs (ITAMs), within CD3ζ (CD3-zeta chain). The Zap-70 kinase interacts with doubly-phosphorylated ITAMs within CD3ζ (CD3-zeta chain) via Src-homology 2 (SH2) domains. Binding of Zap-70 to CD3ζ (CD3-zeta chain) results in a change in the conformation of the kinase and autophosphorylation thereof at amino acid residues Y315 and Y319. Lck-mediated phosphorylation and trans-autophosphorylation induce the activation of Zap70. Following activation, Zap70 stops interacting with CD3ζ (CD3-zeta chain) and associates with the plasma membrane, where, in turn, it phosphorylates other substrate proteins, including LAT20 [Yamasaki S, Takamatsu M, Iwashima M, The kinase, SH3, and SH2 domains of Lck play critical roles in T-cell activation after ZAP-70 membrane localization, Mol Cell Biol. 1996 December; 16(12):7151-60; Visco C, Magistrelli G, Bosotti R, Perego R, Rusconi L, Toma S, Zamai M, Acuto O, Isacchi A, Activation of Zap-70 tyrosine kinase due to a structural rearrangement induced by tyrosine phosphorylation and/or ITAM binding, Biochemistry. 2000 Mar. 14; 39(10):2784-91.].

Thus, Zap-70 is a critical member in the CAR signaling pathway; therefore, the regulation of the activity of this kinase may be one of the approaches for regulating the level of activation of CAR-Ts, which directly affects viability, persistence, and functional activity thereof. Numerous studies have revealed the main structural and functional elements of the ZAP70-ITAM interaction system [Katz Z B, Novotná L, Blount E, Lillemeier B F, A cycle of Zap70 kinase activation and release from the TCR amplifies and disperses antigenic stimuli, Nat Immunol. 2017 January; 18(1):86-95; Deindl S, Kadlecek T A, Cao X, Kuriyan J, Weiss A, Stability of an autoinhibitory interface in the structure of the tyrosine kinase ZAP-70 impacts T cell receptor response, Proc Natl Acad Sci USA. 2009 Dec. 8; 106(49):20699-704; Szabo M, Czompoly T, Kvell K, Talaber G, Bartis D, Nemeth P, Berki T, Boldizsar F, Fine-tuning of proximal TCR signaling by ZAP-70 tyrosine residues in Jurkat cells, Int Immunol. 2012 February; 24(2): 79-87.].

Regulation of CAR activity seems to be possible through the creation of hybrid peptide substrates for Zap-70, which substrates differ from natural ITAMs within the CAR activation domain based on CD3ζ (CD3-zeta chain). One of the candidates are fragments of the amino acid sequence In integrin beta 3 (cytoplasmic tail of integrin beta 3; ITGB3) [Liu X Y, Timmons S, Lin Y Z, Hawiger J., Identification of a functionally important sequence in the cytoplasmic tail of integrin beta 3 by using cell-permeable peptide analogs, Proc Natl Acad Sci USA. 1996 Oct. 15; 93(21):11819-24; Durrant T N, van den Bosch M T, Hers I, Integrin αIIbβ3 outside-in signaling, Blood. 2017 Oct. 5; 130(14):1607-1619].

The authors of the invention have unexpectedly found that the hybrid signaling domains of the cytoplasmic portion of the chimeric antigen receptor (CAR), which include, instead of one or two immunoreceptor tyrosine-based activation motifs (ITAMs) selected from ITAM1, ITAM2 and ITAM3 within the intracellular signaling domain of the chimeric antigen receptor (CAR) (e.g., CD3ζ (CD3-zeta)), peptide fragments of the amino acid sequence of integrin beta 3 (ITGB3), stimulate CAR-dependent activation of genetically modified immune cells expressing the corresponding genetic construct.

BRIEF DESCRIPTION OF INVENTION

In one aspect, the present invention relates to an isolated alternative intracellular signaling domain of a chimeric antigen receptor (CAR), wherein one or two immunoreceptor tyrosine-based activation motifs (ITAMs) selected from ITAM1, ITAM2, and ITAM3 are substituted with a fragment of the amino acid sequence of integrin beta 3 (ITGB3).

In some embodiments, the alternative intracellular signaling domain of the chimeric antigen receptor (CAR) is characterized in that one immunoreceptor tyrosine-based activation motif (ITAM) selected from ITAM1, ITAM2 and ITAM3 is substituted with a fragment of the amino acid sequence of integrin beta 3 (ITGB3).

In some embodiments, the alternative intracellular signaling domain of the chimeric antigen receptor (CAR) is characterized in that ITAM1 is substituted with ITGB3.

In some embodiments, the alternative intracellular signaling domain of the chimeric antigen receptor (CAR) is characterized in that ITAM2 is substituted with ITGB3.

In some embodiments, the alternative intracellular signaling domain of the chimeric antigen receptor (CAR) is characterized in that ITAM3 is substituted with ITGB3.

In some embodiments, the alternative intracellular signaling domain of the chimeric antigen receptor (CAR) is characterized in that two immunoreceptor tyrosine-based activation motifs (ITAMs) selected from ITAM1, ITAM2 and ITAM3 are substituted with a fragment of the amino acid sequence of integrin beta 3 (ITGB3).

In some embodiments, the alternative intracellular signaling domain of the chimeric antigen receptor (CAR) is characterized in that ITAM2 and ITAM3 are substituted with two ITGB3.

In some embodiments, the alternative intracellular signaling domain of the chimeric antigen receptor (CAR) is characterized in that ITAM1 and ITAM3 are substituted with two ITGB3.

In some embodiments, the alternative intracellular signaling domain of the chimeric antigen receptor (CAR) is characterized in that ITAM1 and ITAM2 are substituted with two ITGB3.

In some embodiments, the alternative intracellular signaling domain of the chimeric antigen receptor (CAR) is characterized in that ITAM1 has the amino acid sequence (SEQ ID NO: 1)
APAYKQGQNQLYNELNLGRREEYDVLDKR.

In some embodiments, the alternative intracellular signaling domain of the chimeric antigen receptor (CAR) is characterized in that ITAM2 has the amino acid sequence (SEQ ID NO: 2)
PRRKNPQEGLYNELQKDKMAEAYSEIGM.

In some embodiments, the alternative intracellular signaling domain of the chimeric antigen receptor (CAR) is characterized in that ITAM3 has the amino acid sequence (SEQ ID NO: 3)
ERRRGKGHDGLYQGLSTATKDTYDALHMQ.

In some embodiments, the alternative intracellular signaling domain of the chimeric antigen receptor (CAR) is characterized in that ITGB3 has the amino acid sequence DTANNPLYKEATSTFTNITYRGT SEQ ID NO:4) or the amino acid sequence DTANNPLYKEATSTFTNITYRGT SEQ ID NO:4) with any 1 or 2 conserved substitutions.

In some embodiments, the alternative intracellular signaling domain of the chimeric antigen receptor (CAR) is characterized in that ITGB3 has the amino acid sequence DTANNPLYKEATSTFTNITYRGT (SEQ ID NO: 4) with any 1 conserved substitution.

In some embodiments, the alternative intracellular signaling domain of the chimeric antigen receptor (CAR) is characterized in that ITGB3 has the amino acid sequence DTANNPLYKEATSTFTNITYRGT (SEQ ID NO: 4) with any 2 conserved substitutions.

In some embodiments, the alternative intracellular signaling domain of the chimeric antigen receptor (CAR) is characterized in that ITGB3 has the amino acid sequence DTANNPLYKEATSTFTNITYRGT (SEQ ID NO: 4).

In some embodiments, the alternative intracellular signaling domain of the chimeric antigen receptor (CAR) has the amino acid sequence RVKFSRSADAPAYKQGQNQLY-NELNLGRREEYDVLDKRR-GRDPEMGGKPRRKNPQEGLYNELQK DKMAEAYSEI-GMKGDTANNPLYKEATSTFTNITYRGTALPPR (SEQ ID NO: 5) or has an amino acid sequence that is at least 95% identical to the amino acid sequence of SEQ ID NO: 5 and differs from SEQ ID NO: 5 only in non-conserved amino acid residues.

In some embodiments, the alternative intracellular signaling domain of the chimeric antigen receptor (CAR) has the amino acid sequence RVKFSRSADDTANNPLYKEAT-STFTNITYRGTRGRDPEMGGKPRRKNPQEGLY-NELQKDKMAEA YSEIGMKGERRRGKGHDGLYQGL-STATKDTYDALHMQALPPR (SEQ ID NO:6) or has an amino acid sequence that is at least 95% identical to the amino acid sequence of SEQ ID NO: 6 and differs from SEQ ID NO: 6 only in non-conserved amino acid residues.

In some embodiments, the alternative intracellular signaling domain of the chimeric antigen receptor (CAR) has the amino acid sequence RVKFSRSADAPAYKQGQNQLYNELNLGRREEYDVLDKRRGRDPEMGGKDTANNPLYKEATSTFT NITYRGTKGERRRGKGHDGLYQGLSTATKDTYDALHMQALPPR (SEQ ID NO:7) or has an amino acid sequence that is at least 95% identical to the amino acid sequence of SEQ ID NO: 7 and differs from SEQ ID NO: 7 only in non-conserved amino acid residues.

In some embodiments, the alternative intracellular signaling domain of the chimeric antigen receptor (CAR) has the amino acid sequence RVKFSRSADAPAYKQGQNQLYNELNLGRREEYDVLDKRRGRDPEMGGKDTANNPLYKEATSTFT NITYRGTKGDTANNPLYKEATSTFTNITYRGTALPPR (SEQ ID NO:8) or has an amino acid sequence that is at least 95% identical to the amino acid sequence of SEQ ID NO: 8 and differs from SEQ ID NO: 8 only in non-conserved amino acid residues.

In some embodiments, the alternative intracellular signaling domain of the chimeric antigen receptor (CAR) has the amino acid sequence RVKFSRSADDTANNPLYKEATSTFTNITYRGTRGRDPEMGGKPRRKNPQEGLYNELQKDKMAEA YSEIGMKGDTANNPLYKEATSTFTNITYRGTALPPR (SEQ ID NO:9) or has an amino acid sequence that is at least 95% identical to the amino acid sequence of SEQ ID NO: 9 and differs from SEQ ID NO: 9 only in non-conserved amino acid residues.

In some embodiments, the alternative intracellular signaling domain of the chimeric antigen receptor (CAR) has the amino acid sequence RVKFSRSADDTANNPLYKEATSTFTNITYRGTRGRDPEMGGKDTANNPLYKEATSTFTNITYRG TKGERRRGKGHDGLYQGLSTATKDTYDALHMQALPPR (SEQ ID NO:10) or has an amino acid sequence that is at least 95% identical to the amino acid sequence of SEQ ID NO: 10 and differs from SEQ ID NO: 10 only in non-conserved amino acid residues.

In one aspect, the present invention relates to an isolated alternative intracellular signaling domain of a chimeric antigen receptor (CAR), which includes one or two immunoreceptor tyrosine-based activation motifs (ITAMs) selected from ITAM1, ITAM2 and ITAM3, and one or two fragments of the amino acid sequence of integrin beta 3 (ITGB3), wherein the total number of ITAMs and ITGB3 is three.

In some embodiments, the alternative intracellular signaling domain of the chimeric antigen receptor (CAR) is characterized in that it includes two immunoreceptor tyrosine-based activation motifs (ITAMs) selected from ITAM1, ITAM2 and ITAM3 and one fragment of the amino acid sequence of integrin beta 3 (ITGB3).

In some embodiments, the alternative intracellular signaling domain of the chimeric antigen receptor (CAR) is characterized in that it includes ITAM2, ITAM3 and ITGB3.

In some embodiments, the alternative intracellular signaling domain includes ITAM1, ITAM3 and ITGB3.

In some embodiments, the alternative intracellular signaling domain of the chimeric antigen receptor (CAR) is characterized in that it includes ITAM1, ITAM2 and ITGB3.

In some embodiments, the alternative intracellular signaling domain of the chimeric antigen receptor (CAR) is characterized in that it includes one immunoreceptor tyrosine-based activation motif (ITAM) selected from ITAM1, ITAM2 and ITAM3, and two fragments of the amino acid sequence of integrin beta 3 (ITGB3).

In some embodiments, the alternative intracellular signaling domain of the chimeric antigen receptor (CAR) is characterized in that it includes ITAM1 and two fragments of the amino acid sequence of integrin beta 3 (ITGB3).

In some embodiments, the alternative intracellular signaling domain of the chimeric antigen receptor (CAR) is characterized in that it includes ITAM2 and two fragments of the amino acid sequence of integrin beta 3 (ITGB3).

In some embodiments, the alternative intracellular signaling domain of the chimeric antigen receptor (CAR) is characterized in that it includes ITAM3 and two fragments of the amino acid sequence of integrin beta 3 (ITGB3).

In some embodiments, the alternative intracellular signaling domain of the chimeric antigen receptor (CAR) is characterized in that ITAM1 has the amino acid sequence (SEQ ID NO: 1)
APAYKQGQNQLYNELNLGRREEYDVLDKR.

In some embodiments, the alternative intracellular signaling domain of the chimeric antigen receptor (CAR) is characterized in that ITAM2 has the amino acid sequence (SEQ ID NO: 2)
PRRKNPQEGLYNELQKDKMAEAYSEIGM.

In some embodiments, the alternative intracellular signaling domain of the chimeric antigen receptor (CAR) is characterized in that ITAM3 has the amino acid sequence (SEQ ID NO: 3)
ERRRGKGHDGLYQGLSTATKDTYDALHMQ.

In some embodiments, the alternative intracellular signaling domain of the chimeric antigen receptor (CAR) is characterized in that ITGB3 has the amino acid sequence DTANNPLYKEATSTFTNITYRGT (SEQ ID NO:4) or the amino acid sequence DTANNPLYKEATSTFTNITYRGT (SEQ ID NO:4) with any 1 or 2 conserved substitutions.

In some embodiments, the alternative intracellular signaling domain of the chimeric antigen receptor (CAR) is characterized in that ITGB3 has the amino acid sequence DTANNPLYKEATSTFTNITYRGT (SEQ ID NO:4) with any 1 conserved substitution.

In some embodiments, the alternative intracellular signaling domain of the chimeric antigen receptor (CAR) is characterized in that ITGB3 has the amino acid sequence DTANNPLYKEATSTFTNITYRGT (SEQ ID NO:4) with any 2 conserved substitutions.

In some embodiments, the alternative intracellular signaling domain of the chimeric antigen receptor (CAR) is characterized in that ITGB3 has the amino acid sequence DTANNPLYKEATSTFTNITYRGT (SEQ ID NO:4).

In some embodiments, the alternative intracellular signaling domain of the chimeric antigen receptor (CAR) has the amino acid sequence RVKFSRSADAPAYKQGQNQLYNELNLGRREEYDVLDKRR-GRDPEMGGKPRRKNPQEGLYNELQK DKMAEAYSEIGMKGDTANNPLYKEATSTFTNITYRGTALPPR (SEQ ID NO:5) or has an amino acid sequence that is at least 95% identical to the amino acid sequence of SEQ ID NO: 5 and differs from SEQ ID NO: 5 only in non-conserved amino acid residues.

In some embodiments, the alternative intracellular signaling domain of the chimeric antigen receptor (CAR) has the amino acid sequence RVKFSRSADDTANNPLYKEAT- STFTNITYRGTRGRDPEMGGKPRRKNPQEGLYNELQKDKMAEA YSEIGMKGERRRGKGHDGLYQGLSTATKDTYDALHMQALPPR (SEQ ID NO:6) or has an amino acid sequence that is at least 95% identical to the amino acid sequence of SEQ ID NO: 6 and differs from SEQ ID NO: 6 only in non-conserved amino acid residues.

In some embodiments, the alternative intracellular signaling domain of the chimeric antigen receptor (CAR) has the amino acid sequence RVKFSRSADAPAYKQGQNQLYNELNLGRREEYDVLDKRRGRDPEMGGKDTANNPLYKEATSTFT NITYRGTKGERRRGKGHDGLYQGLSTATKDTYDALHMQALPPR (SEQ ID NO:7) or has an amino acid sequence that is at least 95% identical to the amino acid sequence of SEQ ID NO: 7 and differs from SEQ ID NO: 7 only in non-conserved amino acid residues.

In some embodiments, the alternative intracellular signaling domain of the chimeric antigen receptor (CAR) has the amino acid sequence
RVKFSRSADAPAYKQGQNQLYNELNLGRREEYDVLDKRRGRDPEMGGKDTANNPLYKEA TSTFTNITYRGTKGDTANNPLYKEATSTFTNITYRGTALPPR (SEQ ID NO:8) or has an amino acid sequence that is at least 95% identical to the amino acid sequence of SEQ ID NO: 8 and differs from SEQ ID NO: 8 only in non-conserved amino acid residues.

In some embodiments, the alternative intracellular signaling domain of the chimeric antigen receptor (CAR) has the amino acid sequence
RVKFSRSADDTANNPLYKEATSTFTNITYRGTRGRDPEMGGKPRRKNPQEGLYNELQKD KMAEAYSEIGMKGDTANNPLYKEATSTFTNITYRGTALPPR (SEQ ID NO:9) or has an amino acid sequence that is at least 95% identical to the amino acid sequence of SEQ ID NO: 9 and differs from SEQ ID NO: 9 only in non-conserved amino acid residues.

In some embodiments, the alternative intracellular signaling domain of the chimeric antigen receptor (CAR) has the amino acid sequence RVKFSRSADDTANNPLYKEATSTFTNITYRGTRGRDPEMGGKDTANNPLYKEATSTFTNITYRG TKGERRRGKGHDGLYQGLSTATKDTYDALHMQALPPR (SEQ ID NO:10) or has an amino acid sequence that is at least 95% identical to the amino acid sequence of SEQ ID NO: 10 and differs from SEQ ID NO: 10 only in non-conserved amino acid residues.

In one aspect, the present invention relates to an isolated nucleic acid that encodes the above-mentioned alternative intracellular signaling domain.

In one aspect, the present invention relates to an isolated chimeric antigen receptor (CAR) comprising the above-mentioned alternative intracellular signaling domain.

In some embodiments, the isolated chimeric antigen receptor (CAR) is characterized in that it comprises:
a) an antigen-binding domain that is specific for a tumor antigen;
b) a transmembrane domain;
c) a costimulatory domain;
d) an alternative intracellular signaling domain.

In some embodiments, the isolated chimeric antigen receptor (CAR) is characterized in that the antigen-binding domain that is specific for the tumor antigen is Fab or scFv.

In some embodiments, the isolated chimeric antigen receptor (CAR) is characterized in that the antigen-binding domain that is specific for the tumor antigen is scFv.

In some embodiments, the isolated chimeric antigen receptor (CAR) is characterized in that the antigen-binding domain is specific for the tumor antigen selected from the group: CD19, CD20, CD123 or BCMA.

In some embodiments, the isolated chimeric antigen receptor (CAR) is characterized in that the antigen-binding domain is specific for the CD19 tumor antigen.

In some embodiments, the isolated chimeric antigen receptor (CAR) is characterized in that the antigen-binding domain that is specific for the CD19 tumor antigen has the amino acid sequence (SEQ ID NO: 11)
DIQMTQTTSSLSASLGDRVTISCRASQDISKYLNWYQQKPDGTVKLLIYHT

SRLHSGVPSRFSGSGSGTDYSLTISNLEQEDIATYFCQQGNTLPYTFGGGT

KLEITGSTSGSGKPGSGEGSTKGEVKLQESGPGLVAPSQSLSVTCTVSGVS

LPDYGVSWIRQPPRKGLEWLGVIWGSETTYYNSALKSRLTIIKDNSKSQVF

LKMNSLQTDDTAIYYCAKHYYYGGSYAMDYWGQGTSVTVSS.

In some embodiments, the isolated chimeric antigen receptor (CAR) is characterized in that the transmembrane domain is a transmembrane domain of a protein selected from the group consisting of a T cell receptor-alpha, -beta, or -zeta chains, CD28, CD3 epsilon, CD45, CD4, CD5, CD8, CD9, CD16, CD22, CD33, CD37, CD64, CD80, CD86, CD134, CD137 and CD154.

In some embodiments, the isolated chimeric antigen receptor (CAR) is characterized in that the transmembrane domain is CD8.

In some embodiments, the isolated chimeric antigen receptor (CAR) is characterized in that the transmembrane domain of CD8 has the amino acid sequence represented by IYIWAPLAGTCGVLLLSLVITLYC (SEQ ID NO: 12).

In some embodiments, the isolated chimeric antigen receptor (CAR) is characterized in that the costimulatory domain is a functional signaling domain of a protein selected from the group consisting of OX40, CD2, CD27, CD28, CDS, ICAM-1, LFA-1 (CD11a/CD18), ICOS (CD278) and 4-1BB (CD137).

In some embodiments, the isolated chimeric antigen receptor (CAR) is characterized in that the costimulatory domain is CD28 or 4-1BB.

In some embodiments, the isolated chimeric antigen receptor (CAR) is characterized in that the costimulatory domain is CD28.

In some embodiments, the isolated chimeric antigen receptor (CAR) is characterized in that the CD28 costimulatory domain has the amino acid sequence (SEQ ID NO: 13)
AAAIEVMYPPPYLDNEKSNGTIIHVKGKHLCPSPLFPGPSKPFWVLVVVGG

VLACYSLLVTVAFIIFWVRSKRSRLLHSDYMNMTPRRPGPTRKHYQPYAPP

RDFAAYRSRVKFSRSADAPAYQQGQNQLYNELNLGRREEYDVLDKRRGRDP

EMGGKPRRKNPQEGLYNELQKDKMAEAYSEIGMKGERRRGKGHDGLYQGLS

TATKDTYDALHMQALPPR.

In some embodiments, the isolated chimeric antigen receptor (CAR) is characterized in that the costimulatory domain is 4-1BB.

In some embodiments, the isolated chimeric antigen receptor (CAR) is characterized in that the costimulatory domain of 4-1BB has the amino acid sequence represented by (SEQ ID NO: 14)
KRGRKKLLYIFKQPFMRPVQTTQEEDGCSCRFPEEEEGGCEL.

In some embodiments, the isolated chimeric antigen receptor (CAR) is characterized in that it further comprises a leader sequence.

In some embodiments, the isolated chimeric antigen receptor (CAR) has an amino acid sequence that is represented by an amino acid sequence selected from the group: SEQ ID NO:15, 16, 17, 18, 19, 20, 21, 22, 23, 24, 25 or 26, or has an amino acid sequence that is at least 95% identical to an amino acid sequence selected from the group: SEQ ID NO:15, 16, 17, 18, 19, 20, 21, 22, 23, 24, 25 or 26, and differs from an amino acid sequence selected from the group: SEQ ID NO:15, 16, 17, 18, 19, 20, 21, 22, 23, 24, 25 or 26, only in non-conserved amino acid residues.

The chimeric antigen receptor 19CAR-T-CD28-altcd3zeta (ITGB3-ITAM2-ITAM3) has the amino acid sequence (SEQ ID NO: 15)
MLLLVTSLLLCELPHPAFLLIPDIQMTQTTSSLSASLGDRVTISCRASQDI

SKYLNWYQQKPDGTVKLLIYHTSRLHSGVPSRFSGSGSGTDYSLTISNLEQ

EDIATYFCQQGNTLPYTFGGGTKLEITGSTSGSGKPGSGEGSTKGEVKLQE

SGPGLVAPSQSLSVTCTVSGVSLPDYGVSWIRQPPRKGLEWLGVIWGSETT

YYNSALKSRLTIIKDNSKSQVFLKMNSLQTDDTAIYYCAKHYYYGGSYAMD

YWGQGTSVTVSSTTTPAPRPPTPAPTIASQPLSLRPEACRPAAGGAVHTRG

LDFACDIYIWAPLAGTCGVLLLSLVITLYCAAAIEVMYPPPYLDNEKSNGT

IIHVKGKHLCPSPLFPGPSKPFWVLVVVGGVLACYSLLVTVAFIIFWVRSK

RSRLLHSDYMNMTPRRPGPTRKHYQPYAPPRDFAAYRSRVKFSRSADAPAY

QQGQNQLYNELNLGRREEYDVLDKRRGRDPEMGGKPRRKNPQEGLYNELQK

DKMAEAYSEIGMKGERRRGKGHDGLYQGLSTATKDTYDALHMQALPPRRVK

FSRSADDTANNPLYKEATSTFTNITYRGTRGRDPEMGGKPRRKNPQEGLYN

ELQKDKMAEAYSEIGMKGERRRGKGHDGLYQGLSTATKDTYDALHMQALPP

RGSAAA.

The chimeric antigen receptor 19CAR-T-CD28-altcd3zeta (ITAM1-ITGB3-ITAM3) has the amino acid sequence (SEQ ID NO: 16)
MLLLVTSLLLCELPHPAFLLIPDIQMTQTTSSLSASLGDRVTISCRASQDI

SKYLNWYQQKPDGTVKLLIYHTSRLHSGVPSRFSGSGSGTDYSLTISNLEQ

EDIATYFCQQGNTLPYTFGGGTKLEITGSTSGSGKPGSGEGSTKGEVKLQE

SGPGLVAPSQSLSVTCTVSGVSLPDYGVSWIRQPPRKGLEWLGVIWGSETT

YYNSALKSRLTIIKDNSKSQVFLKMNSLQTDDTAIYYCAKHYYYGGSYAMD

YWGQGTSVTVSSTTTPAPRPPTPAPTIASQPLSLRPEACRPAAGGAVHTRG

LDFACDIYIWAPLAGTCGVLLLSLVITLYCAAAIEVMYPPPYLDNEKSNGT

IIHVKGKHLCPSPLFPGPSKPFWVLVVVGGVLACYSLLVTVAFIIFWVRSK

RSRLLHSDYMNMTPRRPGPTRKHYQPYAPPRDFAAYRSRVKFSRSADAPAY

QQGQNQLYNELNLGRREEYDVLDKRRGRDPEMGGKPRRKNPQEGLYNELQK

DKMAEAYSEIGMKGERRRGKGHDGLYQGLSTATKDTYDALHMQALPPRRVK

FSRSADAPAYKQGQNQLYNELNLGRREEYDVLDKRRGRDPEMGGKDTANNP

LYKEATSTFTNITYRGTKGERRRGKGHDGLYQGLSTATKDTYDALHMQALP

PRGSAAA.

The chimeric antigen receptor 19CAR-T-CD28-altcd3zeta (ITAM1-ITAM2-ITGB3) has the amino acid sequence (SEQ ID NO: 17)
MLLLVTSLLLCELPHPAFLLIPDIQMTQTTSSLSASLGDRVTISCRASQDI

SKYLNWYQQKPDGTVKLLIYHTSRLHSGVPSRFSGSGSGTDYSLTISNLEQ

EDIATYFCQQGNTLPYTFGGGTKLEITGSTSGSGKPGSGEGSTKGEVKLQE

SGPGLVAPSQSLSVTCTVSGVSLPDYGVSWIRQPPRKGLEWLGVIWGSETT

YYNSALKSRLTIIKDNSKSQVFLKMNSLQTDDTAIYYCAKHYYYGGSYAMD

YWGQGTSVTVSSTTTPAPRPPTPAPTIASQPLSLRPEACRPAAGGAVHTRG

LDFACDIYIWAPLAGTCGVLLLSLVITLYCAAAIEVMYPPPYLDNEKSNGT

IIHVKGKHLCPSPLFPGPSKPFWVLVVVGGVLACYSLLVTVAFIIFWVRSK

RSRLLHSDYMNMTPRRPGPTRKHYQPYAPPRDFAAYRSRVKFSRSADAPAY

QQGQNQLYNELNLGRREEYDVLDKRRGRDPEMGGKPRRKNPQEGLYNELQK

DKMAEAYSEIGMKGERRRGKGHDGLYQGLSTATKDTYDALHMQALPPRRVK

FSRSADAPAYKQGQNQLYNELNLGRREEYDVLDKRRGRDPEMGGKPRRKNP

QEGLYNELQKDKMAEAYSEIGMKGDTANNPLYKEATSTFTNITYRGTALPP

RGSAAA.

The chimeric antigen receptor 19CAR-T-CD28-altcd3zeta (ITGB3-ITGB3-ITAM3) has the amino acid sequence (SEQ ID NO: 18)
MLLLVTSLLLCELPHPAFLLIPDIQMTQTTSSLSASLGDRVTISCRASQDI

SKYLNWYQQKPDGTVKLLIYHTSRLHSGVPSRFSGSGSGTDYSLTISNLEQ

EDIATYFCQQGNTLPYTFGGGTKLEITGSTSGSGKPGSGEGSTKGEVKLQE

SGPGLVAPSQSLSVTCTVSGVSLPDYGVSWIRQPPRKGLEWLGVIWGSETT

YYNSALKSRLTIIKDNSKSQVFLKMNSLQTDDTAIYYCAKHYYYGGSYAMD

YWGQGTSVTVSSTTTPAPRPPTPAPTIASQPLSLRPEACRPAAGGAVHTRG

LDFACDIYIWAPLAGTCGVLLLSLVITLYCAAAIEVMYPPPYLDNEKSNGT

IIHVKGKHLCPSPLFPGPSKPFWVLVVVGGVLACYSLLVTVAFTIFWVRSK

RSRLLHSDYMNMTPRRPGPTRKHYQPYAPPRDFAAYRSRVKFSRSADAPAY

QQGQNQLYNELNLGRREEYDVLDKRRGRDPEMGGKPRRKNPQEGLYNELQK

DKMAEAYSEIGMKGERRRGKGHDGLYQGLSTATKDTYDALHMQALPPRRVK

FSRSADDTANNPLYKEATSTFTNITYRGTRGRDPEMGGKDTANNPLYKEAT

STFTNITYRGTKGERRRGKGHDGLYQGLSTATKDTYDALHMQALPPRGSAA

A.

The chimeric antigen receptor 19CAR-T-CD28-altcd3zeta (ITAM1-ITGB3-ITGB3) has the amino acid sequence (SEQ ID NO: 19)
MLLLVTSLLLCELPHPAFLLIPDIQMTQTTSSLSASLGDRVTISCRASQD

ISKYLNWYQQKPDGTVKLLIYHTSRLHSGVPSRFSGSGSGTDYSLTISNL

EQEDIATYFCQQGNTLPYTFGGGTKLEITGSTSGSGKPGSGEGSTKGEVK

LQESGPGLVAPSQSLSVTCTVSGVSLPDYGVSWIRQPPRKGLEWLGVIWG

SETTYYNSALKSRLTIIKDNSKSQVFLKMNSLQTDDTAIYYCAKHYYYGG

SYAMDYWGQGTSVTVSSTTTPAPRPPTPAPTIASQPLSLRPEACRPAAGG

AVHTRGLDFACDIYIWAPLAGTCGVLLLSLVITLYCAAAIEVMYPPPYLD

NEKSNGTIIHVKGKHLCPSPLFPGPSKPFWVLVVVGGVLACYSLLVTVAF

IIFWVRSKRSRLLHSDYMNMTPRRPGPTRKHYQPYAPPRDFAAYRSRVKF

SRSADAPAYQQGQNQLYNELNLGRREEYDVLDKRRGRDPEMGGKPRRKNP

QEGLYNELQKDKMAEAYSEIGMKGERRRGKGHDGLYQGLSTATKDTYDAL

HMQALPPRRVKFSRSADAPAYKQGQNQLYNELNLGRREEYDVLDKRRGRD

PEMGGKDTANNPLYKEATSTFTNITYRGTKGDTANNPLYKEATSTFTNIT

YRGTALPPRGSAAA.

The chimeric antigen receptor 19CAR-T-CD28-altcd3zeta (ITGB3-ITAM2-ITGB3) has the amino acid sequence (SEQ ID NO: 20)
MLLLVTSLLLCELPHPAFLLIPDIQMTQTTSSLSASLGDRVTISCRASQD

ISKYLNWYQQKPDGTVKLLIYHTSRLHSGVPSRFSGSGSGTDYSLTISNL

EQEDIATYFCQQGNTLPYTFGGGTKLEITGSTSGSGKPGSGEGSTKGEVK

LQESGPGLVAPSQSLSVTCTVSGVSLPDYGVSWIRQPPRKGLEWLGVIWG

SETTYYNSALKSRLTIIKDNSKSQVFLKMNSLQTDDTAIYYCAKHYYYGG

SYAMDYWGQGTSVTVSSTTTPAPRPPTPAPTIASQPLSLRPEACRPAAGG

AVHTRGLDFACDIYIWAPLAGTCGVLLLSLVITLYCAAAIEVMYPPPYLD

NEKSNGTIIHVKGKHLCPSPLFPGPSKPFWVLVVVGGVLACYSLLVTVAF

IIFWVRSKRSRLLHSDYMNMTPRRPGPTRKHYQPYAPPRDFAAYRSRVKF

SRSADAPAYQQGQNQLYNELNLGRREEYDVLDKRRGRDPEMGGKPRRKNP

QEGLYNELQKDKMAEAYSEIGMKGERRRGKGHDGLYQGLSTATKDTYDAL

HMQALPPRRVKFSRSADDTANNPLYKEATSTFTNITYRGTRGRDPEMGGK

PRRKNPQEGLYNELQKDKMAEAYSEIGMKGDTANNPLYKEATSTFTNITY

RGTALPPRGSAAA.

The chimeric antigen receptor 19CAR-T-41bb-altcd3zeta (ITGB3-ITAM2-ITAM3) has the amino acid sequence (SEQ ID NO: 21)
MLLLVTSLLLCELPHPAFLLIPDIQMTQTTSSLSASLGDRVTISCRASQD

ISKYLNWYQQKPDGTVKLLIYHTSRLHSGVPSRFSGSGSGTDYSLTISNL

EQEDIATYFCQQGNTLPYTFGGGTKLEITGSTSGSGKPGSGEGSTKGEVK

LQESGPGLVAPSQSLSVTCTVSGVSLPDYGVSWIRQPPRKGLEWLGVIWG

SETTYYNSALKSRLTIIKDNSKSQVFLKMNSLQTDDTAIYYCAKHYYYGG

SYAMDYWGQGTSVTVSSTTTPAPRPPTPAPTIASQPLSLRPEACRPAAGG

AVHTRGLDFACDIYIWAPLAGTCGVLLLSLVITLYCKRGRKKLLYIFKQP

FMRPVQTTQEEDGCSCRFPEEEEGGCELRVKFSRSADDTANNPLYKEATS

TFTNITYRGTRGRDPEMGGKPRRKNPQEGLYNELQKDKMAEAYSEIGMKG

ERRRGKGHDGLYQGLSTATKDTYDALHMQALPPRGSAAA.

The chimeric antigen receptor 19CAR-T-41bb-altcd3zeta (ITAM1-ITGB3-ITAM3) has the amino acid sequence (SEQ ID NO: 22)
MLLLVTSLLLCELPHPAFLLIPDIQMTQTTSSLSASLGDRVTISCRASQD

ISKYLNWYQQKPDGTVKLLIYHTSRLHSGVPSRFSGSGSGTDYSLTISNL

EQEDIATYFCQQGNTLPYTFGGGTKLEITGSTSGSGKPGSGEGSTKGEVK

LQESGPGLVAPSQSLSVTCTVSGVSLPDYGVSWIRQPPRKGLEWLGVIWG

SETTYYNSALKSRLTIIKDNSKSQVFLKMNSLQTDDTAIYYCAKHYYYGG

SYAMDYWGQGTSVTVSSTTTPAPRPPTPAPTIASQPLSLRPEACRPAAGG

AVHTRGLDFACDIYIWAPLAGTCGVLLLSLVITLYCKRGRKKLLYIFKQP

FMRPVQTTQEEDGCSCRFPEEEEGGCELRVKFSRSADAPAYKQGQNQLYN

ELNLGRREEYDVLDKRRGRDPEMGGKDTANNPLYKEATSTFTNITYRGTK

GERRRGKGHDGLYQGLSTATKDTYDALHMQALPPRGSAAA.

The chimeric antigen receptor 19CAR-T-41bb-altcd3zeta (ITAM1-ITAM2-ITGB3) has the amino acid sequence (SEQ ID NO: 23)
MLLLVTSLLLCELPHPAFLLIPDIQMTQTTSSLSASLGDRVTISCRASQD

ISKYLNWYQQKPDGTVKLLIYHTSRLHSGVPSRFSGSGSGTDYSLTISNL

EQEDIATYFCQQGNTLPYTFGGGTKLEITGSTSGSGKPGSGEGSTKGEVK

LQESGPGLVAPSQSLSVTCTVSGVSLPDYGVSWIRQPPRKGLEWLGVIWG

SETTYYNSALKSRLTIIKDNSKSQVFLKMNSLQTDDTAIYYCAKHYYYGG

SYAMDYWGQGTSVTVSSTTTPAPRPPTPAPTIASQPLSLRPEACRPAAGG

AVHTRGLDFACDIYIWAPLAGTCGVLLLSLVITLYCKRGRKKLLYIFKQP

FMRPVQTTQEEDGCSCRFPEEEEGGCELRVKFSRSADAPAYKQGQNQLYN

ELNLGRREEYDVLDKRRGRDPEMGGKPRRKNPQEGLYNELQKDKMAEAYS

EIGMKGDTANNPLYKEATSTFTNITYRGTALPPRGSAAA.

The chimeric antigen receptor 19CAR-T-41bb-altcd3zeta (ITGB3-ITGB3-ITAM3) has the amino acid sequence (SEQ ID NO: 24)
MLLLVTSLLLCELPHPAFLLIPDIQMTQTTSSLSASLGDRVTISCRASQD

ISKYLNWYQQKPDGTVKLLIYHTSRLHSGVPSRFSGSGSGTDYSLTISNL

-continued

```
EQEDIATYFCQQGNTLPYTFGGGTKLEITGSTSGSGKPGSGEGSTKGEVK

LQESGPGLVAPSQSLSVTCTVSGVSLPDYGVSWIRQPPRKGLEWLGVIWG

SETTYYNSALKSRLTIIKDNSKSQVFLKMNSLQTDDTAIYYCAKHYYYGG

SYAMDYWGQGTSVTVSSTTTPAPRPPTPAPTIASQPLSLRPEACRPAAGG

AVHTRGLDFACDIYIWAPLAGTCGVLLLSLVITLYCKRGRKKLLYIFKQP

FMRPVQTTQEEDGCSCRFPEEEEGGCELRVKFSRSADDTANNPLYKEATS

TFTNITYRGTRGRDPEMGGKDTANNPLYKEATSTFTNITYRGTKGERRRG

KGHDGLYQGLSTATKDTYDALHMQALPPRGSAAA.
```

The chimeric antigen receptor 19CAR-T-41bb-altcd3zeta (ITAM1-ITGB3-ITGB3) has the amino acid sequence

```
                                          (SEQ ID NO: 25)
MLLLVTSLLLCELPHPAFLLIPDIQMTQTTSSLSASLGDRVTISCRASQD

ISKYLNWYQQKPDGTVKLLIYHTSRLHSGVPSRFSGSGSGTDYSLTISNL

EQEDIATYFCQQGNTLPYTFGGGTKLEITGSTSGSGKPGSGEGSTKGEVK

LQESGPGLVAPSQSLSVTCTVSGVSLPDYGVSWIRQPPRKGLEWLGVIWG

SETTYYNSALKSRLTIIKDNSKSQVFLKMNSLQTDDTAIYYCAKHYYYGG

SYAMDYWGQGTSVTVSSTTTPAPRPPTPAPTIASQPLSLRPEACRPAAGG

AVHTRGLDFACDIYIWAPLAGTCGVLLLSLVITLYCKRGRKKLLYIFKQP

FMRPVQTTQEEDGCSCRFPEEEEGGCELRVKFSRSADAPAYKQGQNQLYN

ELNLGRREEYDVLDKRRGRDPEMGGKDTANNPLYKEATSTFTNITYRGTK

GDTANNPLYKEATSTFTNITYRGTALPPRGSAAA.
```

The chimeric antigen receptor 19CAR-T-41bb-altcd3zeta (ITGB3-ITAM2-ITGB3) has the amino acid sequence

```
                                          (SEQ ID NO: 26)
MLLLVTSLLLCELPHPAFLLIPDIQMTQTTSSLSASLGDRVTISCRASQD

ISKYLNWYQQKPDGTVKLLIYHTSRLHSGVPSRFSGSGSGTDYSLTISNL

EQEDIATYFCQQGNTLPYTFGGGTKLEITGSTSGSGKPGSGEGSTKGEVK

LQESGPGLVAPSQSLSVTCTVSGVSLPDYGVSWIRQPPRKGLEWLGVIWG

SETTYYNSALKSRLTIIKDNSKSQVFLKMNSLQTDDTAIYYCAKHYYYGG

SYAMDYWGQGTSVTVSSTTTPAPRPPTPAPTIASQPLSLRPEACRPAAGG

AVHTRGLDFACDIYIWAPLAGTCGVLLLSLVITLYCKRGRKKLLYIFKQP

FMRPVQTTQEEDGCSCRFPEEEEGGCELRVKFSRSADDTANNPLYKEATS

TFTNITYRGTRGRDPEMGGKPRRKNPQEGLYNELQKDKMAEAYSEIGMKG

DTANNPLYKEATSTFTNITYRGTALPPRGSAAA.
```

In one aspect, the present invention relates to an isolated nucleic acid that encodes the above-mentioned isolated chimeric antigen receptor (CAR).

In one aspect, the present invention relates to an expression vector comprising the above nucleic acid.

In one aspect, the present invention relates to a delivery vector comprising the above nucleic acid.

In some embodiments, the vector is selected from the group consisting of DNA, RNA, plasmid, lentiviral vector, adeno-associated viral vector, adenoviral vector, or retroviral vector.

In some embodiments, the vector further comprises a promoter.

In some embodiments, the vector is an in vitro transcribed vector.

In some embodiments, the nucleic acid sequence further comprises a poly(A) sequence.

In some embodiments, the nucleic acid sequence further comprises a 3'UTR.

In one aspect, the present invention relates to a method for producing a genetically modified cell that comprises the above chimeric antigen receptor (CAR), which includes the transformation of the cell by the above method.

In one aspect, the present invention relates to a genetically modified cell that comprises the above chimeric antigen receptor (CAR), which is produced by the above method.

In some embodiments, the cell is a T lymphocyte.

In some embodiments, the cell is a CD8+ T cell.

In some embodiments, the cell is an NK cell.

In some embodiments, the cell is used as a medicinal agent.

In some embodiments, the cell is used as a medicinal agent for tumor diseases.

In some embodiments, the cell is used as a medicinal agent for diseases where the tumor is cancer.

| Structural features of the plasmid (en) | |
|---|---|
| Element | Note |
| RSV promoter | Enhancer/promoter of Rous sarcoma virus |
| Genetic elements (HIV-1 Ψ, cPPT, Gag, Env, LTRs) | Elements for packaging, transduction, and stable integration of the viral expression construct into genomic DNA. |
| 5' LTR (truncated) | Truncated 5' long terminal repeat (LTR) from HIV-1 |
| HIV LTR | Long terminal repeat (LTR) from HIV-1 |
| HIV-1 Ψ | HIV-1 packaging signal |
| Gag | Group-specific antigen encoding the core structural proteins of retrovirus. |
| Env | A viral gene encoding the viral envelope. |
| RRE | An element responsible for binding RNA to a Rev protein and directing nucleoprotein from the nucleus to cytoplasm. |
| cPPT | The central polypurine tract and the central terminating sequence of HIV-1. |
| EF1 promoter | A strong constructive promoter of the human translation elongation factor EF-1α |
| ScFv | Single-chain variable fragment |
| SVH | Heavy chain variable domain |
| SVL | Light chain variable domain |
| GS-linker | Glycine-serine linker |
| CD8 4-1BB CD3 | Chimeric antigen receptor 4-1BB, a costimulatory molecule expressed by CD8+ T cells |
| 4-1BB | Costimulatory domain |
| CD28 | Costimulatory domain |
| T2A | 2A oligopeptide from the Thosea asigna viral capsid protein, which mediates the cleavage of polypeptides during translation in eukaryotic cells. |
| eGFP | A green fluorescent protein gene codon-optimized for expression in mammalian cells. |
| WPRE | Post-transcriptional regulatory element of WHV |
| 3' LTR (ΔU3) | Self-inactivating 3' long terminal repeat (LTR) from HIV-1 |
| HIV LTR | Long terminal repeat from HIV |
| SV40 poly(A) signal | SV40 polyadenylation signal |
| SV40 Ori | SV40 origin of replication in mammalian cells |
| M13 rev | Universal sequencing primer |
| lac operator | Operator for inhibiting transcription in E. coli |
| lac promoter | Promoter for the lac operon |
| CAP binding site | Catabolite operon activator protein binding site of E. coli |

| Structural features of the plasmid (en) | |
|---|---|
| Element | Note |
| ori | A high-copy number ColE1/pMB1/pBR322/pUC origin of replication in bacterial cells. |
| AmpR | A beta-lactamase gene that provides resistance to ampicillin, carbenicillin |
| AmpR promoter | Bla promoter, a weak constitutive promoter for the expression of the ampicillin resistance gene in bacterial cells. |
| ITAM1/2/3 | immunoreceptor tyrosine-based activation motif |
| ITGB3 | Gene of human Integrin beta-3 (β3) or CD6 |

Figure 27:
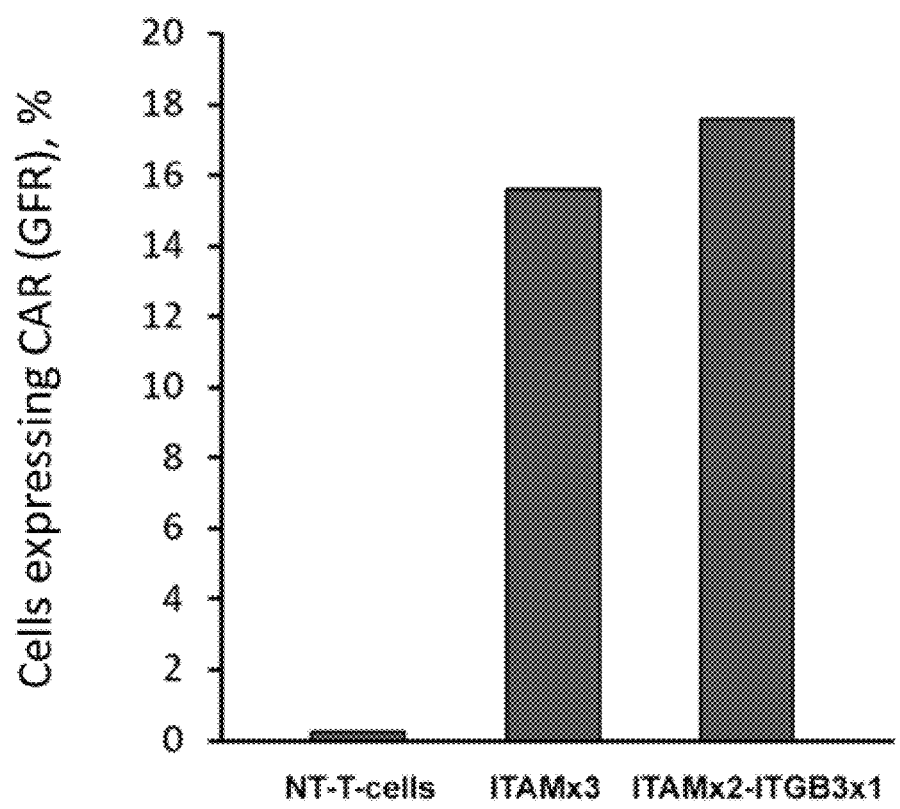

FIG. 27. Level of GFP expression in viable T-lymphocytes following lentiviral drug transduction, 72 hours, %.

Figure 28:
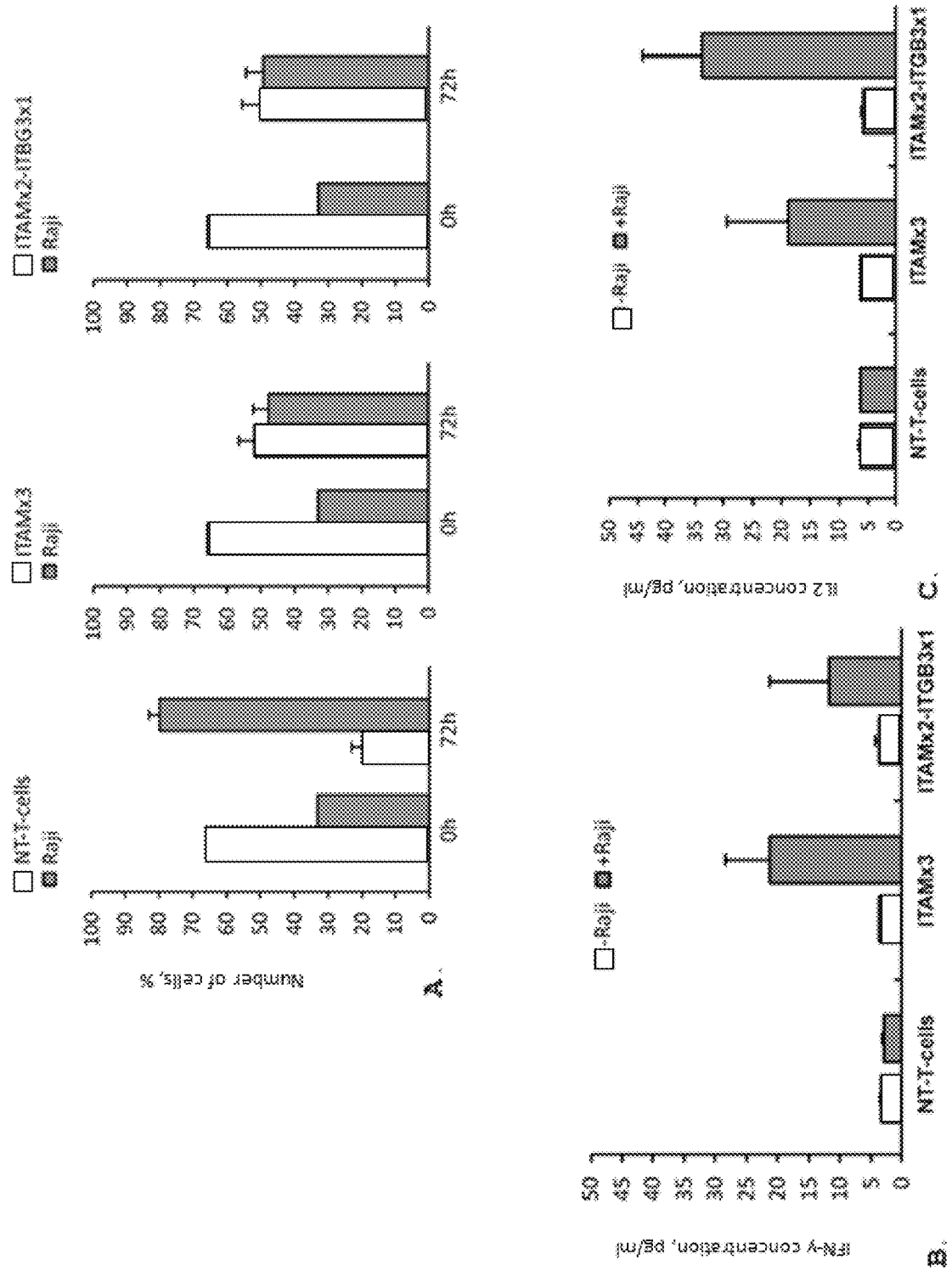

FIG. 28. Measurement of cytotoxic activity of CAR-T lymphocytes expressing control CAR-ITAMx3 and experimental CAR-ITAMx2-ITGB3x1 when co-cultured with target cells.

A. is trends in the percentage of T-lymphocytes/CAR-T-lymphocytes and Raji cells when co-cultured for 0 hours and 72 hours;

B. is the concentration of IFN-γ in the culture medium when co-culturing T-lymphocytes/CAR-T-lymphocytes and the target cells, 72 hours;

C. is the concentration of IL2 in the culture medium when co-culturing T-lymphocytes/CAR-T-lymphocytes and the target cells, 72 hours.

Figure 29:
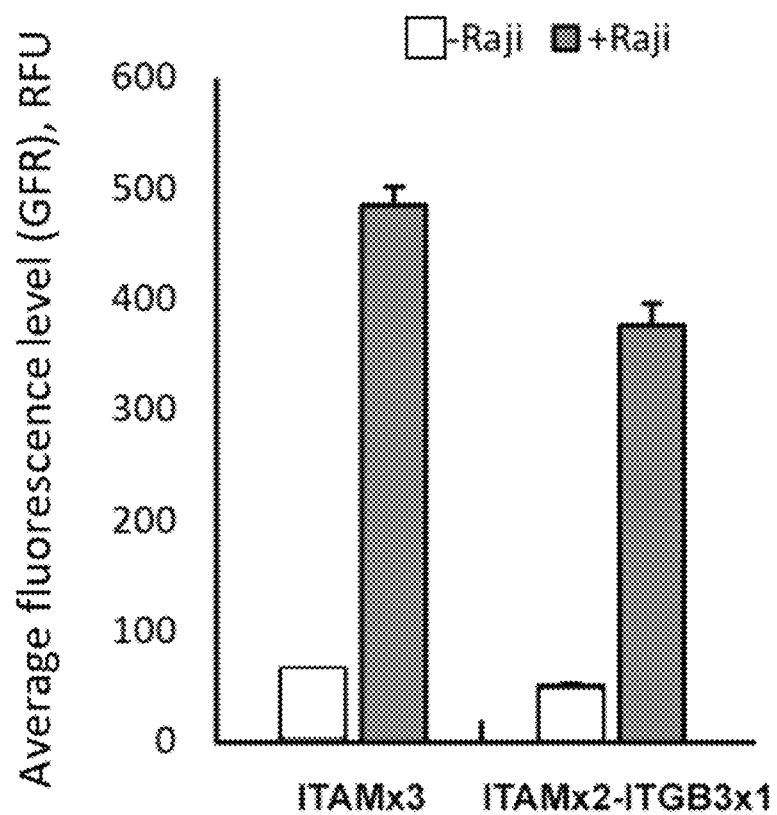

FIG. 29. Comparison of functional activity of the genetic constructs of the control CAR-ITAMx3 and the experimental CAR-ITAMx2-ITGB3x1 in terms of the capability of inducing the NFAT signaling cascade in the Jurkat$^{\Delta TCRab}$ NFAT-GFP reporter cell line, 72 hours.

DESCRIPTION OF INVENTION

Definitions and General Methods

Unless defined otherwise, all technical and scientific terms used herein have the same meaning as is commonly understood by one of ordinary skill in the art.

Further, unless otherwise required by context, singular terms shall include pluralities and plural terms shall include the singular terms. Typically, the present classification and methods of cell culture, molecular biology, immunology, microbiology, genetics, analytical chemistry, organic synthesis chemistry, medical and pharmaceutical chemistry, as well as hybridization and chemistry of protein and nucleic acids described herein are well known by those skilled and widely used in the art. Enzyme reactions and purification methods are performed according to the manufacturer's instructions, as is common in the art, or as described herein.

A "mammal" refers to any animal that is classified as a mammal, including primates, humans, rodents, dogs, cats, cattle, small cattle, horses, pigs, etc.

"Isolated" means altered or removed from the natural state. For example, a nucleic acid or a peptide naturally present in an animal is not "isolated", but the same nucleic acid or peptide partially or completely separated from the coexisting materials of its natural state is "isolated". An isolated nucleic acid or protein can exist in substantially purified form, or can exist in a non-native environment such as, for example, a genetically modified cell.

The term "identity" or "homology" is construed to mean the percentage of amino acid residues in the candidate sequence that are identical with the residue of a corresponding sequence to which it is compared, after aligning the sequences and introducing gaps, if necessary to achieve the maximum percent identity for the entire sequence, and not considering any conserved substitutions as part of the sequence identity. Neither N- or C-terminal extensions nor insertions will be construed as reducing identity or homology. Methods and computer programs for the alignment are well known in the art. Sequence identity may be measured using sequence analysis software (e.g. Sequence Analysis Software Package, Genetics Computer Group, University of Wisconsin Biotechnology Center, 1710 University Ave., Madison, WI 53705). This software matches similar sequences by assigning a degree of homology to various substitutions, deletions (eliminations), and other modifications.

The term "antigen" or "Ag" as used herein is defined as a molecule that provokes an immune response. This immune response may involve either antibody production, or the activation of specific immunologically-competent T cells, or both. The skilled artisan will appreciate that any macromolecule, including virtually all proteins or peptides, can serve as an antigen. Furthermore, antigens can be derived from recombinant or genomic DNA. A skilled artisan will appreciate that any DNA, which comprises nucleotide sequences or a partial nucleotide sequence encoding a protein that elicits an immune response therefore encodes an "antigen" as that term is used the present description. Furthermore, one skilled in the art will appreciate that an antigen need not be encoded solely by a full length nucleotide sequence of a gene. It is readily apparent that the present invention, as non-limiting examples, relates to the use of partial nucleotide sequences of more than one gene and that these nucleotide sequences are arranged in various combinations to elicit the desired immune response. Furthermore, a skilled artisan will appreciate that an antigen needs not to encode a "gene" at all. It is readily apparent that an antigen can be synthesized or can be derived from a biological sample. Such a biological sample may include, as non-limiting examples, a tissue sample, a tumor sample, a cell or a biological fluid.

"Disease" is a state of health of an animal where the animal cannot maintain homeostasis, and where if the disease is not ameliorated then the animal's health continues to deteriorate.

In contrast, a "disorder" in an animal is a state of health in which the animal is able to maintain homeostasis, but in which the animal's state of health is less favorable than it would be in the absence of the disorder. If left untreated, a disorder does not necessarily cause a further decrease in the animal's state of health.

As used in the present description, the term "malignant neoplasm" is defined as a disease characterized by the rapid and uncontrolled growth of abnormal cells. Malignant cells can spread locally or through the bloodstream and lymphatic system to other parts of an organism. Examples of various malignant neoplasms include, but are not limited to, breast cancer, prostate cancer, ovarian cancer, cervical cancer, skin cancer, pancreatic cancer, colorectal cancer, kidney cancer, liver cancer, malignant brain neoplasms, lymphoma, leukemia, lung cancer, myeloma, multiple myeloma, etc.

Malignant neoplasms that may be treated include tumors that are not vascularized, or not yet substantially vascularized, as well as vascularized tumors.

The malignant neoplasms may comprise non-solid tumors (such as hematological tumors, for example, leukemias and lymphomas) or may comprise solid tumors. Types of malignant neoplasms to be treated with the CARs of the invention include, but are not limited to, carcinoma, blastoma, and sarcoma, and certain leukemia or lymphoid malignancies, benign and malignant tumors, and malignancies e.g., sarcomas, carcinomas, and melanomas. Adult tumors/cancers and pediatric tumors/malignant neoplasms are also included.

Hematologic malignancies are malignant neoplasms of the blood or bone marrow. Examples of hematological (or hematogenous) malignant neoplasms include leukemias, including acute leukemias (such as acute lymphocytic leukemia, acute myelocytic leukemia, acute myelogenous leukemia and myeloblastic, promyelocytic, myelomonocytic, monocytic and erythroleukemia), chronic leukemias (such as chronic myelocytic (granulocytic) leukemia, chronic myelogenous leukemia, and chronic lymphocytic leukemia), polycythemia vera, lymphoma, Hodgkin's disease, non-Hodgkin's lymphoma (indolent and high grade forms), multiple myeloma, Waldenstrom's macroglobulinemia, heavy chain disease, myelodysplastic syndrome, hairy cell leukemia and myelodysplasia.

Solid tumors are abnormal masses of tissue that usually do not contain cysts or liquid areas. Solid tumors can be benign or malignant. Different types of solid tumors are named for the type of cells that form them (e.g., sarcomas, carcinomas, and lymphomas). Examples of solid tumors, such as sarcomas and carcinomas, include fibrosarcoma, myxosarcoma, liposarcoma, chondrosarcoma, osteosarcoma, and other sarcomas, synovioma, mesothelioma, Ewing's tumor, leiomyosarcoma, rhabdomyosarcoma, colon carcinoma, lymphoid malignancy, pancreatic cancer, breast cancer, lung cancer, ovarian cancer, prostate cancer, hepatocellular carcinoma, squamous cell carcinoma, basal cell carcinoma, adenocarcinoma, sweat gland carcinoma, medullary thyroid carcinoma, papillary thyroid carcinoma, pheochromocytoma, sebaceous gland carcinoma, papillary carcinoma, papillary adenocarcinomas, medullary carcinoma, bronchogenic carcinoma, renal cell carcinoma, hepatoma, bile duct carcinoma, choriocarcinoma, Wilms' tumor, cervical cancer, testicular tumor, seminoma, bladder carcinoma, melanoma, and CNS tumors (such as a glioma (such as brainstem glioma and mixed gliomas), glioblastoma (also known as glioblastoma multiforme) astrocytoma, CNS lymphoma, germinoma, medulloblastoma, schwannoma, craniopharyogioma, ependymoma, pinealoma, hemangioblastoma, acoustic neuroma, oligodendroglioma, menangioma, neuroblastoma, retinoblastoma and brain metastases).

As used in the present description, the term "endogenous" refers to any material from an organism, cell, tissue or system or naturally produced inside an organism, cell, tissue or system.

As used in the present description, the term "exogenous" refers to any material introduced into an organism, cell, tissue or system or produced outside an organism, cell, tissue or system.

As used in the present description, the term "expression" is defined as the transcription and/or translation of a particular nucleotide sequence driven by its promoter.

The term "overexpressed" tumor antigen or "over expression" of a tumor antigen is intended to indicate an abnormal level of expression of a tumor antigen in a cell from a disease focus like a solid tumor within a specific tissue or organ of a patient relative to the level of expression in a normal cell from that tissue or organ. Patients having solid tumors or a hematological malignancy characterized by over expression of the tumor antigen can be determined by standard assays known in the art.

The terms "patient," "individual," and the like are used interchangeably herein, and refer to any animal, or cells thereof whether in vitro or in situ, amenable to the methods described herein. In certain non-limiting embodiments, the patient or individual is a human.

As used in the present description, the term "polynucleotide" is defined as a chain of nucleotides. Furthermore, nucleic acids are polymers of nucleotides. Thus, as used in the present description, the terms nucleic acids and polynucleotides are interchangeable. One skilled in the art has the general knowledge that nucleic acids are polynucleotides that can be hydrolyzed to monomeric "nucleotides". Monomeric nucleotides can be hydrolyzed into nucleosides. As used in the present description, polynucleotides include, as non-limiting examples, all nucleic acid sequences which are obtained by any means available in the art, including, as non-limiting examples, recombinant means, i.e. the cloning of nucleic acid sequences from a recombinant library or a cell genome, using ordinary cloning technology and PCR and the like, and by synthetic means.

As used in the present description, the terms "peptide", "polypeptide" and "protein" are used interchangeably, and they refer to a compound consisting of amino acid residues that are covalently linked by peptide bonds. A protein or peptide must contain at least two amino acids, and no limitation is placed on the maximum number of amino acids that can comprise a protein's or peptide's sequence. Polypeptides include any peptide or protein comprising two or more amino acids joined to each other by peptide bonds. As used in the present description, the term refers to both short chains, which also commonly are referred to in the art, for example, as peptides, oligopeptides and oligomers, and to longer chains, which generally are referred to in the art as proteins, of which there are many types. "Polypeptides" include, inter alia, for example, biologically active fragments, substantially homologous polypeptides, oligopeptides, homodimers, heterodimers, variants of polypeptides, modified polypeptides, derivatives, analogs, fusion proteins. The polypeptides include natural peptides, recombinant peptides, synthetic peptides, or a combination thereof.

DETAILED DESCRIPTION OF INVENTION

Isolated Alternative Intracellular Signaling Domain of a Chimeric Antigen Receptor (CAR)

The intracellular signaling domain of the CAR or, in other words, the cytoplasmic domain of the invention is responsible for activation of at least one of the normal effector functions of an immune cell, in which the CAR has been placed. The term "effector function" refers to a specialized function of a cell. The effector function of a T cell, for example, may be cytolytic activity or helper activity, including the secretion of cytokines. Thus the term "intracellular signaling domain" refers to a protein portion that transduces the effector function signal and causes the cell to perform a specialized function. Although typically the entire intracellular signaling domain can be employed, in many cases it is not necessary to use the entire chain. When a truncated portion of the intracellular signaling domain is used, such truncated portion may be used in place of the intact chain as long as it transduces the effector function signal. The term "intracellular signaling domain" is thus meant to include any truncated portion of the intracellular signaling domain sufficient to transduce the effector function signal.

Preferred examples of intracellular signaling domains for use in the CARs according to the invention include the cytoplasmic sequences of the T cell receptor (TCR) and co-receptors that act in concert to initiate signal transduction following antigen receptor binding, as well as any derivate or variant of these sequences and any synthetic sequence that has the same functional capability.

It is known that signals generated through the TCR alone are insufficient for full activation of the T cell and that a secondary or co-stimulatory signal is also required. Thus, it may be said that T cell activation is mediated by two classes of cytoplasmic signaling sequences: those that initiate antigen-dependent primary activation through the TCR (primary cytoplasmic signaling sequences), and those that act in an antigen-independent manner to provide a secondary or co-stimulatory signal (secondary cytoplasmic signaling sequences).

Primary cytoplasmic signaling sequences regulate primary activation of the TCR complex either in a stimulatory way, or in an inhibitory way. Primary cytoplasmic signaling sequences that act in a stimulatory manner may contain signaling motifs which are known as immunoreceptor tyrosine activation motifs (immunoreceptor tyrosine-based activation motifs) or ITAMs.

Examples of ITAMs containing primary cytoplasmic signaling sequences include those derived from TCR zeta, FcR gamma, FcR beta, CD3 gamma, CD3 delta, CD3 epsilon, CD8, CD22, CD79a, CD79b, and CD66d. It is particularly preferable that the cytoplasmic signaling molecule in the CAR contains a cytoplasmic signaling sequence derived from CD3 zeta.

The cytoplasmic domain of the CAR may be designed to comprise the CD3-zeta signaling domain by itself or combined with any other desired cytoplasmic domains useful in the context of the CAR.

The CD3-zeta signaling domain has the amino acid sequence

RVKFSRSADAPAYKQGQNQLYNELNLGRREEYDVLDKRRGRDPEMGGKPR

RKNPQEGLYNELQKDKMAEAYSEIGMKGERRRGKGHDGLYQGLSTATKDT

YDALHMQALPPR.

The above signaling domain contains 3 ITAMs (immunoreceptor tyrosine-based activation motifs), in particular ITAM1, ITAM2 and ITAM3.

ITAM1 has an amino acid sequence represented by (SEQ ID NO: 1)
APAYKQGQNQLYNELNLGRREEYDVLDKR.

ITAM2 has an amino acid sequence represented by (SEQ ID NO: 2)
PRRKNPQEGLYNELQKDKMAEAYSEIGM.

ITAM3 has an amino acid sequence represented by (SEQ ID NO: 3)
ERRRGKGHDGLYQGLSTATKDTYDALHMQ.

In one aspect, the present invention relates to an isolated alternative intracellular signaling domain of a chimeric antigen receptor (CAR), wherein one or two immunoreceptor tyrosine-based activation motifs (ITAMs) selected from ITAM1, ITAM2, and ITAM3 are substituted with a fragment of the amino acid sequence of integrin beta 3 (ITGB3).

In some embodiments, the alternative intracellular signaling domain of the chimeric antigen receptor (CAR) is characterized in that one immunoreceptor tyrosine-based activation motif (ITAM) selected from ITAM1, ITAM2 and ITAM3 is substituted with a fragment of the amino acid sequence of integrin beta 3 (ITGB3).

In some embodiments, the alternative intracellular signaling domain of the chimeric antigen receptor (CAR) is characterized in that ITAM1 is substituted with ITGB3.

In some embodiments, the alternative intracellular signaling domain of the chimeric antigen receptor (CAR) is characterized in that ITAM2 is substituted with ITGB3.

In some embodiments, the alternative intracellular signaling domain of the chimeric antigen receptor (CAR) is characterized in that ITAM3 is substituted with ITGB3.

In some embodiments, the alternative intracellular signaling domain of the chimeric antigen receptor (CAR) is characterized in that two immunoreceptor tyrosine-based activation motifs (ITAMs) selected from ITAM1, ITAM2 and ITAM3 are substituted with a fragment of the amino acid sequence of integrin beta 3 (ITGB3).

In some embodiments, the alternative intracellular signaling domain of the chimeric antigen receptor (CAR) is characterized in that ITAM2 and ITAM3 are substituted with two ITGB3.

In some embodiments, the alternative intracellular signaling domain of the chimeric antigen receptor (CAR) is characterized in that ITAM1 and ITAM3 are substituted with two ITGB3.

In some embodiments, the alternative intracellular signaling domain of the chimeric antigen receptor (CAR) is characterized in that ITAM1 and ITAM2 are substituted with two ITGB3.

In one aspect, the present invention relates to an isolated alternative intracellular signaling domain of a chimeric antigen receptor (CAR), which includes one or two immunoreceptor tyrosine-based activation motifs (ITAMs) selected from ITAM1, ITAM2 and ITAM3, and one or two fragments of the amino acid sequence of integrin beta 3 (ITGB3), wherein the total number of ITAMs and ITGB3 is three.

In some embodiments, the alternative intracellular signaling domain of the chimeric antigen receptor (CAR) is characterized in that it includes two immunoreceptor tyrosine-based activation motifs (ITAMs) selected from ITAM1, ITAM2 and ITAM3 and one fragment of the amino acid sequence of integrin beta 3 (ITGB3).

In some embodiments, the alternative intracellular signaling domain of the chimeric antigen receptor (CAR) is characterized in that it includes ITAM2, ITAM3 and ITGB3.

In some embodiments, the alternative intracellular signaling domain includes ITAM1, ITAM3 and ITGB3.

In some embodiments, the alternative intracellular signaling domain of the chimeric antigen receptor (CAR) is characterized in that it includes ITAM1, ITAM2 and ITGB3.

In some embodiments, the alternative intracellular signaling domain of the chimeric antigen receptor (CAR) is characterized in that it includes one immunoreceptor tyrosine-based activation motif (ITAM) selected from ITAM1, ITAM2 and ITAM3, and two fragments of the amino acid sequence of integrin beta 3 (ITGB3).

In some embodiments, the alternative intracellular signaling domain of the chimeric antigen receptor (CAR) is characterized in that it includes ITAM1 and two fragments of the amino acid sequence of integrin beta 3 (ITGB3).

In some embodiments, the alternative intracellular signaling domain of the chimeric antigen receptor (CAR) is characterized in that it includes ITAM2 and two fragments of the amino acid sequence of integrin beta 3 (ITGB3).

In some embodiments, the alternative intracellular signaling domain of the chimeric antigen receptor (CAR) is characterized in that it includes ITAM3 and two fragments of the amino acid sequence of integrin beta 3 (ITGB3).

In some embodiments, the alternative intracellular signaling domain of the chimeric antigen receptor (CAR) is characterized in that ITGB3 has the amino acid sequence represented by DTANNPLYKEATSTFTNITYRGT SEQ ID NO:4) or the amino acid sequence represented by DTANNPLYKEATSTFTNITYRGT SEQ ID NO:4) with any 1 or 2 conserved substitutions.

In some embodiments, the alternative intracellular signaling domain of the chimeric antigen receptor (CAR) is characterized in that ITGB3 has the amino acid sequence represented by DTANNPLYKEATSTFTNITYRGT (SEQ ID NO: 4) with any 1 conserved substitution.

In some embodiments, the alternative intracellular signaling domain of the chimeric antigen receptor (CAR) is characterized in that ITGB3 has the amino acid sequence represented by DTANNPLYKEATSTFTNITYRGT (SEQ ID NO: 4) with any 2 conserved substitutions.

In some embodiments, the alternative intracellular signaling domain of the chimeric antigen receptor (CAR) is characterized in that ITGB3 has the amino acid sequence represented by DTANNPLYKEATSTFTNITYRGT (SEQ ID NO: 4).

Conserved amino acid substitutions mean the replacement of one amino acid with another amino acid similar in structure. Such a substitution does not cause the properties of ITGB3 to change.

Conserved substitutions are shown in Table A under "preferred substitutions". If such substitutions cause a change in biological activity, then additional significant modifications may be introduced, which are referred to as "Exemplary substitutions" in Table A.

TABLE A

| Original residue | Exemplary substitutions | Preferred substitutions |
| --- | --- | --- |
| Ala (A) | Val; Leu; Ile | Val |
| Arg (R) | Lys; Gln; Asn | Lys |
| Asn (N) | Gln; His; Asp, Lys; Arg | Gln |
| Asp (D) | Glu; Asn | Glu |
| Cys (C) | Ser; Ala | Ser |
| Gln (Q) | Asn; Glu | Asn |
| Glu (E) | Asp; Gln | Asp |
| Gly (G) | Ala | Ala |
| His (H) | Asn; Gln; Lys; Arg | Arg |
| Ile (I) | Leu; Val; Met; Ala; Phe; Norleucine | Leu |
| Leu (L) | Norleucine; Ile; Val; Met; Ala; Phe | Ile |
| Lys (K) | Arg; Gln; Asn | Arg |
| Met (M) | Leu; Phe; Ile | Leu |
| Phe (F) | Trp; Leu; Val; Ile; Ala; Tyr | Tyr |
| Pro (P) | Ala | Ala |
| Ser (S) | Thr | Thr |
| Thr (T) | Val; Ser | Ser |
| Trp (W) | Tyr; Phe | Tyr |
| Tyr (Y) | Trp; Phe; Thr; Ser | Phe |
| Val (V) | Ile; Leu; Met; Phe; Ala; Norleucine | Leu |

In some embodiments, the alternative intracellular signaling domain of the chimeric antigen receptor (CAR) has the amino acid sequence RVKFSRSADAPAYKQGQNQLYNELNLGRREEYDVLDKRR-GRDPEMGGKPRRKNPQEGLYNELQK DKMAEAYSEIGMKGDTANNPLYKEATSTFTNITYRGTALPPR (SEQ ID NO: 5) or has an amino acid sequence that is at least 95% identical to the amino acid sequence of SEQ ID NO: 5 and differs from SEQ ID NO: 5 only in non-conserved amino acid residues.

In some embodiments, the alternative intracellular signaling domain of the chimeric antigen receptor (CAR) has the amino acid sequence RVKFSRSADDTANNPLYKEATSTFTNITYRGTRGRDPEMGGKPRRKNPQEGLYNELQKDKMAEA YSEIGMKGERRRGKGHDGLYQGLSTATKDTYDALHMQALPPR (SEQ ID NO:6) or has an amino acid sequence that is at least 95% identical to the amino acid sequence of SEQ ID NO: 6 and differs from SEQ ID NO: 6 only in non-conserved amino acid residues.

In some embodiments, the alternative intracellular signaling domain of the chimeric antigen receptor (CAR) has the amino acid sequence RVKFSRSADAPAYKQGQNQLYNELNLGRREEYDVLDKRRGRDPEMGGKDTANN-PLYKEATSTFT NITYRGTKGERRRGKGHDGLYQGLSTATKDTYDALHMQALPPR (SEQ ID NO:7) or has an amino acid sequence that is at least 95% identical to the amino acid sequence of SEQ ID NO: 7 and differs from SEQ ID NO: 7 only in non-conserved amino acid residues.

In some embodiments, the alternative intracellular signaling domain of the chimeric antigen receptor (CAR) has the amino acid sequence RVKFSRSADAPAYKQGQNQLYNELNLGRREEYDVLDKRRGRDPEMGGKDTANN-PLYKEATSTFT NITYRGTKGDTANNPLYKEATSTFT-NITYRGTALPPR (SEQ ID NO:8) or has an amino acid sequence that is at least 95% identical to the amino acid sequence of SEQ ID NO: 8 and differs from SEQ ID NO: 8 only in non-conserved amino acid residues.

In some embodiments, the alternative intracellular signaling domain of the chimeric antigen receptor (CAR) has the amino acid sequence RVKFSRSADDTANNPLYKEATSTFTNITYRGTRGRDPEMGGKPRRKNPQEGLYNELQKDKMAEA YSEIGMKGDTANNPLYKEATSTFT-NITYRGTALPPR (SEQ ID NO:9) or has an amino acid sequence that is at least 95% identical to the amino acid sequence of SEQ ID NO: 9 and differs from SEQ ID NO: 9 only in non-conserved amino acid residues.

In some embodiments, the alternative intracellular signaling domain of the chimeric antigen receptor (CAR) has the amino acid sequence RVKFSRSADDTANNPLYKEATSTFTNITYRGTRGRDPEMGGKDTANNPLYKEATSTFTNITYRG TKGERRRGKGHDGLYQGLSTATKDTYDALHMQALPPR (SEQ ID NO:10) or has an amino acid sequence that is at least 95% identical to the amino acid sequence of SEQ ID NO: 10 and differs from SEQ ID NO: 10 only in non-conserved amino acid residues.

Chimeric Antigen Receptor (CAR)

In one aspect, the present invention relates to an isolated chimeric antigen receptor (CAR) comprising the above-mentioned alternative intracellular signaling domain.

In some embodiments, the isolated chimeric antigen receptor (CAR) is characterized in that it comprises:
a) an antigen-binding domain that is specific for a tumor antigen;
b) a transmembrane domain;
c) a costimulatory domain;
d) an alternative intracellular signaling domain.

The present invention relates to a chimeric antigen receptor (CAR) comprising an extracellular and intracellular domain. The extracellular domain comprises a target-specific binding element otherwise referred to as an antigen-binding domain. The intracellular domain or otherwise the cytoplasmic domain comprises a costimulatory signaling region and a zeta chain portion. The costimulatory signaling region refers to a portion of the CAR comprising the intracellular domain of a costimulatory molecule. Costimulatory molecules are cell surface molecules other than antigen receptors or their ligands that are required for an efficient response of lymphocytes to antigen.

Between the extracellular domain and the transmembrane domain of the CAR, or between the cytoplasmic domain and the transmembrane domain of the CAR, there may be incorporated a spacer domain. As used in the present description, the term "spacer domain" typically means any oligo- or polypeptide that functions to link the transmembrane domain to, either the extracellular domain or the cytoplasmic domain in the polypeptide chain. A spacer domain may comprise up to 300 amino acids, preferably 10 to 100 amino acids and most preferably 25 to 50 amino acids.

In one embodiment, the CAR of the invention comprises an extracellular domain comprising an antigen-binding domain, a transmembrane domain, and a cytoplasmic domain.

In one embodiment, the transmembrane domain that naturally is associated with one of the domains in the CAR is used.

In another embodiment, the transmembrane domain can be selected or modified by amino acid substitution to avoid binding of such domains to the transmembrane domains of the same or different membrane surface proteins to minimize interactions with other members of the receptor complex.

Antigen-Binding Domain

The term "antigen-binding domain" of an antibody or "antigen-binding portion" of an antibody or "antigen-binding fragment" (or simply "antibody portion" or "antibody fragment"), as used in this description, refers to one or more fragments of an antibody that retain the capability of specific binding to an antigen. It has been shown that the antigen-binding function of an antibody can be performed by the fragments of a full-size antibody. Examples of binding fragments encompassed by the term "antigen-binding portion" of antibody include:
(i) a Fab fragment, a monovalent fragment consisting of the VL, VH, CL and CH1 domains;
(ii) a F(ab')2 fragment, a bivalent fragment comprising two Fab fragments linked by a disulfide bridge at the hinge region;
(iii) a Fd fragment consisting of VH and CH1 domains;
(iv) a Fv fragment consisting of the VL and VH domains in a single arm of an antibody,
(v) a dAb fragment (Ward et al., (1989) Nature 341:544-546), which consists of a VH/VHH domain; and
(vi) an isolated complementarity determining region (CDR).

In addition, two regions of the Fv fragment, VL and VH, are encoded by different genes, they can be joined using recombinant methods using a synthetic linker that enables to receive them as a single protein chain in which the VL and VH regions pair to form monovalent molecules (known as a single-chain Fv (scFv); see e.g. Bird et al. (1988) Science 242:423-426; and Huston et al. (1988) Proc. Natl. Acad. Sci. USA 85:5879-5883). It is assumed that such single-stranded molecules are also included within the term "antigen-binding portion" of an antibody. These antibody fragments are obtained using conventional techniques known to those skilled in the art, and the fragments are screened in the same manner as are intact antibodies.

The term "variable" refers to the fact that certain portions of the variable domains greatly differ in sequence among antibodies. The V domain mediates antigen binding and determines specificity of a particular antibody for its particular antigen. However, the variability is not evenly distributed across the 110-amino acid span of the variable domains. Instead, the V regions consist of invariant fragments called framework regions (FRs) of 15-30 amino acids separated by shorter regions of extreme variability called "hypervariable regions" or CDR. The variable domains of native heavy and light chains each comprise four FRs, largely adopting a beta-sheet configuration, connected by three hypervariable regions, which form loops connecting, and in some cases forming part of, the beta-sheet structure. The hypervariable regions in each chain are held together in close proximity by the FRs and, with the hypervariable regions from the other chain, contribute to the formation of the antigen-binding site of antibodies.

The term "hypervariable region" as used in the present description refers to the amino acid residues of an antibody which are responsible for antigen binding. The hypervariable region generally comprises amino acid residues from a "complementarity determining region" or "CDR" and/or those residues from a "hypervariable loop".

In certain cases, it may also be desirable to alter one or more CDR amino acid residues so as to improve binding affinity to the target epitope. This is known as "affinity maturation" and may optionally be performed in connection with humanization, for example in situations where humanization of an antibody leads to reduced binding specificity or affinity and it is not possible to sufficiently improve the binding specificity or affinity by back mutations alone. Various affinity maturation methods are known in the art, for example the in vitro scanning saturation mutagenesis method described by Burks et al., Proc Natl Acad Sci USA, 94:412-417 (1997) and the stepwise in vitro affinity maturation method by Wu et al., Proc Natl Acad Sci USA 95:6037 6042 (1998).

The antigen-binding domain of antibody according to the present invention "which binds" a target antigen refers to an antigen-binding domain of antibody which binds the antigen with sufficient affinity such that the antigen-binding domain of antibody can be used as a diagnostic and/or therapeutic agent in targeting a protein or cell or tissue expressing the antigen, and slightly cross-reacts with other proteins. As determined by analytical methods: fluorescence activated cell sorting (FACS), radioimmunoprecipitation assay (RIA) or ELISA, the extent of binding of the antigen-binding domain of antibody to a "non-target" protein is less than about 10% of the binding of the antigen-binding domain of antibody to a particular target protein. With regard to the binding of an antigen-binding domain of antibody to a target molecule, the term "specific binding" or the phrases "specifically binds to" or is "specific for" a particular polypeptide or an epitope on a particular polypeptide target means binding that is distinctly (measurably) different from a non-specific interaction.

In one embodiment, the CAR of the invention comprises a target-specific binding element otherwise referred to as an antigen-binding domain. The choice of domain depends upon the type and number of ligands that define the surface of a target cell. For example, the antigen-binding domain may be chosen to recognize a ligand that acts as a cell surface marker on target cells associated with a particular disease state. Thus, examples of cell surface markers that may act as ligands for the domain of the antigen-binding domain in the CAR of the invention include those associated with malignant cells.

In one embodiment, the CAR of the invention can be engineered to target a tumor antigen of interest by way of engineering a desired antigen-binding domain that specifically binds to an antigen on a tumor cell. In the context of the present invention, "tumor antigen" or "hyperproliferative disorder antigen" or "antigen associated with a hyperproliferative disorder," refers to antigens that are common to specific hyperproliferative disorders such as a malignant neoplasm. The antigens discussed in the present description are merely included by way of example. The list is not intended to be exclusive and further examples will be readily apparent to those of skill in the art.

Tumor antigens are proteins that are produced by tumor cells that elicit an immune response, particularly T-cell mediated immune responses. The selection of the antigen-binding domain of the invention will depend on the particular type of malignant neoplasm to be treated. Tumor antigens are well known in the art and include, for example, a glioma-associated antigen, carcinoembryonic antigen (CEA), β-human chorionic gonadotropin, alphafetoprotein (AFP), lectin-reactive AFP, thyroglobulin, RAGE-1, MN-CA IX, human telomerase reverse transcriptase, RU1, RU2 (AS), intestinal carboxyl esterase, mut hsp70-2, M-CSF, prostase, prostate-specific antigen (PSA), PAP, NY-ESO-1, LAGE-1a, p53, prostein, PSMA, Her2/neu, survivin and telomerase, prostate-carcinoma tumor antigen-1 (PCTA-1), MAGE, ELF2M, neutrophil elastase, ephrin B2, CD22, insulin growth factor (IGF)-I, IGF-II, IGF receptor and mesothelin.

In one embodiment, the tumor antigen comprises one or more antigenic tumor epitopes associated with a malignant tumor. Malignant tumors express a number of proteins that can serve as target antigens for an immune response. These molecules include but are not limited to tissue-specific antigens such as MART-1, tyrosinase and GP 100 in melanoma and prostatic acid phosphatase (PAP) and prostate-specific antigen (PSA) in prostate cancer. Other target molecules belong to the group of transformation-related molecules such as the oncogene HER-2/Neu/ErbB-2. Yet another group of target antigens are onco-fetal antigens such as carcinoembryonic antigen (CEA). In B-cell lymphoma the tumor-specific idiotype immunoglobulin constitutes a truly tumor-specific immunoglobulin antigen that is unique to an individual tumor. B-cell differentiation antigens such as CD19, CD20 and CD37 are other candidates for target antigens in B-cell lyjnphoma. Some of these antigens (CEA, HER-2, CD19, CD20, idiotype) have been used as targets for passive immunotherapy with monoclonal antibodies with limited success.

The type of tumor antigen described in the invention may also be a tumor-specific antigen (TSA) or a tumor-associated antigen (TAA). A TSA is unique to tumor cells and does not occur on other cells in the organism. A TAA antigen is not unique to tumor cells and is also expressed on a normal cell under conditions that prevent the induction of a state of immunologic tolerance to the antigen. The expression of the antigen in a tumor may occur under conditions that enable the immune system to respond to the antigen. TAAs may be antigens that are expressed on normal cells during fetal development when the immune system is immature and unable to respond or they may be antigens that are normally present at extremely low levels on normal cells but which are expressed at much higher levels on tumor cells.

Non-limiting examples of TSA or TAA antigens include the following: differentiation antigens such as MART-1/MelanA (MART-1), gp100 (Pmel 17), tyrosinase, TRP-1, TRP-2 and tumor-specific multilineage antigens such as MAGE-1, MAGE-3, BAGE, GAGE-1, GAGE-2, p15; overexpressed embryonic antigens such as CEA; overexpressed oncogenes and mutated tumor-suppressor genes such as p53, Ras, HER-2/neu; unique tumor antigens resulting from chromosomal translocations; such as BCR-ABL, E2A-PRL, H4-RET, IGH-IGK, MYL-RAR; and viral antigens, such as the Epstein Barr virus antigens EBVA and the human papillomavirus (HPV) antigens E6 and E7. Other large, protein-based antigens include TSP-180, MAGE-4, MAGE-5, MAGE-6, RAGE, NY-ESO, p185erbB2, p180erbB-3, c-met, nm-23H1, PSA, TAG-72, CA 19-9, CA 72-4, CAM 17.1, NuMa, K-ras, beta-catenin, CDK4, Mum-1, p15, p16, 43-9F, 5T4, 791Tgp72, alphafetoprotein, beta-HCG, BCA225, BTAA, CA 125, CA 15-3/CA 27.29/BCAA, CA 195, CA 242, CA-50, CAM43, CD68/P1, CO-029, FGF-5, G250, Ga733/EpCAM, HTgp-175, M344, MA-50, MG7-Ag, MOV18, NB/70K, NY-CO-1, RCAS1, SDCCAG16, TA-90/Mac-2 binding protein/cyclophilin C-associated protein, TAAL6, TAG72, TLP, and TPS.

In some embodiments, the isolated chimeric antigen receptor (CAR) is characterized in that the antigen-binding domain is specific for the tumor antigen selected from the group: CD19, CD20, CD123 or BCMA.

In some embodiments, the isolated chimeric antigen receptor (CAR) is characterized in that the antigen-binding domain is specific for the CD19 tumor antigen.

In some embodiments, the isolated chimeric antigen receptor (CAR) is characterized in that the antigen-binding domain that is specific for the tumor antigen is Fab or scFv.

In some embodiments, the isolated chimeric antigen receptor (CAR) is characterized in that the antigen-binding domain that is specific for the tumor antigen is scFv.

In some embodiments, the isolated chimeric antigen receptor (CAR) is characterized in that the antigen-binding domain that is specific for the CD19 tumor antigen has the amino acid sequence represented by DIQMTQTTSSL-SASLGDRVTISCRASQDISKYLNWYQQKPDGTVK LLIYHTSRLHSGVPSRFSG SGSGTDYSLTISNLE QE DIATYFCQQGNTLPYTFGGGTKLEITGSTSGSGKPG-SGEGSTKGEVK LQESGPGLVAPSQSLSVTCTVSGVS-LPDYGVSWIRQPPRKGLEWLGVIWGSETTYYN-SALKSRL TIIKDNSKSQVFLKMNSLQTDDTAIYY-CAKHYYYGGSYAMDYWGQGTSVTVSS (SEQ ID NO: 11) or has an amino acid sequence that is at least 95% identical to the amino acid sequence of SEQ ID NO: 11 and differs from SEQ ID NO: 11 only in non-conserved amino acid residues.

The antigen-binding domain with the amino acid sequence of SEQ ID NO: 11 consists of:
  a) a light chain variable domain with the amino acid sequence

DIQMTQTTSSLSASLGDRVTISCRASQDISKYLNWYQQKPDGTVKLLIYH

TSRLHSGVPSRFSGSGSGTDYSLTISNLEQEDIATYFCQQGNTLPYTFGG

GTKLEIT;

b) a linker with the amino acid sequence GST-SGSGKPGSGEGSTKG.

c) a heavy chain variable domain with the amino acid sequence

EVKLQESGPGLVAPSQSLSVTCTVSGVSLPDYGVSWIRQPPRKGLEWLGV

IWGSETTYYNSALKSRLTIIKDNSKSQVFLKMNSLQTDDTAIYYCAKHYY

YGGSYAMDYWGQGTSVTVSS.

Costimulatory Domain

A costimulatory domain or costimulatory signaling region refers to a portion of a CAR comprising the intracellular domain of a costimulatory molecule. Costimulatory molecule is a cell surface molecule other than an antigen receptor or ligand thereof that are required for an efficient response of lymphocytes to antigen. Examples of such molecules include CD27, CD28, 4-1BB (CD137), OX40, CD30, ICAM-1, CDS, CD40, PD-1, ICOS (CD278), lymphocyte function-associated antigen 1 (LFA-1, CD11a/CD18), CD2, CD7, LIGHT, NKG2C, B7-H3 and a ligand specifically binding to CD83, and the like.

In some embodiments, the isolated chimeric antigen receptor (CAR) is characterized in that the costimulatory domain is a functional signaling domain of a protein selected from the group consisting of OX40, CD2, CD27, CD28, CDS, ICAM-1, LFA-1 (CD11a/CD18), ICOS (CD278) and 4-1BB (CD137).

The cytoplasmic signaling sequences within the cytoplasmic signaling portion of the CAR may be linked to each other in a random or specified order. Optionally, a short oligo- or polypeptide linker, preferably 2 to 10 amino acids in length may form the linkage. In particular, glycine-serine doublet is a suitable linker.

In one embodiment, the cytoplasmic domain of the CAR is engineered to comprise the above-mentioned alternative intracellular signaling domain and the costimulatory signaling domain of CD28.

In another embodiment, the cytoplasmic domain of the CAR is engineered to comprise the above-mentioned alternative intracellular signaling domain and the costimulatory signaling domain of 4-1BB.

In yet another embodiment, the cytoplasmic domain is engineered to comprise the above-mentioned alternative intracellular signaling domain and the costimulatory domain of CD28 and 4-1BB.

In some embodiments, the isolated chimeric antigen receptor (CAR) is characterized in that the costimulatory domain of CD28 has the amino acid sequence represented by (SEQ ID NO: 13)
AAAIEVMYPPPYLDNEKSNGTIIHVKGKHLCPSPLFPGPSKPFWVLVVVG

GVLACYSLLVTVAFIIFWVRSKRSRLLHSDYMNMTPRRPGPTRKHYQPYA

PPRDFAAYRSRVKFSRSADAPAYQQGQNQLYNELNLGRREEYDVLDKRRG

RDPEMGGKPRRKNPQEGLYNELQKDKMAEAYSEIGMKGERRRGKGHDGLY

QGLSTATKDTYDALHMQALPPR.

In some embodiments, the isolated chimeric antigen receptor (CAR) is characterized in that the costimulatory domain of 4-1BB has the amino acid sequence represented by (SEQ ID NO: 14)
KRGRKKLLYIFKQPFMRPVQTTQEEDGCSCRFPEEEEGGCEL.

Transmembrane Domain

With respect to the transmembrane domain, the CAR may be engineered to comprise a transmembrane domain fused to the extracellular domain of the CAR. In one embodiment, the transmembrane domain that naturally is associated with one of the domains in the CAR is used. In some cases, the transmembrane domain may be selected or modified by amino acid substitution to avoid binding of such domains to the transmembrane domains of the same or different membrane surface proteins to minimize interactions with other members of the receptor complex.

The transmembrane domain may be derived either from a natural source or from a synthetic source. Where the source is natural, the domain may be derived from any membrane-bound or transmembrane protein. Transmembrane regions for particular use in the invention may be derived from (i.e. produce to comprise at least the transmembrane regions of) the alpha, beta or zeta chain of the T-cell receptor, CD28, CD3 epsilon, CD45, CD4, CD5, CD8, CD9, CD16, CD22, CD33, CD37, CD64, CD80, CD86, CD134, CD137, CD154. Alternatively, the transmembrane domain may be synthetic, in which case it will comprise predominantly hydrophobic residues such as leucine and valine. Preferably a triplet of phenylalanine, tryptophan and valine will be found at each end of a synthetic transmembrane domain.

In some embodiments, the isolated chimeric antigen receptor (CAR) is characterized in that the transmembrane domain is a transmembrane domain of a protein selected from the group consisting of a T cell receptor-alpha, -beta, or -zeta chains, CD28, CD3 epsilon, CD45, CD4, CD5, CD8, CD9, CD16, CD22, CD33, CD37, CD64, CD80, CD86, CD134, CD137 and CD154.

In some embodiments, the isolated chimeric antigen receptor (CAR) is characterized in that the transmembrane domain is CD8.

In some embodiments, the isolated chimeric antigen receptor (CAR) is characterized in that the transmembrane domain of CD8 has the amino acid sequence IYIWAPLAGTCGVLLLSLVITLYC (SEQ ID NO: 12).

Optionally, a short oligo- or polypeptide linker, preferably between 2 and 10 amino acids in length may form the linkage between the transmembrane domain and the cytoplasmic signaling domain of the CAR. In particular, glycine-serine doublet provides a suitable linker.

In some cases, the transmembrane domain of the CAR according to the invention comprises the hinge domain of CD8. In one embodiment, the hinge domain of CD8 has the amino acid sequence (SEQ ID NO: 35)
TTTPAPRPPTPAPTIASQPLSLRPEACRPAAGGAVHTRGLDFACD.

In some embodiments, the isolated chimeric antigen receptor (CAR) is characterized in that it further comprises a leader sequence.

In some embodiments, the isolated chimeric antigen receptor (CAR) has an amino acid sequence that is represented by an amino acid sequence selected from the group: SEQ ID NO:15, 16, 17, 18, 19, 20, 21, 22, 23, 24, 25 or 26, or has an amino acid sequence that is at least 95% identical to an amino acid sequence selected from the group: SEQ ID NO:15, 16, 17, 18, 19, 20, 21, 22, 23, 24, 25 or 26, and differs from an amino acid sequence selected from the group: SEQ ID NO:15, 16, 17, 18, 19, 20, 21, 22, 23, 24, 25 or 26, only in non-conserved amino acid residues.

The chimeric antigen receptor 19CAR-T-CD28-altcd3zeta (ITGB3-ITAM2-ITAM3) has the amino acid sequence (SEQ ID NO: 15)
MLLLVTSLLLCELPHPAFLLIPDIQMTQTTSSLSASLGDRVTISCRASQD

ISKYLNWYQQKPDGTVKLLIYHTSRLHSGVPSRFSGSGSGTDYSLTISNL

EQEDIATYFCQQGNTLPYTFGGGTKLEITGSTSGSGKPGSGEGSTKGEVK

LQESGPGLVAPSQSLSVTCTVSGVSLPDYGVSWIRQPPRKGLEWLGVIWG

SETTYYNSALKSRLTIIKDNSKSQVFLKMNSLQTDDTAIYYCAKHYYYGG

SYAMDYWGQGTSVTVSSTTTPAPRPPTPAPTIASQPLSLRPEACRPAAGG

AVHTRGLDFACDIYIWAPLAGTCGVLLLSLVITLYCAAAIEVMYPPPYLD

NEKSNGTIIHVKGKHLCPSPLFPGPSKPFWVLVVVGGVLACYSLLVTVAF

IIFWVRSKRSRLLHSDYMNMTPRRPGPTRKHYQPYAPPRDFAAYRSRVKF

SRSADAPAYQQGQNQLYNELNLGRREEYDVLDKRRGRDPEMGGKPRRKNP

QEGLYNELQKDKMAEAYSEIGMKGERRRGKGHDGLYQGLSTATKDTYDAL

HMQALPPRRVKFSRSADDTANNPLYKEATSTFTNITYRGTRGRDPEMGGK

PRRKNPQEGLYNELQKDKMAEAYSEIGMKGERRRGKGHDGLYQGLSTATK

DTYDALHMQALPPRGSAAA.

The chimeric antigen receptor 19CAR-T-CD28-altcd3zeta (ITAM1-ITGB3-ITAM3) has the amino acid sequence (SEQ ID NO: 16)
MLLLVTSLLLCELPHPAFLLIPDIQMTQTTSSLSASLGDRVTISCRASQD

ISKYLNWYQQKPDGTVKLLIYHTSRLHSGVPSRFSGSGSGTDYSLTISNL

EQEDIATYFCQQGNTLPYTFGGGTKLEITGSTSGSGKPGSGEGSTKGEVK

LQESGPGLVAPSQSLSVTCTVSGVSLPDYGVSWIRQPPRKGLEWLGVIWG

SETTYYNSALKSRLTIIKDNSKSQVFLKMNSLQTDDTAIYYCAKHYYYGG

SYAMDYWGQGTSVTVSSTTTPAPRPPTPAPTIASQPLSLRPEACRPAAGG

AVHTRGLDFACDIYIWAPLAGTCGVLLLSLVITLYCAAAIEVMYPPPYLD

NEKSNGTIIHVKGKHLCPSPLFPGPSKPFWVLVVVGGVLACYSLLVTVAF

IIFWVRSKRSRLLHSDYMNMTPRRPGPTRKHYQPYAPPRDFAAYRSRVKF

SRSADAPAYQQGQNQLYNELNLGRREEYDVLDKRRGRDPEMGGKPRRKNP

QEGLYNELQKDKMAEAYSEIGMKGERRRGKGHDGLYQGLSTATKDTYDAL

HMQALPPRRVKFSRSADAPAYKQGQNQLYNELNLGRREEYDVLDKRRGRD

PEMGGKDTANNPLYKEATSTFTNITYRGTKGERRRGKGHDGLYQGLSTAT

KDTYDALHMQALPPRGSAAA.

The chimeric antigen receptor 19CAR-T-CD28-altcd3zeta (ITAM1-ITAM2-ITGB3) has the amino acid sequence (SEQ ID NO: 17)
MLLLVTSLLLCELPHPAFLLIPDIQMTQTTSSLSASLGDRVTISCRASQD
ISKYLNWYQQKPDGTVKLLIYHTSRLHSGVPSRFSGSGSGTDYSLTISNL
EQEDIATYFCQQGNTLPYTFGGGTKLEITGSTSGSGKPGSGEGSTKGEVK
LQESGPGLVAPSQSLSVTCTVSGVSLPDYGVSWIRQPPRKGLEWLGVIWG
SETTYYNSALKSRLTIIKDNSKSQVFLKMNSLQTDDTAIYYCAKHYYYGG
SYAMDYWGQGTSVTVSSTTTPAPRPPTPAPTIASQPLSLRPEACRPAAGG
AVHTRGLDFACDIYIWAPLAGTCGVLLLSLVITLYCAAAIEVMYPPPYLD
NEKSNGTIIHVKGKHLCPSPLFPGPSKPFWVLVVVGGVLACYSLLVTVAF
IIFWVRSKRSLLHSDYMNMTPRRPGPTRKHYQPYAPPRDFAAYRSRVKF
SRSADAPAYQQGQNQLYNELNLGRREEYDVLDKRRGRDPEMGGKPRRKNP
QEGLYNELQKDKMAEAYSEIGMKGERRRGKGHDGLYQGLSTATKDTYDAL
HMQALPPRRVKFSRSADAPAYKQGQNQLYNELNLGRREEYDVLDKRRGRD
PEMGGKPRRKNPQEGLYNELQKDKMAEAYSEIGMKGDTANNPLYKEATST
FTNITYRGTALPPRGSAAA.

The chimeric antigen receptor 19CAR-T-CD28-altcd3zeta (ITGB3-ITGB3-ITAM3) has the amino acid sequence (SEQ ID NO: 18)
MLLLVTSLLLCELPHPAFLLIPDIQMTQTTSSLSASLGDRVTISCRASQD
ISKYLNWYQQKPDGTVKLLIYHTSRLHSGVPSRFSGSGSGTDYSLTISNL
EQEDIATYFCQQGNTLPYTFGGGTKLEITGSTSGSGKPGSGEGSTKGEVK
LQESGPGLVAPSQSLSVTCTVSGVSLPDYGVSWIRQPPRKGLEWLGVIWG
SETTYYNSALKSRLTIIKDNSKSQVFLKMNSLQTDDTAIYYCAKHYYYGG
SYAMDYWGQGTSVTVSSTTTPAPRPPTPAPTIASQPLSLRPEACRPAAGG
AVHTRGLDFACDIYIWAPLAGTCGVLLLSLVITLYCAAAIEVMYPPPYLD
NEKSNGTIIHVKGKHLCPSPLFPGPSKPFWVLVVVGGVLACYSLLVTVAF
IIFWVRSKRSLLHSDYMNMTPRRPGPTRKHYQPYAPPRDFAAYRSRVKF
SRSADAPAYQQGQNQLYNELNLGRREEYDVLDKRRGRDPEMGGKPRRKNP
QEGLYNELQKDKMAEAYSEIGMKGERRRGKGHDGLYQGLSTATKDTYDAL
HMQALPPRRVKFSRSADDTANNPLYKEATSTFTNITYRGTRGRDPEMGGK
DTANNPLYKEATSTFTNITYRGTKGERRRGKGHDGLYQGLSTATKDTYDA
LHMQALPPRGSAAA.

The chimeric antigen receptor 19CAR-T-CD28-altcd3zeta (ITAM1-ITGB3-ITGB3) has the amino acid sequence (SEQ ID NO: 19)
MLLLVTSLLLCELPHPAFLLIPDIQMTQTTSSLSASLGDRVTISCRASQD
ISKYLNWYQQKPDGTVKLLIYHTSRLHSGVPSRFSGSGSGTDYSLTISNL
EQEDIATYFCQQGNTLPYTFGGGTKLEITGSTSGSGKPGSGEGSTKGEVK
LQESGPGLVAPSQSLSVTCTVSGVSLPDYGVSWIRQPPRKGLEWLGVIWG
SETTYYNSALKSRLTIIKDNSKSQVFLKMNSLQTDDTAIYYCAKHYYYGG
SYAMDYWGQGTSVTVSSTTTPAPRPPTPAPTIASQPLSLRPEACRPAAGG
AVHTRGLDFACDIYIWAPLAGTCGVLLLSLVITLYCAAAIEVMYPPPYLD
NEKSNGTIIHVKGKHLCPSPLFPGPSKPFWVLVVVGGVLACYSLLVTVAF
IIFWVRSKRSLLHSDYMNMTPRRPGPTRKHYQPYAPPRDFAAYRSRVKF
SRSADAPAYQQGQNQLYNELNLGRREEYDVLDKRRGRDPEMGGKPRRKNP
QEGLYNELQKDKMAEAYSEIGMKGERRRGKGHDGLYQGLSTATKDTYDAL
HMQALPPRRVKFSRSADAPAYKQGQNQLYNELNLGRREEYDVLDKRRGRD
PEMGGKDTANNPLYKEATSTFTNITYRGTKGDTANNPLYKEATSTFTNIT
YRGTALPPRGSAAA.

The chimeric antigen receptor 19CAR-T-CD28-altcd3zeta (ITGB3-ITAM2-ITGB3) has the amino acid sequence (SEQ ID NO: 20)
MLLLVTSLLLCELPHPAFLLIPDIQMTQTTSSLSASLGDRVTISCRASQD
ISKYLNWYQQKPDGTVKLLIYHTSRLHSGVPSRFSGSGSGTDYSLTISNL
EQEDIATYFCQQGNTLPYTFGGGTKLEITGSTSGSGKPGSGEGSTKGEVK
LQESGPGLVAPSQSLSVTCTVSGVSLPDYGVSWIRQPPRKGLEWLGVIWG
SETTYYNSALKSRLTIIKDNSKSQVFLKMNSLQTDDTAIYYCAKHYYYGG
SYAMDYWGQGTSVTVSSTTTPAPRPPTPAPTIASQPLSLRPEACRPAAGG
AVHTRGLDFACDIYIWAPLAGTCGVLLLSLVITLYCAAAIEVMYPPPYLD
NEKSNGTIIHVKGKHLCPSPLFPGPSKPFWVLVVVGGVLACYSLLVTVAF
IIFWVRSKRSLLHSDYMNMTPRRPGPTRKHYQPYAPPRDFAAYRSRVKF
SRSADAPAYQQGQNQLYNELNLGRREEYDVLDKRRGRDPEMGGKPRRKNP
QEGLYNELQKDKMAEAYSEIGMKGERRRGKGHDGLYQGLSTATKDTYDAL
HMQALPPRRVKFSRSADDTANNPLYKEATSTFTNITYRGTRGRDPEMGGK
PRRKNPQEGLYNELQKDKMAEAYSEIGMKGDTANNPLYKEATSTFTNITY
RGTALPPRGSAAA.

The chimeric antigen receptor 19CAR-T-41bb-altcd3zeta (ITGB3-ITAM2-ITAM3) has the amino acid sequence (SEQ ID NO: 21)
MLLLVTSLLLCELPHPAFLLIPDIQMTQTTSSLSASLGDRVTISCRASQD
ISKYLNWYQQKPDGTVKLLIYHTSRLHSGVPSRFSGSGSGTDYSLTISNL
EQEDIATYFCQQGNTLPYTFGGGTKLEITGSTSGSGKPGSGEGSTKGEVK
LQESGPGLVAPSQSLSVTCTVSGVSLPDYGVSWIRQPPRKGLEWLGVIWG
SETTYYNSALKSRLTIIKDNSKSQVFLKMNSLQTDDTAIYYCAKHYYYGG
SYAMDYWGQGTSVTVSSTTTPAPRPPTPAPTIASQPLSLRPEACRPAAGG
AVHTRGLDFACDIYIWAPLAGTCGVLLLSLVITLYCKRGRKKLLYIFKQP
FMRPVQTTQEEDGCSCRFPEEEEGGCELRVKFSRSADDTANNPLYKEATS
TFTNITYRGTRGRDPEMGGKPRRKNPQEGLYNELQKDKMAEAYSEIGMKG
ERRRGKGHDGLYQGLSTATKDTYDALHMQALPPRGSAAA.

The chimeric antigen receptor 19CAR-T-41bb-altcd3zeta (ITAM1-ITGB3-ITAM3) has the amino acid sequence (SEQ ID NO: 22)
MLLLVTSLLLCELPHPAFLLIPDIQMTQTTSSLSASLGDRVTISCRASQD

ISKYLNWYQQKPDGTVKLLIYHTSRLHSGVPSRFSGSGSGTDYSLTISNL

EQEDIATYFCQQGNTLPYTFGGGTKLEITGSTSGSGKPGSGEGSTKGEVK

LQESGPGLVAPSQSLSVTCTVSGVSLPDYGVSWIRQPPRKGLEWLGVIWG

SETTYYNSALKSRLTIIKDNSKSQVFLKMNSLQTDDTAIYYCAKHYYYGG

SYAMDYWGQGTSVTVSSTTTPAPRPPTPAPTIASQPLSLRPEACRPAAGG

AVHTRGLDFACDIYIWAPLAGTCGVLLLSLVITLYCKRGRKKLLYIFKQP

FMRPVQTTQEEDGCSCRFPEEEEGGCELRVKFSRSADAPAYKQGQNQLYN

ELNLGRREEYDVLDKRRGRDPEMGGKDTANNPLYKEATSTFTNITYRGTK

GERRRGKGHDGLYQGLSTATKDTYDALHMQALPPRGSAAA.

The chimeric antigen receptor 19CAR-T-41bb-altcd3zeta (ITAM1-ITAM2-ITGB3) has the amino acid sequence (SEQ ID NO: 23)
MLLLVTSLLLCELPHPAFLLIPDIQMTQTTSSLSASLGDRVTISCRASQD

ISKYLNWYQQKPDGTVKLLIYHTSRLHSGVPSRFSGSGSGTDYSLTISNL

EQEDIATYFCQQGNTLPYTFGGGTKLEITGSTSGSGKPGSGEGSTKGEVK

LQESGPGLVAPSQSLSVTCTVSGVSLPDYGVSWIRQPPRKGLEWLGVIWG

SETTYYNSALKSRLTIIKDNSKSQVFLKMNSLQTDDTAIYYCAKHYYYGG

SYAMDYWGQGTSVTVSSTTTPAPRPPTPAPTIASQPLSLRPEACRPAAGG

AVHTRGLDFACDIYIWAPLAGTCGVLLLSLVITLYCKRGRKKLLYIFKQP

FMRPVQTTQEEDGCSCRFPEEEEGGCELRVKFSRSADAPAYKQGQNQLYN

ELNLGRREEYDVLDKRRGRDPEMGGKPRRKNPQEGLYNELQKDKMAEAYS

EIGMKGDTANNPLYKEATSTFTNITYRGTALPPRGSAAA.

The chimeric antigen receptor 19CAR-T-41bb-altcd3zeta (ITGB3-ITGB3-ITAM3) has the amino acid sequence (SEQ ID NO: 24)
MLLLVTSLLLCELPHPAFLLIPDIQMTQTTSSLSASLGDRVTISCRASQD

ISKYLNWYQQKPDGTVKLLIYHTSRLHSGVPSRFSGSGSGTDYSLTISNL

EQEDIATYFCQQGNTLPYTFGGGTKLEITGSTSGSGKPGSGEGSTKGEVK

LQESGPGLVAPSQSLSVTCTVSGVSLPDYGVSWIRQPPRKGLEWLGVIWG

SETTYYNSALKSRLTIIKDNSKSQVFLKMNSLQTDDTAIYYCAKHYYYGG

SYAMDYWGQGTSVTVSSTTTPAPRPPTPAPTIASQPLSLRPEACRPAAGG

AVHTRGLDFACDIYIWAPLAGTCGVLLLSLVITLYCKRGRKKLLYIFKQP

FMRPVQTTQEEDGCSCRFPEEEEGGCELRVKFSRSADDTANNPLYKEATS

TFTNITYRGTRGRDPEMGGKDTANNPLYKEATSTFTNITYRGTKGERRRG

KGHDGLYQGLSTATKDTYDALHMQALPPRGSAAA.

The chimeric antigen receptor 19CAR-T-41bb-altcd3zeta (ITAM1-ITGB3-ITGB3) has the amino acid sequence (SEQ ID NO: 25)
MLLLVTSLLLCELPHPAFLLIPDIQMTQTTSSLSASLGDRVTISCRASQD

ISKYLNWYQQKPDGTVKLLIYHTSRLHSGVPSRFSGSGSGTDYSLTISNL

EQEDIATYFCQQGNTLPYTFGGGTKLEITGSTSGSGKPGSGEGSTKGEVK

LQESGPGLVAPSQSLSVTCTVSGVSLPDYGVSWIRQPPRKGLEWLGVIWG

SETTYYNSALKSRLTIIKDNSKSQVFLKMNSLQTDDTAIYYCAKHYYYGG

SYAMDYWGQGTSVTVSSTTTPAPRPPTPAPTIASQPLSLRPEACRPAAGG

AVHTRGLDFACDIYIWAPLAGTCGVLLLSLVITLYCKRGRKKLLYIFKQP

FMRPVQTTQEEDGCSCRFPEEEEGGCELRVKFSRSADAPAYKQGQNQLYN

ELNLGRREEYDVLDKRRGRDPEMGGKDTANNPLYKEATSTFTNITYRGTK

GDTANNPLYKEATSTFTNITYRGTALPPRGSAAA.

The chimeric antigen receptor 19CAR-T-41bb-altcd3zeta (ITGB3-ITAM2-ITGB3) has the amino acid sequence (SEQ ID NO: 26)
MLLLVTSLLLCELPHPAFLLIPDIQMTQTTSSLSASLGDRVTISCRASQD

ISKYLNWYQQKPDGTVKLLIYHTSRLHSGVPSRFSGSGSGTDYSLTISNL

EQEDIATYFCQQGNTLPYTFGGGTKLEITGSTSGSGKPGSGEGSTKGEVK

LQESGPGLVAPSQSLSVTCTVSGVSLPDYGVSWIRQPPRKGLEWLGVIWG

SETTYYNSALKSRLTIIKDNSKSQVFLKMNSLQTDDTAIYYCAKHYYYGG

SYAMDYWGQGTSVTVSSTTTPAPRPPTPAPTIASQPLSLRPEACRPAAGG

AVHTRGLDFACDIYIWAPLAGTCGVLLLSLVITLYCKRGRKKLLYIFKQP

FMRPVQTTQEEDGCSCRFPEEEEGGCELRVKFSRSADDTANNPLYKEATS

TFTNITYRGTRGRDPEMGGKPRRKNPQEGLYNELQKDKMAEAYSEIGMKG

DTANNPLYKEATSTFTNITYRGTALPPRGSAAA.

Nucleic Acid Molecules

The terms "nucleic acid", "nucleic sequence", "nucleic acid sequence", "polynucleotide", "oligonucleotide", "polynucleotide sequence" and "nucleotide sequence", used interchangeably in the present description, mean a precise sequence of nucleotides, modified or not, determining a fragment or a region of a nucleic acid, containing unnatural nucleotides or not, and being either a double-strand DNA or RNA, a single-stranded DNA or RNA, or transcription products of said DNAs.

It should also be included here that the present invention does not relate to nucleotide sequences in their natural chromosomal environment, i.e. in a natural state. The sequences of the present invention have been isolated and/or purified, i.e. they were sampled directly or indirectly, for example by a copy, their environment having been at least partially modified. Thus, isolated nucleic acids obtained by recombinant genetics, by means, for example, of host cells, or obtained by chemical synthesis should also be mentioned here.

An "isolated" nucleic acid molecule is one which is identified and separated from at least one nucleic acid molecule-impurity, which the former is typically bound to in the natural source of the nucleic acid of protein (polypeptide). An isolated nucleic acid molecule is different from the form or set in which it is found under natural conditions. Thus, an isolated nucleic acid molecule is different from a nucleic acid molecule that exists in cells under natural conditions. An isolated nucleic acid molecule however includes a nucleic acid molecule located in cells in which the protein (polypeptide) is normally expressed, for example, if the nucleic acid molecule has a chromosomal localization that is different from its localization in cells under natural conditions.

Unless otherwise indicated, the term nucleotide sequence encompasses its complement. Thus, a nucleic acid having a particular sequence should be understood as one which encompasses the complementary strand thereof with the complementary sequence thereof.

In the context of the present invention, the following abbreviations for the commonly occurring nucleic acid bases are used. "A" is for adenine, "C" is for cytosine, "G" is for guanine, "T" is for thymine (5-methyluracil), it is not present in RNA, it is present in DNA instead of uracil, and "U" is for uracil (it is present in RNA instead of thymine).

Unless otherwise specified, a "nucleotide sequence encoding an amino acid sequence" includes all nucleotide sequences that are degenerate versions of each other and that encode the same amino acid sequence. The phrase nucleotide sequence that encodes a protein or an RNA may also include introns to the extent that the nucleotide sequence encoding the protein may in some version contain introns.

"Encoding" refers to the inherent property of specific sequences of nucleotides in a polynucleotide, such as a gene, a cDNA, or an mRNA, to serve as templates for synthesis of other polymers and macromolecules in biological processes having either a defined sequence of nucleotides (i.e., rRNA, tRNA and mRNA) or a defined sequence of amino acids and the biological properties resulting therefrom. Thus, a gene encodes a protein if transcription and translation of mRNA corresponding to that gene results in the production of the protein in a cell or other biological system. Both the coding strand, the nucleotide sequence of which is identical to the mRNA sequence and is typically provided in sequence listings, and the non-coding strand, used as the template for transcription of a gene or cDNA, may be referred to as encoding the protein or other product of that gene or cDNA.

The nucleic acid sequences encoding the desired molecules can be obtained using recombinant methods known in the art, such as, for example by screening libraries from cells expressing the gene, by deriving the gene from a vector known to include same, or by isolating directly from cells and tissues containing same, using standard techniques. Alternatively, the gene of interest may be more typically produced synthetically, rather than cloned.

In one aspect, the present invention relates to an isolated nucleic acid that encodes the above-mentioned alternative intracellular signaling domain.

In one aspect, the present invention relates to an isolated nucleic acid that encodes the above-mentioned isolated chimeric antigen receptor (CAR) comprising the above-mentioned alternative intracellular signaling domain.

Vector

The term "vector" as used herein means a nucleic acid molecule capable of transporting another nucleic acid to which it has been linked. In some embodiments, the vector is a plasmid, i.e., a circular double stranded molecule of DNA into which additional DNA segments may be incorporated by means of enzymatic ligation reaction. In some embodiments, the vector is a viral vector, wherein additional DNA segments may be incorporated into the viral genome by means of the enzymatic ligation reaction. In some embodiments, vectors are capable of autonomous replication in a genetically modified cell into which they are introduced (e.g. bacterial vectors having a bacterial origin site of replication and episomal mammalian vectors). In further embodiments, vectors (e.g. non-episomal mammalian vectors) can be integrated into the genome of a host cell upon introduction into a host cell, and thereby are replicated along with the host gene. Moreover, certain vectors are capable of directing the expression of genes to which they are operably linked. Such vectors are referred to herein as "recombinant expression vectors" (or simply, "expression vectors").

The term "expression control sequence" as used in the present description refers to polynucleotide sequences that are necessary to effect the expression and processing of coding sequences into which they are incorporated by means of the enzymatic ligation reaction. Expression control sequences include appropriate transcription initiation, termination, promoter and enhancer sequences; efficient RNA processing signals such as splicing and polyadenylation signals; sequences that stabilize cytoplasmic mRNA; sequences that enhance translation efficiency (i.e., Kozak consensus sequence); sequences that enhance protein stability; and when desired, sequences that enhance protein secretion. The nature of such control sequences differs depending upon the host organism. Eukaryotic cells include promoters, polyadenylation signals, and enhancers. The term "control sequences" is intended to include at least all components, the presence of which is essential for expression and processing, and can also include additional components, the presence of which is advantageous, for example, leader sequences and fusion partner sequences.

Nucleic acid is "operably linked" when it is placed into a functional relationship with another nucleic acid sequence. For example, DNA for a presequence or secretory leader sequence is operably linked to DNA for a polypeptide if it is expressed as a preprotein that participates in the secretion of the polypeptide; a promoter or enhancer is operably linked to a coding sequence if it affects the transcription of the sequence; a ribosome binding site is operably linked to a coding sequence if it is positioned so as to facilitate translation. Typically, "operably linked" means that the DNA sequences being linked are contiguous, and, in the case of a secretory leader, contiguous and in reading frame. However, enhancers do not have to be contiguous.

By "delivery vector" or "delivery vectors" is intended any delivery vector which can be used in the present invention to put into cell contact (i.e. "contacting") or deliver inside cells or subcellular compartments (i.e. "introducing") agents/chemicals and molecules (proteins or nucleic acids) needed in the present invention. It includes, but is not limited to liposomal delivery vectors, viral delivery vectors, drug delivery vectors, chemical carriers, polymeric carriers, lipoplexes, polyplexes, dendrimers, microbubbles (ultrasound contrast agents), nanoparticles, emulsions or other appropriate transfer vectors. These delivery vectors allow delivery of molecules, chemicals, macromolecules (genes, proteins), or other vectors such as plasmids, peptides. In these cases, delivery vectors are molecule carriers. By "delivery vector" or "delivery vectors" is also intended delivery methods to perform transfection.

"Expression vector" refers to a vector comprising a recombinant polynucleotide comprising expression control sequences operably linked to a nucleotide sequence to be expressed. An expression vector comprises appropriate cis-acting elements for expression; other elements for expression can be supplied by the elements of a genetically modified cell or in an in vitro expression system. Expression vectors include all those known in the art, such as cosmids, plasmids (e.g., naked or contained in liposomes) and viruses (e.g., lentiviruses, retroviruses, adenoviruses, and adeno-associated viruses) that incorporate the recombinant polynucleotide.

Briefly, expression of a natural or synthetic nucleic acids encoding a CAR is typically achieved by operably linking a nucleic acid encoding the CAR polypeptide or a portion thereof to a promoter and incorporating the construct into an expression vector. The vectors may be suitable for replication and integration into eukaryotic cells. Typical cloning vectors contain transcriptional and translational terminators, initiation sequences, and promoters useful for regulating expression of the desired nucleic acid sequence.

As used in the present description, the term "promoter" is defined as a DNA sequence recognized by the synthetic machinery of the cell, or introduced synthetic machinery, required to initiate the specific transcription of a polynucleotide sequence.

As used in the present description, the term "promoter/regulatory sequence" means a nucleic acid sequence which is required for expression of a gene product operably linked to the promoter/regulatory sequence. In some instances, this sequence may be the core promoter sequence and in other instances, this sequence may also include an enhancer sequence and other regulatory elements which are required for expression of the gene product. The promoter/regulatory sequence may, for example, be one which expresses the gene product in a tissue specific manner.

A "constitutive" promoter is a nucleotide sequence which, when operably linked with a polynucleotide which encodes or specifies a gene product, causes the gene product to be produced in a cell under most or all physiological conditions of the cell.

An "inducible" promoter is a nucleotide sequence which, when operably linked with a polynucleotide which encodes or specifies a gene product, causes the gene product to be produced in a cell substantially only when an inducer which corresponds to the promoter is present in the cell.

A "tissue-specific" promoter is a nucleotide sequence which, when operably linked with a polynucleotide which encodes or specifies a gene product, causes the gene product to be produced in a cell substantially only when the cell is a cell of a tissue type corresponding to the promoter.

One example of a suitable promoter is the immediate early cytomegalovirus (CMV) promoter sequence. This promoter sequence is a strong constitutive promoter sequence capable of driving high levels of expression of any polynucleotide sequence operably linked thereto. Another example of a suitable promoter is the elongation factor 1 alpha (EF-1a) promoter. However, other constitutive promoter sequences may also be used, including, but not limited to, the simian virus 40 (SV40) early promoter, mouse mammary tumor virus (MMTV), human immunodeficiency virus (HIV) long terminal repeat (LTR) promoter, MoMuLV promoter, an avian leukemia virus promoter, an Epstein-Barr virus immediate early promoter, a Rous sarcoma virus promoter, as well as human gene promoters such as, but not limited to, an actin gene promoter, a myosin gene promoter, a hemoglobin gene promoter, and a creatine kinase gene promoter. Further, the invention should not be limited to the use of constitutive promoters. Inducible promoters are also contemplated as part of the invention. The use of an inducible promoter provides a molecular switch capable of turning on expression of the polynucleotide sequence which it is operatively linked to when such expression is desired, or turning off expression when expression is not desired. Examples of inducible promoters include, but are not limited to, a metallothionine promoter, a glucocorticoid gene promoter, a progesterone gene promoter, and a tetracycline gene promoter.

Additional promoter elements, for example, enhancers, regulate the frequency of transcription initiation. Typically, these are located in the region 30-110 bp upstream of the start site, although a number of promoters have recently been shown to contain functional elements downstream of the start site. The spacing between promoter elements frequently is flexible, so that promoter functioning is preserved when elements are inverted or moved relative to one another. In the thymidine kinase (tk) promoter, the spacing between promoter elements can be increased to 50 bp before activity begins to decline. Depending on the promoter, it appears that individual elements can function either cooperatively or independently to activate transcription.

The present invention relates to a DNA construct comprising CAR sequences, wherein the sequence comprises the sequence of the nucleic acid of an antigen-binding domain operably linked to the sequence of the nucleic acid of an intracellular domain. An example of an intracellular domain that may be used in the CAR according to the invention comprises but not limited to the above-mentioned alternative intracellular signaling domain, costimulatory domain of CD28 and/or 4-1BB, etc.; in some cases, the CAR may comprise any combination of the above-mentioned alternative intracellular signaling domain, costimulatory domain of CD28, costimulatory domain of 4-1BB, etc.

In one embodiment, the CAR according to the invention comprises an anti-CD19 scFv, a hinge and transmembrane domains of human CD8, and a costimulatory domain of 4-1BB, and the above-mentioned alternative intracellular signaling domain.

In one embodiment, the CAR according to the invention comprises an anti-CD19 scFv, a hinge and transmembrane domains of human CD8, and a costimulatory domain of CD28, and the above-mentioned alternative intracellular signaling domain.

The expression constructs of the present invention may also be used for nucleic acid immunization and gene therapy, using standard gene delivery techniques. Methods for gene delivery are known in the art. See, e.g., U.S. Pat. Nos. 5,399,346, 5,580,859, 5,589,466, incorporated by reference herein in their entireties. In another embodiment, the invention relates to a gene therapy vector.

The nucleic acid can be cloned into a number of types of vectors. For example, the nucleic acid can be cloned into a vector including, but not limited to a plasmid, a phagemid, a phage derivative, an animal virus, and a cosmid. Vectors of particular interest include expression vectors, replication vectors, probe generation vectors, and sequencing vectors.

Furthermore, the expression vector may be delivered to a cell in the form of a viral vector. Viral vector technology is well known in the art and is described, for example, in Sambrook et al. (2001, Molecular Cloning: A Laboratory Manual, Cold Spring Harbor Laboratory, New York), and in other virology and molecular biology manuals. Viruses, which are useful as vectors include, but are not limited to, retroviruses, adenoviruses, adeno-associated viruses, herpes viruses, and lentiviruses. In general, a suitable vector contains an origin of replication functional in at least one organism, a promoter sequence, convenient restriction endonuclease sites, and one or more selectable markers (e.g., WO 01/96584; WO 01/29058; and U.S. Pat. No. 6,326,193).

A number of viral based systems have been developed for gene transfer into mammalian cells. For example, retroviruses provide a suitable platform for gene delivery systems. A selected gene can be inserted into a vector and packaged in retroviral particles using techniques known in the art. The recombinant virus can then be isolated and delivered to cells of the subject either in vivo or ex vivo. A number of retroviral systems are known in the art. In some embodiments, adenovirus vectors are used. A number of adenovirus vectors are known in the art. In one embodiment, lentivirus vectors are used.

The present invention also provides vectors in which a DNA of the present invention is inserted. Vectors derived from retroviruses such as the lentivirus are suitable tools to achieve long-term gene transfer since they allow long-term, stable integration of a transgene and its propagation in daughter cells. Lentiviral vectors have the added advantage over vectors derived from onco-retroviruses such as murine leukemia viruses in that they can transduce non-proliferating cells, such as hepatocytes. They also have the added advantage of low immunogenicity.

A "lentivirus" as used herein refers to a genus of the Retroviridae family. Lentiviruses are unique among the retroviruses in being able to infect non-dividing cells; they can deliver a significant amount of genetic information as DNA in the host cell, so they are one of the most efficient methods for implementing a gene delivery vector. HIV, SIV, and FIV are examples of lentiviruses. Vectors derived from lentiviruses offer the means to achieve significant levels of gene transfer in vivo.

In order to assess the expression of a CAR polypeptide or portions thereof, the expression vector to be introduced into a cell can also contain either a selectable marker gene or a reporter gene or both to facilitate identification and selection of expressing cells from the population of cells to be transfected or infected using viral vectors. In other aspects, the selectable marker may carry a separate fragment of DNA and be used in a co-transfection technique. Both selectable markers and reporter genes may be flanked with appropriate regulatory sequences to enable expression in the host cells. Useful selectable markers include, for example, antibiotic-resistance genes, such as neo and the like.

Reporter genes are used for identifying potentially transfected cells and for evaluating the functionality of regulatory sequences. In general, a reporter gene is a gene that is not present in or expressed by the organism or tissue and that encodes a polypeptide whose expression is manifested by some easily detectable property, e.g., enzymatic activity. Expression of the reporter gene is assayed at a suitable time after the DNA has been introduced into the recipient cells. Suitable reporter genes may include genes encoding luciferase, beta-galactosidase, chloramphenicol acetyl transferase, secreted alkaline phosphatase, or the green fluorescent protein gene (e.g., Ui-Tei et al., 2000 FEBS Letters 479: 79-82). Suitable expression systems are well known and may be prepared using known techniques or obtained commercially. In general, the construct with the minimal 5' flanking region showing the highest level of expression of reporter gene is identified as the promoter. Such promoter regions may be linked to a reporter gene and used to evaluate agents for the ability to modulate promoter-driven transcription.

The present invention relates to vectors comprising nucleic acid molecules that encode the above-mentioned chimeric antigen receptor (CAR) according to the invention.

In one aspect, the present invention relates to an expression vector comprising the above-mentioned nucleic acid that encodes the above-mentioned chimeric antigen receptor (CAR) according to the invention.

In one aspect, the present invention relates to a delivery vector comprising the above-mentioned nucleic acid that encodes the above-mentioned chimeric antigen receptor (CAR) according to the invention.

In some embodiments, the vector is selected from the group consisting of DNA, RNA, plasmid, lentiviral vector, adeno-associated viral vector, adenoviral vector, or retroviral vector.

In some embodiments, the vector further comprises a promoter.

In some embodiments, the vector is an in vitro transcribed vector.

In some embodiments, the nucleic acid sequence further comprises a poly(A) sequence.

In some embodiments, the nucleic acid sequence further comprises a 3'UTR.

Host Cells and Methods for Production Thereof

The term "genetically modified cell" (or "recombinant host cell") as used herein refers to a cell into which a recombinant expression vector has been introduced. The present invention relates to "genetically modified cells", which may include, for example, the above vector according to the invention. It should be understood that "genetically modified cell" and "recombinant host cell" refer not only to a particular claimed cell but to the progeny of such a cell as well. Since modifications may occur in succeeding generations due to either mutation or environmental influences, such progeny may not, in fact, be identical to a parental cell; however, such cells are still included within the scope of the term "genetically modified cell" as used herein.

In one aspect, the present invention relates to a method for producing a "genetically modified cell" that comprises the above chimeric antigen receptor (CAR), comprising the transformation of the cell by the above-mentioned method.

Methods for the incorporation and expression of genes in a cell are known in the art. In the context of an expression vector, the vector may be readily inserted into a host cell, e.g., mammalian, bacterial, yeast or insect cell, by any method known in the art. For example, the expression vector can be transfected into a host cell by physical, chemical or biological methods.

Physical methods for introducing a polynucleotide into a host cell include calcium phosphate precipitation, lipofection, particle bombardment, microinjection, electroporation, and the like. Methods for producing cells comprising vectors and/or exogenous nucleic acids are well-known in the art. See, for example, Sambrook et al. (2001, Molecular Cloning: A Laboratory Manual, Cold Spring Harbor Laboratory, New York). The preferred method for introducing a polynucleotide into a host cell is transfection using calcium phosphate.

Biological methods for introducing a polynucleotide of interest into a host cell include the use of DNA and RNA vectors. Viral vectors, and especially retroviral vectors, have become the most widely used method for inserting genes into mammalian cells, e.g., human cells. Other viral vectors can be derived from lentivirus, poxviruses, herpes simplex virus 1, adenoviruses and adeno-associated viruses, and the like. See, for example, U.S. Pat. Nos. 5,350,674 and 5,585,362.

Chemical means for introducing a polynucleotide into a host cell include colloidal dispersion systems, such as macromolecule complexes, nanocapsules, microspheres, beads, and lipid-based systems including oil-in-water emulsions, micelles, mixed micelles, and liposomes. An exemplary colloidal system for use as a delivery vehicle in vitro and in vivo is a liposome (e.g., an artificial membrane vesicle).

In the case where a non-viral delivery system is utilized, an exemplary delivery vehicle is a liposome. The use of lipid formulations is contemplated for the introduction of the nucleic acids into a host cell (in vitro, ex vivo or in vivo). In another aspect, the nucleic acid may be connected to a lipid. The nucleic acid connected to a lipid may be encapsulated in the aqueous interior of a liposome, interspersed within the lipid bilayer of a liposome, attached to a liposome via a linking molecule that is connected to both the liposome and the oligonucleotide, entrapped in a liposome, complexed with a liposome, dispersed in a solution containing a lipid, mixed with a lipid, combined with a lipid; it may be contained as a suspension in a lipid, contained or complexed with a micelle, or otherwise connected to a lipid. Lipid, lipid/DNA or lipid/expression vector associated compositions are not limited to any particular structure in solution. For example, they may be present in a bilayer structure, as micelles, or with a "collapsed" structure. They may also simply be interspersed in a solution, possibly forming aggregates that are not uniform in size or shape. Lipids are fatty substances which may be naturally occurring or synthetic lipids. For example, lipids include the fatty droplets that naturally occur in the cytoplasm as well as the class of compounds which contain long-chain aliphatic hydrocarbons and their derivatives, such as fatty acids, alcohols, amines, amino alcohols, and aldehydes.

Lipids suitable for use can be obtained from commercial sources. For example, dimyristyl phosphatidylcholine ("DMPC") can be purchased from Sigma, St. Louis, MO; dicetyl phosphate ("DCP") can be purchased from K & K Laboratories (Plainview, N.Y.); cholesterol ("Choi") can be purchased from Calbiochem-Behring; dimyristyl phosphatidylglycerol ("DMPG") and other lipids can be purchased from Avanti Polar Lipids, Inc. (Birmingham, AL). Stock solutions of lipids in chloroform or chloroform/methanol can be stored at about −20° C. Chloroform is used as the only solvent since it is more readily evaporated than methanol. "Liposome" is a generic term encompassing a variety of single and multilamellar lipid vehicles formed by the generation of enclosed lipid bilayers or aggregates. Liposomes can be characterized as having vesicular structures with a phospholipid bilayer membrane and an inner aqueous medium. Multilamellar liposomes have multiple lipid layers separated by aqueous medium. They form spontaneously when phospholipids are suspended in an excess of aqueous solution. The lipid components undergo self-rearrangement before the formation of closed structures and entrap water and dissolved solutes between the lipid bilayers (Ghosh et al., 191 Glycobiology 5; 505-10). However, compositions that have different structures in solution than the normal vesicular structure are also encompassed. For example, the lipids may assume a micellar structure or merely exist as nonuniform aggregates of lipid molecules. Also encompassed are lipofectamine-nucleic acid complexes.

Regardless of the method used to introduce exogenous nucleic acids into a host cell or otherwise expose a cell to the inhibitor of the present invention, in order to confirm the presence of the recombinant DNA sequence in the host cell, a variety of assays may be performed. Such assays include, for example, "molecular biological" assays well known to those of skill in the art, such as Southern and Northern blotting, RT-PCR and PCR; "biochemical" assays, such as detecting the presence or absence of a particular peptide, e.g., by immunological means (ELISA and Western blotting) or by assays described in the present description to identify agents falling within the scope of the invention.

In one aspect, the present invention relates to a genetically modified cell that comprises the above chimeric antigen receptor (CAR), which is produced by the above method.

An embodiment according to the invention further provides a genetically modified cell comprising any of the recombinant expression vectors described herein. As used herein, the term "genetically modified cell" refers to any type of cells that can contain the recombinant expression vector according to the invention. The genetically modified cell may be a eukaryotic cell, e.g., a plant, animal, fungi, or algae cell, or may be a prokaryotic cell, e.g., a bacteria or protozoa cell. The genetically modified cell may be a cultured cell or a primary cell, i.e., isolated directly from an organism, e.g., a human. The genetically modified cell may be an adherent cell or a suspended cell, i.e., a cell that grows in suspension. Suitable host cells are known in the art and include, for example, DH5α $E.$ $coli$ cells, Chinese hamster ovarian cells, monkey VERO cells, COS cells, HEK293 cells, and the like. For amplifying or replicating the recombinant expression vector, the host cell is preferably a prokaryotic cell, for example, a DH5α cell. For producing a recombinant CAR, the genetically modified cell may be a mammalian cell. The genetically modified cell may be a human cell. While the genetically modified cell may be of any cell type, may originate from any type of tissue, and may be of any developmental stage, the genetically modified cell may be a peripheral blood lymphocyte (PBL) or a peripheral blood mononuclear cell (PBMC). The genetically modified cell may be a T cell. The genetically modified cell may be an NK cell.

For purposes of the present invention, the T cell can be any T cell, such as a cultured T cell, e.g., a primary T cell, or a T cell from a cultured T cell line, e.g., Jurkat, SupT1, etc., or a T cell obtained from a mammal. If obtained from a mammal, the T cell may be obtained from numerous sources, including but not limited to blood, bone marrow, lymph nodes, the thymus, or other tissues or fluids. The T cells may also be enriched for or purified. The T cell may be a human T cell. The T-cell may be a T-cell isolated from the human organism. The T cell may be any type of T cell and may be of any developmental stage, including but not limited to, $CD4^+/CD8^+$ double positive T cells, $CD4^+$ helper T cells, e.g., $Th_1$ and $Th_2$ cells, $CD8^+$ T cells (e.g., cytotoxic T cells), tumor infiltrating cells, memory T cells, naive T cells, and the like. The T cell may be a $CD8^+$ T cell or a $CD4^+$ T cell.

T cells can be obtained from a number of sources, including peripheral blood mononuclear cells, bone marrow, lymph node tissue, cord blood, thymus tissue, tissue from a site of infection, ascites, pleural effusion, spleen tissue, and tumors. In certain embodiments of the present invention, any number of T cell lines available in the art may be used. In certain embodiments of the present invention, T cells can be obtained from a unit of blood collected from a subject using any number of techniques known to the skilled artisan, such as Ficoll separation. In one preferred embodiment, cells from the circulating blood of an individual are obtained by apheresis. The apheresis product typically contains lymphocytes, including T cells, monocytes, granulocytes, B cells, other nucleated white blood cells, red blood cells, and platelets. In one embodiment, the cells collected by apheresis may be washed to remove the plasma fraction and to place the cells in an appropriate buffer or media for subsequent processing steps. In one embodiment of the invention, the cells are washed with phosphate buffered saline (PBS). In an alternative embodiment, the wash solution lacks calcium and may lack magnesium or may lack many if not all divalent cations. Furthermore, surprisingly, initial activation steps in the absence of calcium lead to magnified activation. As those of skill in the art would appreciate, the washing step may be accomplished by methods known in the art, such as by using a semi-automated "flow-through" centrifuge (for example, the cell processor Cobe 2991, Baxter CytoMate, or Haemonetics Cell Saver 5) according to the manufacturer's instructions. After washing, the cells may be resuspended in a variety of biocompatible buffers, such as, for example, Ca2+-free, Mg2+-free PBS, Plasmalyte A, or other saline solution with or without buffer. Alternatively, the undesirable components of the apheresis sample may be removed and the cells may be directly resuspended in culture media.

In some embodiments, the genetically modified cell is a T lymphocyte.

In some embodiments, the genetically modified cell is a CD8+ T cell.

In some embodiments, the genetically modified cell is an NK cell.

In some embodiments, the genetically modified cell is used as a medicinal agent.

In some embodiments, the genetically modified cell is used as a medicinal agent for tumor diseases.

In some embodiments, the genetically modified cell is used as a medicinal agent for diseases where the tumor is cancer.

EXAMPLES

The following examples are provided for a better understanding of the invention. These examples are for purposes of illustration only and are not to be construed as limiting the scope of the invention in any manner.

All publications, patents, and patent applications cited in this specification are incorporated herein by reference. Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended embodiments.

Materials and General Methods

Recombinant DNA Techniques

DNA manipulations were carried out by standard techniques as described by Sambrook J. et al, Molecular cloning: A laboratory manual; Cold Spring Harbor Laboratory Press, Cold Spring Harbor, New York, 1989. The molecular biological reagents were used according to the manufacturer instructions.

Gene Synthesis

Desired gene segments were prepared from oligonucleotides made by chemical synthesis. The gene segments of 300-4000 kb long, which were flanked by singular restriction sites, were assembled by annealing and ligation of oligonucleotides including PCR amplification and subsequently cloned via the indicated restriction sites. The DNA sequences of the subcloned gene fragments were confirmed by DNA sequencing.

The fusion genes comprising the described antibody chains as described below were generated by PCR and/or gene synthesis and assembled with known recombinant methods and techniques by connection of the according nucleic acid segments, e.g. using unique restriction sites in the corresponding vectors. The subcloned nucleic acid sequences were verified by DNA sequencing. For transient transfections, larger quantities of the plasmids were prepared by plasmid preparation from transformed E. coli cultures.

DNA Sequence Determination

DNA sequences were determined by Sanger sequencing.

DNA and Protein Sequence Analysis and Sequence Data Management

Infomax's Vector NTI Advance suite version 8.0 and SnapGene Viewer were used for sequence creation, mapping, analysis, annotation and illustration.

Cloning Protocol for Preparing a Vector with the Costimulatory Domain of 4-1BB

A fragment of three ITGB3 repeats was assembled from synthetic oligonucleotides (10 pieces of 59 bp each); an amplicon of 308 bp was prepared after two rounds of amplification. Next, we amplified the constant portion of scFv (Leader-SVL-GS-linker-SVH-4-1BB CD3), to which a predetermined number of ITGB3 fragments (1, 2 or 3, depending on the structural features of a particular vector) was linked by splicing PCR (SOE, Splicing by overlap extension). The resulting product was cloned into the pre-linearized vector pCDH-eGFP using XbaI/NotI sites. The resulting constructs were validated by sequencing the entire sequence of the cassette.

Cloning Protocol for Preparing a Vector with the Costimulatory Domain of CD28

A fragment of three ITGB3 repeats was assembled from synthetic oligonucleotides (10 pieces of 59 bp each); an amplicon of 308 bp was prepared after two rounds of amplification. Next, we amplified the constant portion of scFv (Leader-SVL-GS-linker-SVH-CD28-CD3), to which a predetermined number of ITGB3 fragments (1, 2 or 3, depending on the structural features of a particular vector) was linked by splicing PCR (SOE, Splicing by overlap extension). The resulting product was cloned into the pre-linearized vector pCDH-eGFP using XbaI/NotI sites. The resulting constructs were validated by sequencing the entire sequence of the cassette.

Example 1

Preparing Sequences of Synthetic ITGB3 Genes.

To prepare a block of three repeating fragments of ITGB3, synthetic oligonucleotides of 60 bp each were used, said oligonucleotides forming a completely overlapping sequence of a gene region that is within the chimeric structure CD8 4-1BB altCD3 zeta or CD8 CD28 altCD3 zeta. The gene was assembled by two-round PCR.

Example 2

Sequences of Codon-Optimized ITGB3 Fragments.

3 different variations of nucleotide sequences encoding ITGB3 were used to arrange the ITGB3 fragments in the 19CAR-T cassette and prevent possible recombination in the gene. The variations of such sequences are given below.

```
Variation 1
gatactgccaacaacccactttacaaagaagctacatccaccttcaccaa tataacctacagaggtact

D T A N N P L Y K E A T S T F T N I T Y R G T

Variation 2
gacaccgctaacaatcctctgtataaagaggcaaccagcacttttacaaa cattacttataggggaacc

D T A N N P L Y K E A T S T F T N I T Y R G T
```

```
-continued
Variation 3
gatacagcaaataaccccttgtacaaggaagccacttctacattcactaa tatcacctatcgcggcaca

D T A N N P L Y K E A T S T F T N I T Y R G T
```

Example 3

Cloning various variations of sequences of the cassette 19CAR-T-ITGB3 and 19CAR-T-CD28-ITGB3.

Figure 4:
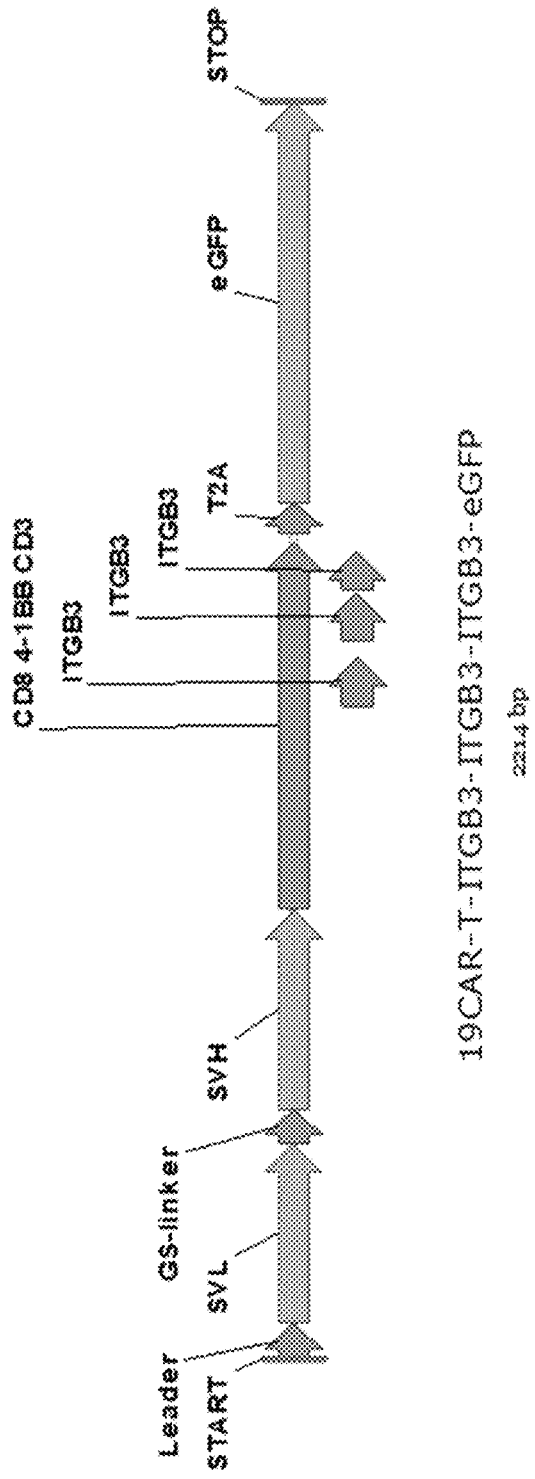
FIG. 4. Schematic representation of the expression cassette 19CAR-T-ITGB3-ITGB3-ITGB3-eGFP.

In order to clone the cassette 19CAR-T-ITGB3-ITGB3-ITGB3 (FIG. 4), a constant region of the gene was generated by PCR amplification by way of using the vector pCDH-CAR-T-EGFP as a template, with the participation of specific oligonucleotide primers limiting the constant portion of the cassette 19CAR-T. Regions of the 19CAR-T gene and a block of three ITGB3 fragments were fused by splicing PCR (SOE, Splicing by overlap extension).

Figure 2:
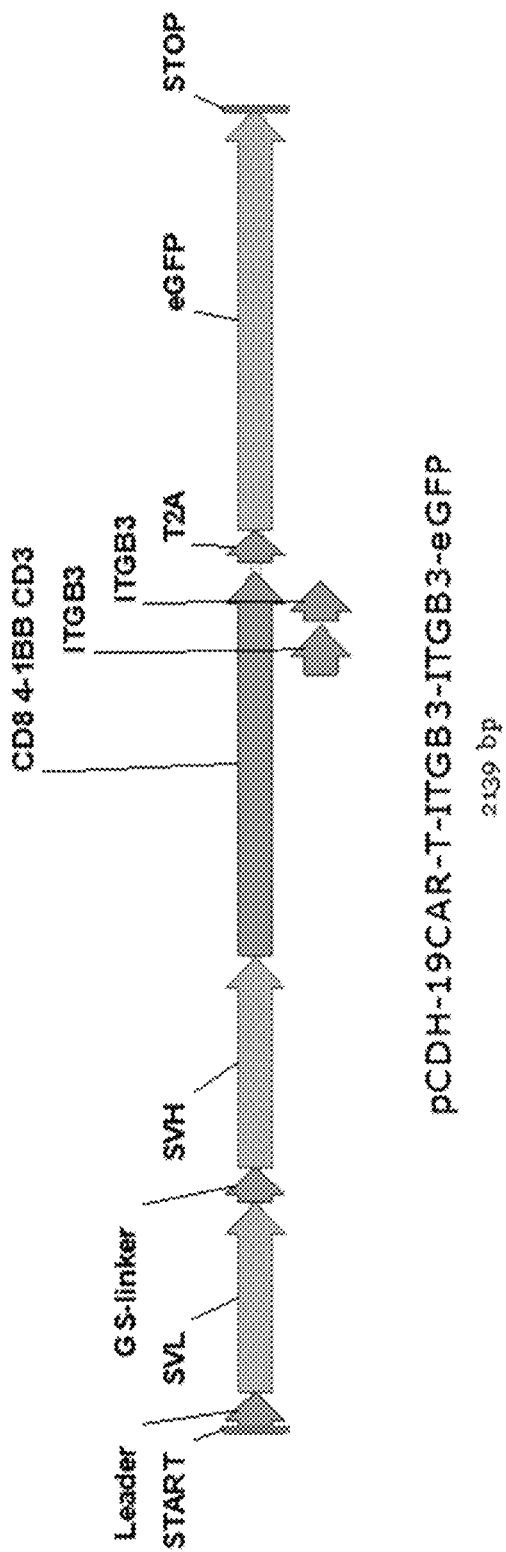
FIG. 2. Schematic representation of the expression cassette 19CAR-T-ITGB3-ITGB3-eGFP.

In order to clone the cassette 19CAR-T-ITGB3-ITGB3 (FIG. 2), a region of the gene was similarly prepared by PCR amplification using validated pCDH-19CAR-T-ITGB3-ITGB3-ITGB3 as a template, limited by specific primers and including an ITGB3-ITGB3 repeat.

Figure 6:
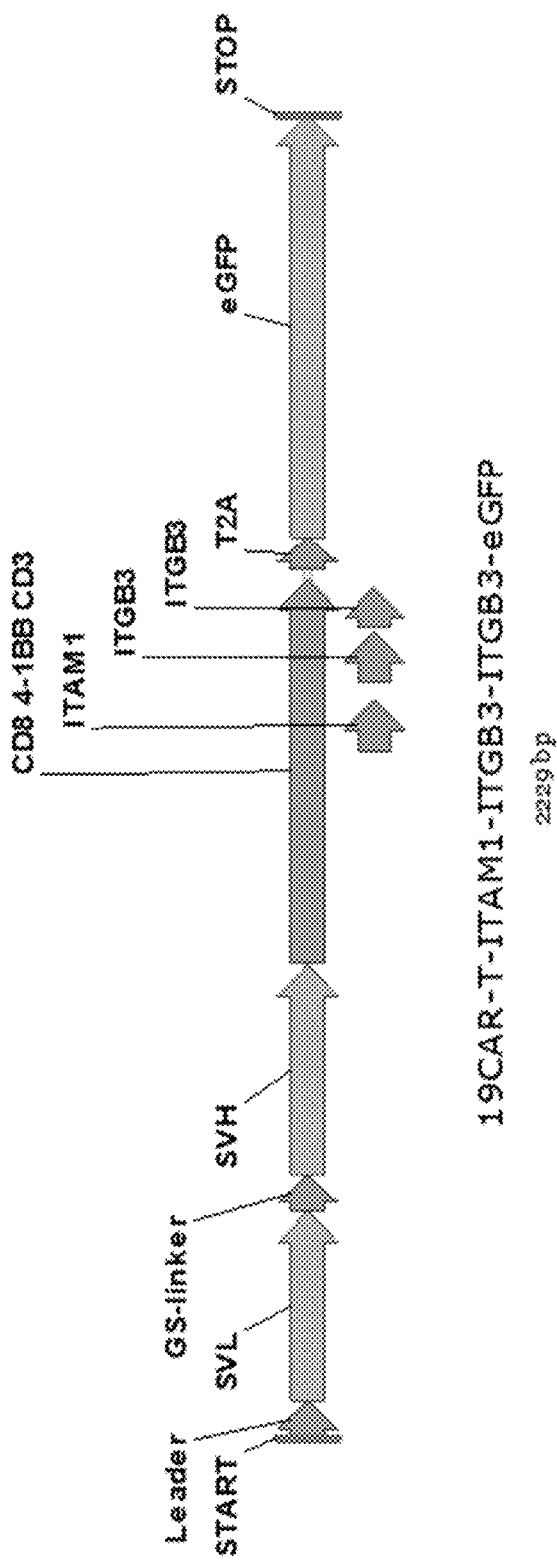
FIG. 6. Schematic representation of the expression cassette 19CAR-T-ITAM1-ITGB3-ITGB3-eGFP.

In order to clone the cassette 19CAR-T-ITAM1-ITGB3-ITGB3 (FIG. 6), a constant region of the gene was generated by PCR amplification by way of using the vector pCDH-CAR-T-EGFP as a template, with the participation of specific oligonucleotide primers limiting the constant portion of 19CAR-T-ITAM1. The gene regions were fused with the ITGB3-ITGB3 block by splicing PCR.

Figure 8:
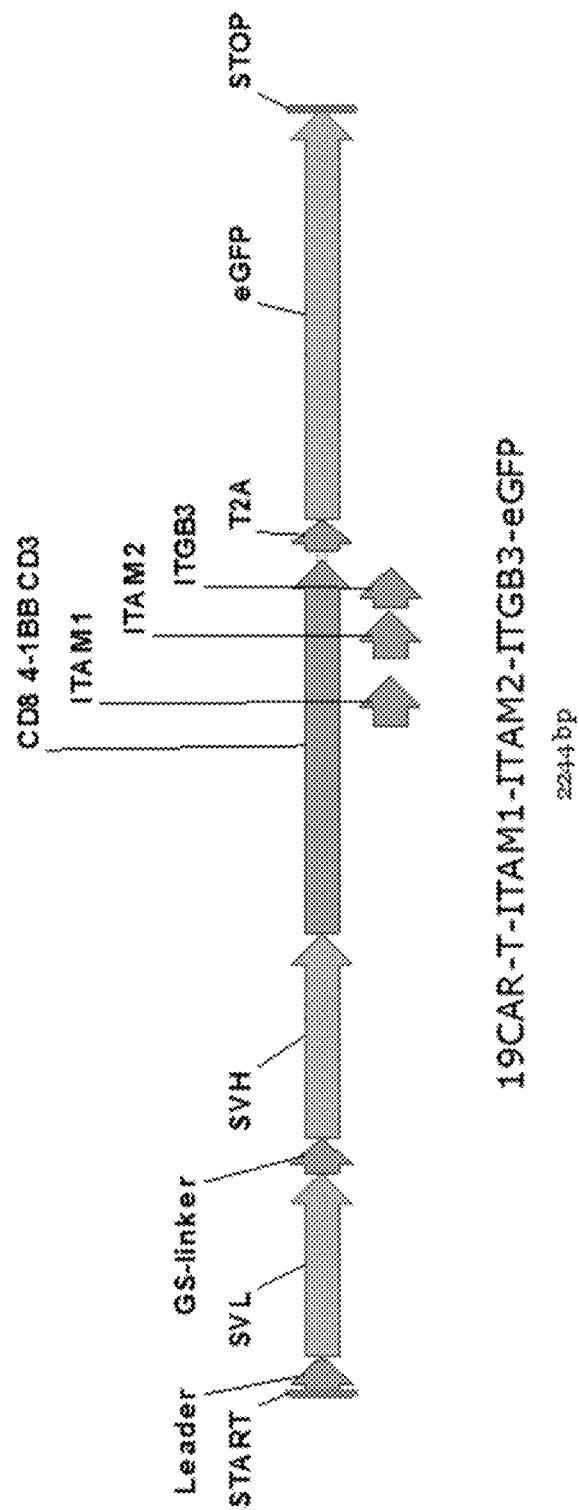
FIG. 8. Schematic representation of the expression cassette 19CAR-T-ITAM1-ITAM2-ITGB3-eGFP.
Figure 9:
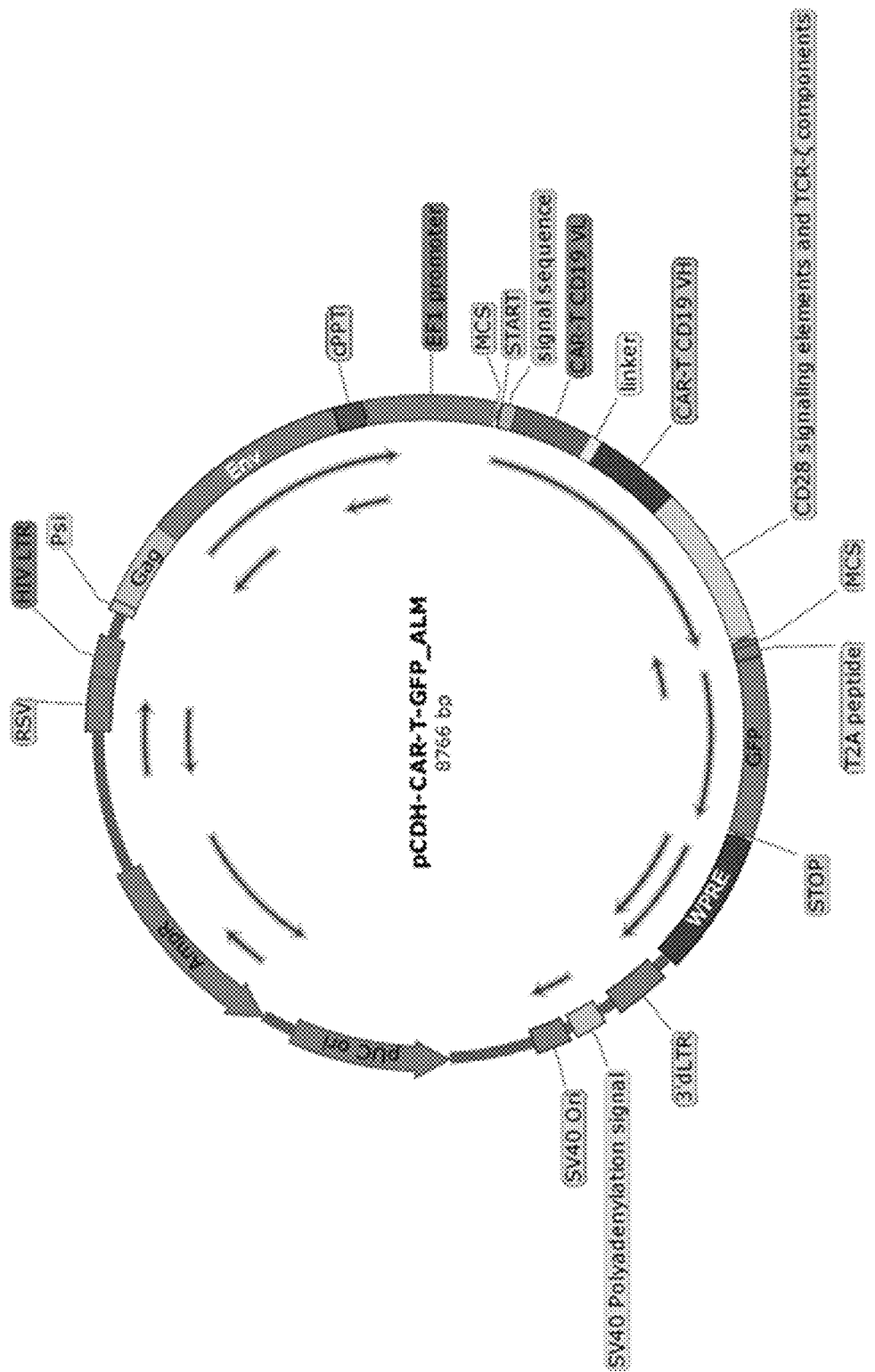
FIG. 9. Map of the vector pCDH-CAR-T-GFP.
Figure 10:
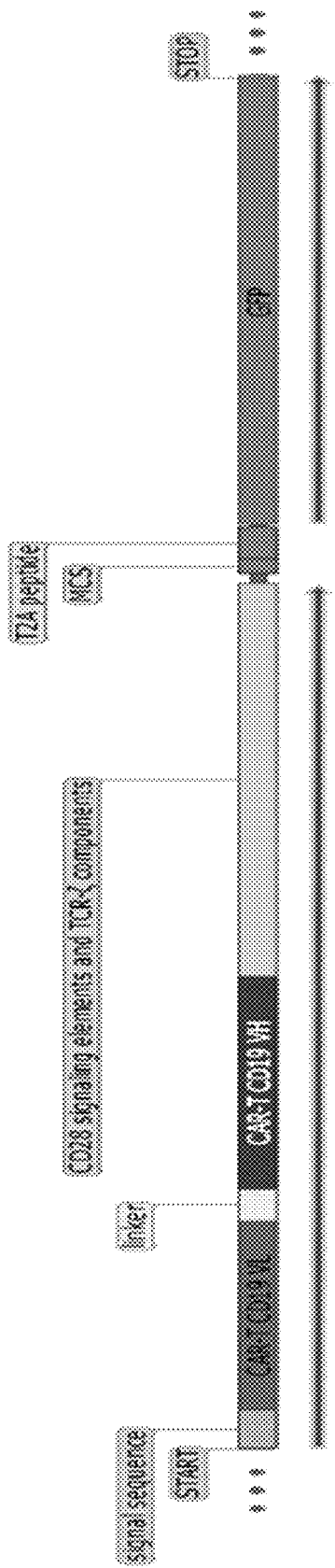
FIG. 10. Schematic representation of the expression cassette pCDH-CAR-T-GFP.

In order to clone the cassette 19CAR-T-ITAM1-ITAM2-ITGB3 (FIG. 8), a constant region of the gene was generated by PCR amplification by way of using the vector pCDH-CAR-T-EGFP as a template, with the participation of specific oligonucleotide primers limiting the constant portion of 19CAR-T-ITAM1-ITAM2. The gene regions were fused with the ITGB3 block by splicing PCR.

Figure 14:
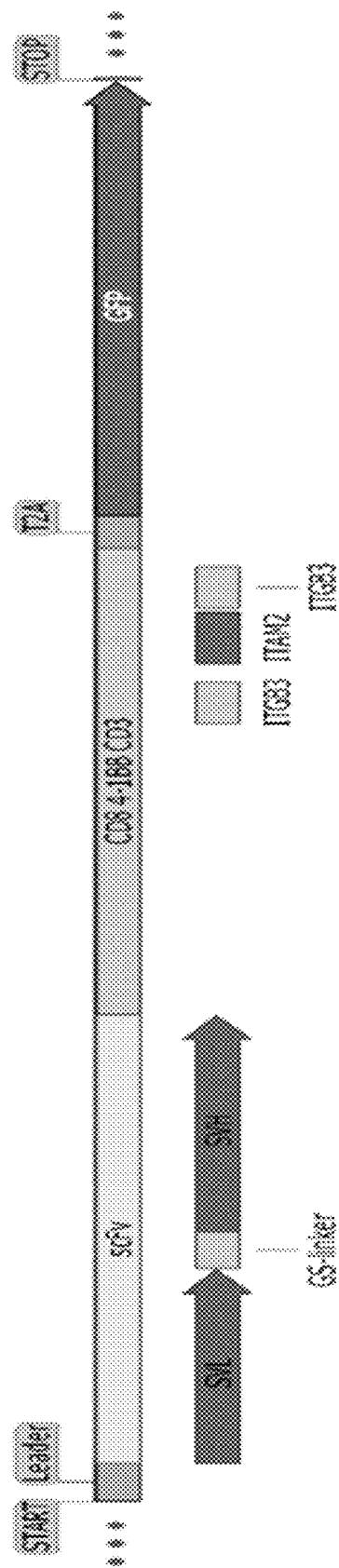
FIG. 14. Schematic representation of the expression cassette pCDH-19CAR-T-ITGB3-ITAM2-ITGB3-eGFP.

In order to clone the cassette 19CAR-T-ITGB3-ITAM2-ITGB3 (FIG. 14), a constant region of the gene was generated by PCR amplification by way of using the vector pCDH-CAR-T-EGFP as a template, with the participation of specific oligonucleotide primers limiting the constant portion with 19CAR-T. The gene regions were fused with blocks of two ITGB3 and ITAM2 by splicing PCR.

Figure 12:
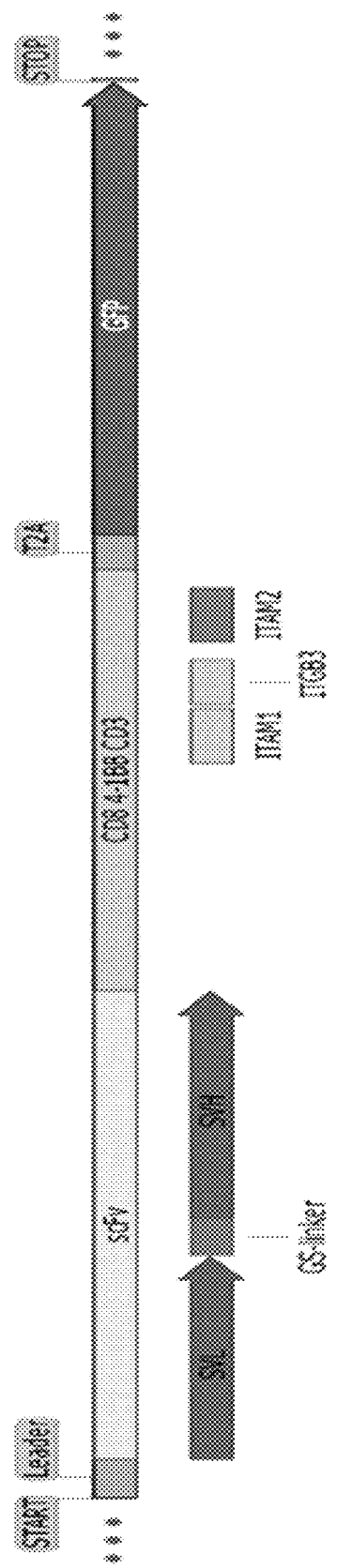
FIG. 12. Schematic representation of the expression cassette pCDH-19CAR-T-ITAM1-ITGB3-ITAM2-eGFP.

In order to clone the cassette 19CAR-T-ITAM1-ITGB3-ITAM2 (FIG. 12), a constant region of the gene was generated by PCR amplification by way of using the vector pCDH-CAR-T-EGFP as a template, with the participation of specific oligonucleotide primers limiting the constant portion of 19CAR-T-ITAM1. The gene regions were fused with the ITGB3 and ITAM2 block by splicing PCR.

Figure 16:
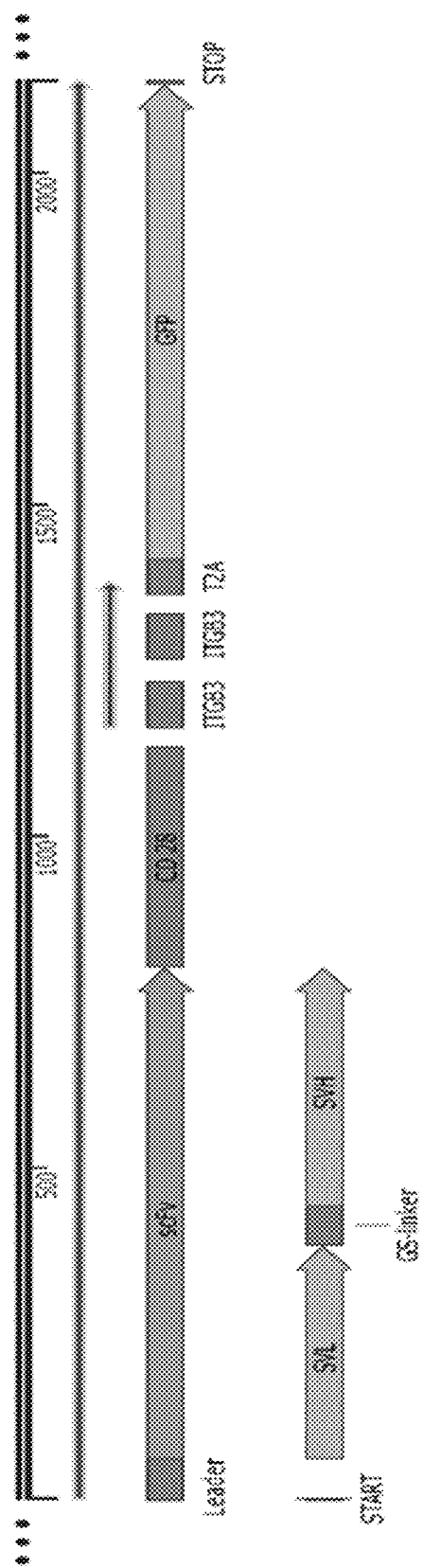
FIG. 16. Schematic representation of the expression cassette pCDH-19CAR-T_CD28-ITGB3-ITGB3-eGFP.
Figure 18:
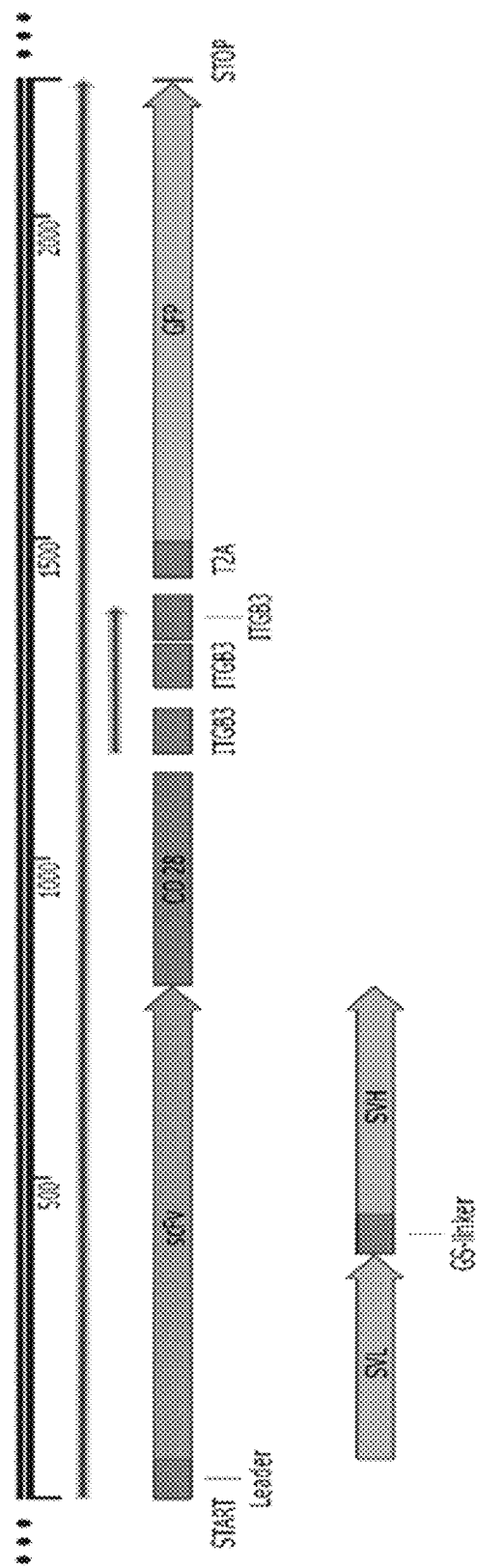
FIG. 18. Schematic representation of the expression cassette pCDH-19CAR-T-CD28_ITGB3-ITGB3-ITGB3-eGFP.
Figure 20:
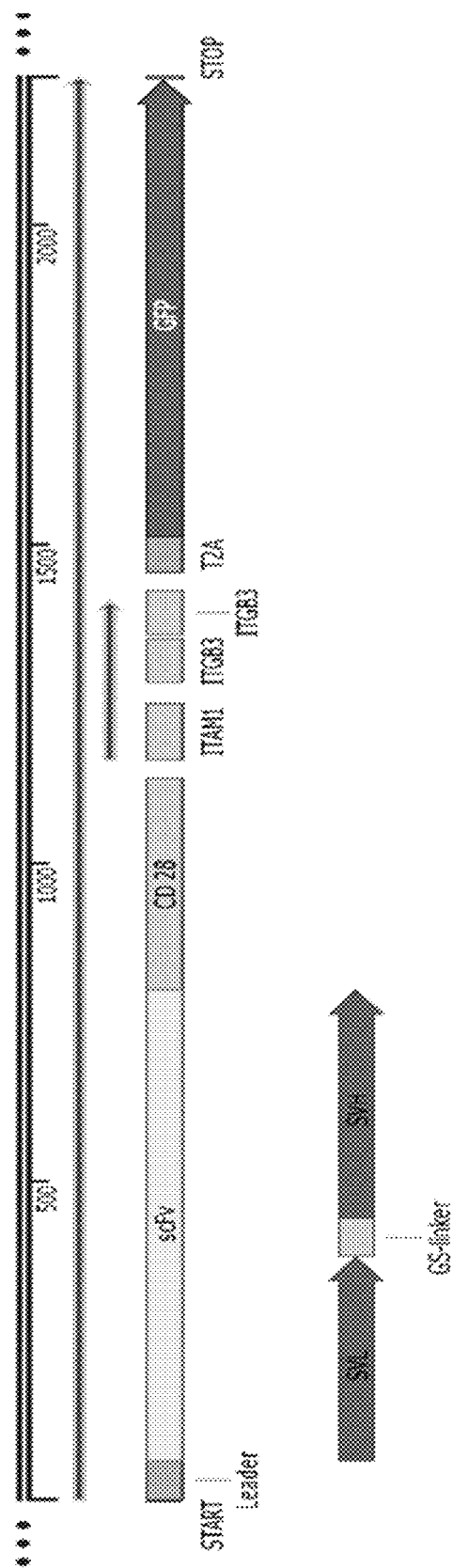
FIG. 20. Schematic representation of the expression cassette pCDH-19CAR-T-CD28_ITAM1-ITGB3-ITGB3-eGFP.
Figure 22:
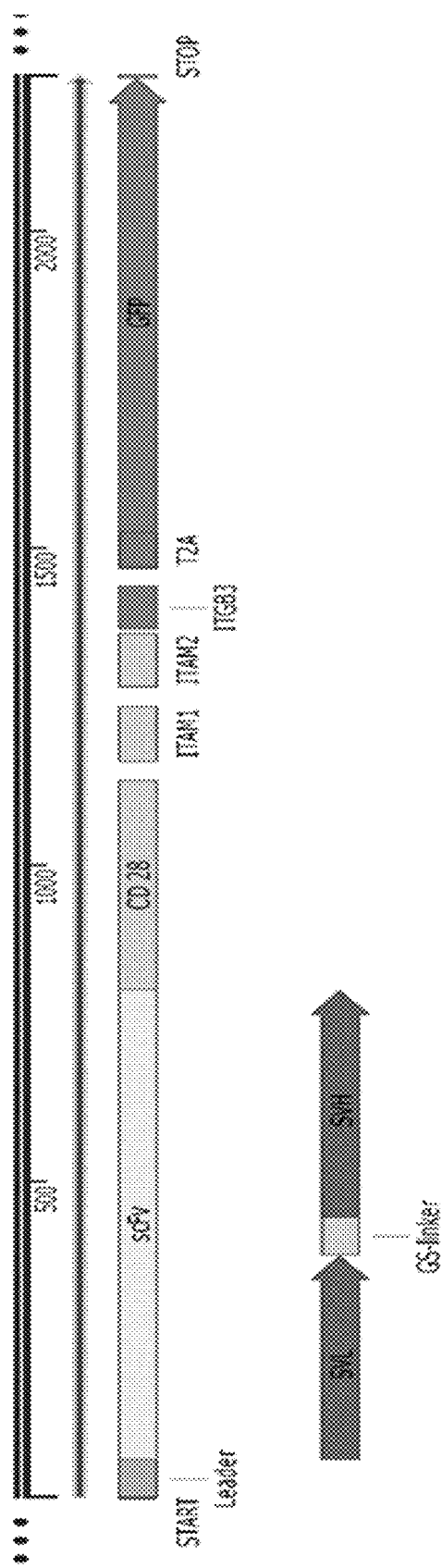
FIG. 22. Schematic representation of the expression cassette pCDH-19CAR-T-CD28_ITAM1-ITAM2-ITGB3-eGFP.
Figure 24:
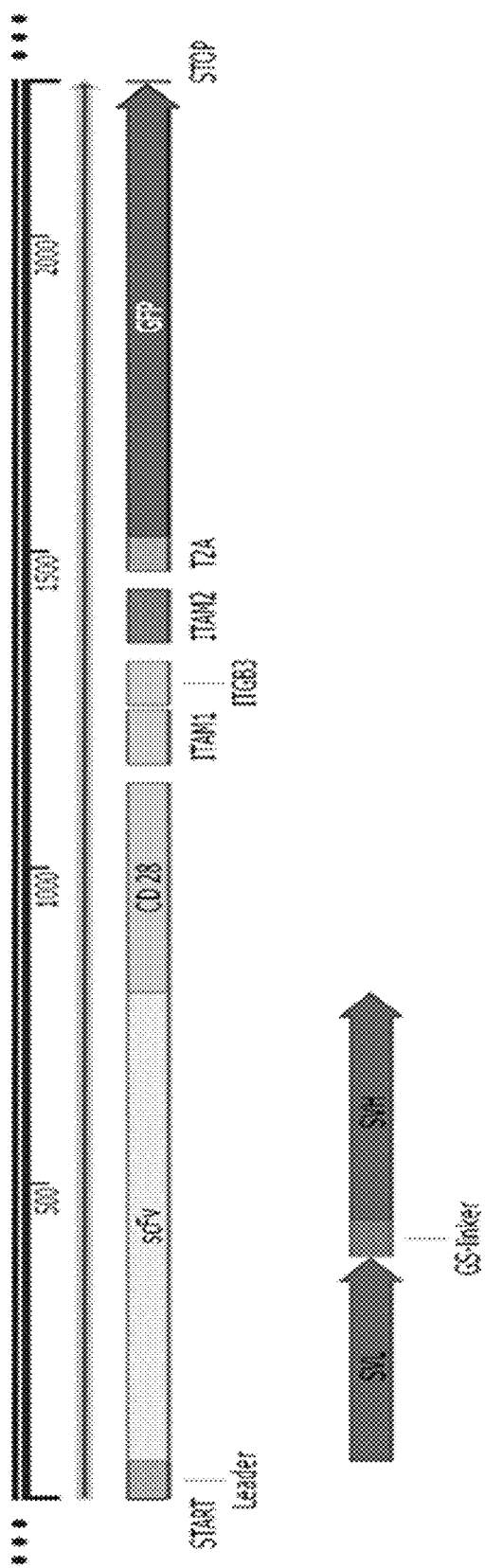
FIG. 24. Schematic representation of the expression cassette pCDH-19CAR-T-CD28_ITAM1-ITGB3-ITAM2-eGFP.
Figure 26:
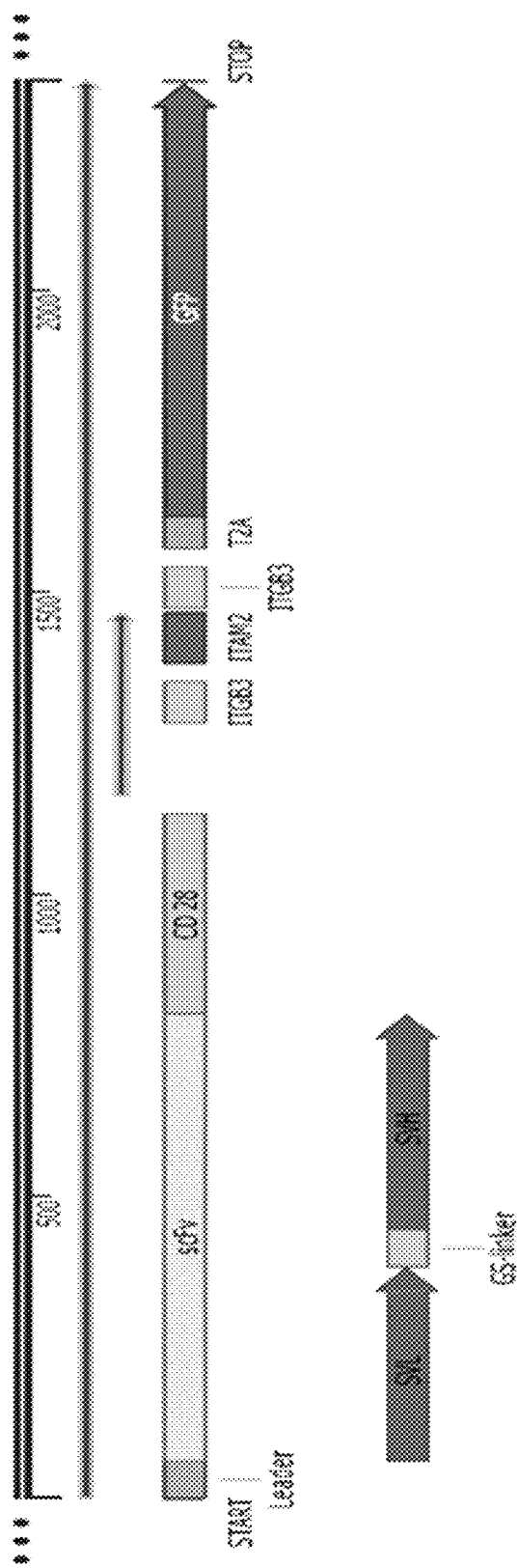
FIG. 26. Schematic representation of the expression cassette pCDH-19CAR-T-CD28_ITGB3-ITAM2-ITGB3-eGFP.

Similarly, the cassettes with the costimulatory domain of CD28 were prepared, in particular:
  expression cassette pCDH-19CAR-T_CD28-ITGB3-ITGB3-eGFP (FIG. 16);
  expression cassette pCDH-19CAR-T-CD28_ITGB3-ITGB3-ITGB3-eGFP (FIG. 18);
  expression cassette pCDH-19CAR-T-CD28_ITAM1-ITGB3-ITGB3-eGFP (FIG. 20);
  expression cassette pCDH-19CAR-T-CD28_ITAM1-ITAM2-ITGB3-eGFP (FIG. 22);
  expression cassette pCDH-19CAR-T-CD28_ITAM1-ITGB3-ITAM2-eGFP (FIG. 24);
  expression cassette pCDH-19CAR-T-CD28_ITGB3-ITAM2-ITGB3-eGFP (FIG. 26).

The resulting cassettes were integrated into the plasmid vector pCDH-eGFP via specific restriction sites; T2A elements and the open reading frame of the green fluorescent protein (eGFP) as a marker for expression were placed therein in the same reading frame.

Figure 1:
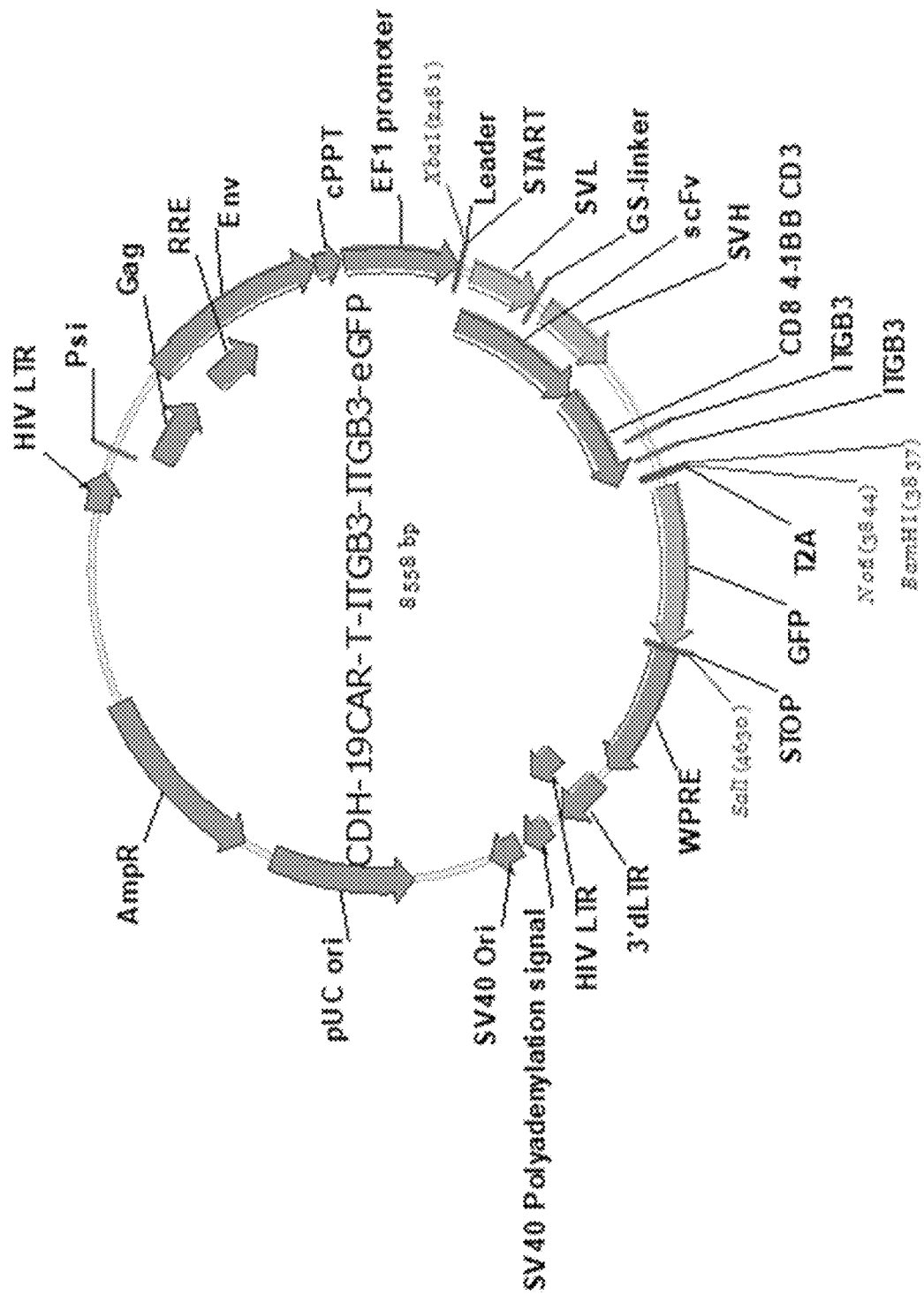
FIG. 1. Map of the vector pCDH-19CAR-T-ITGB3-ITGB3-eGFP.
Figure 3:
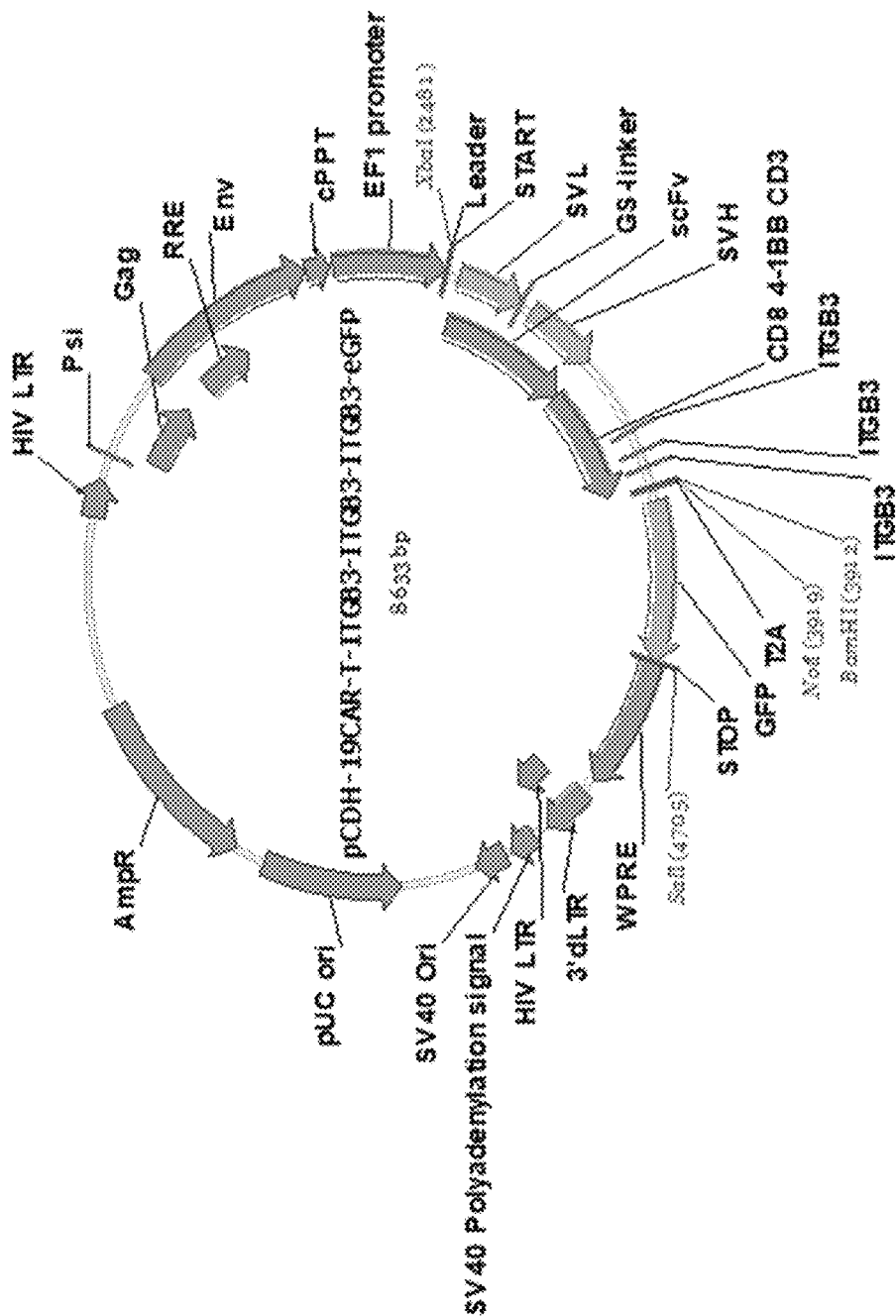
FIG. 3. Map of the vector pCDH-19CAR-T-ITGB3-ITGB3-ITGB3-eGFP.
Figure 5:
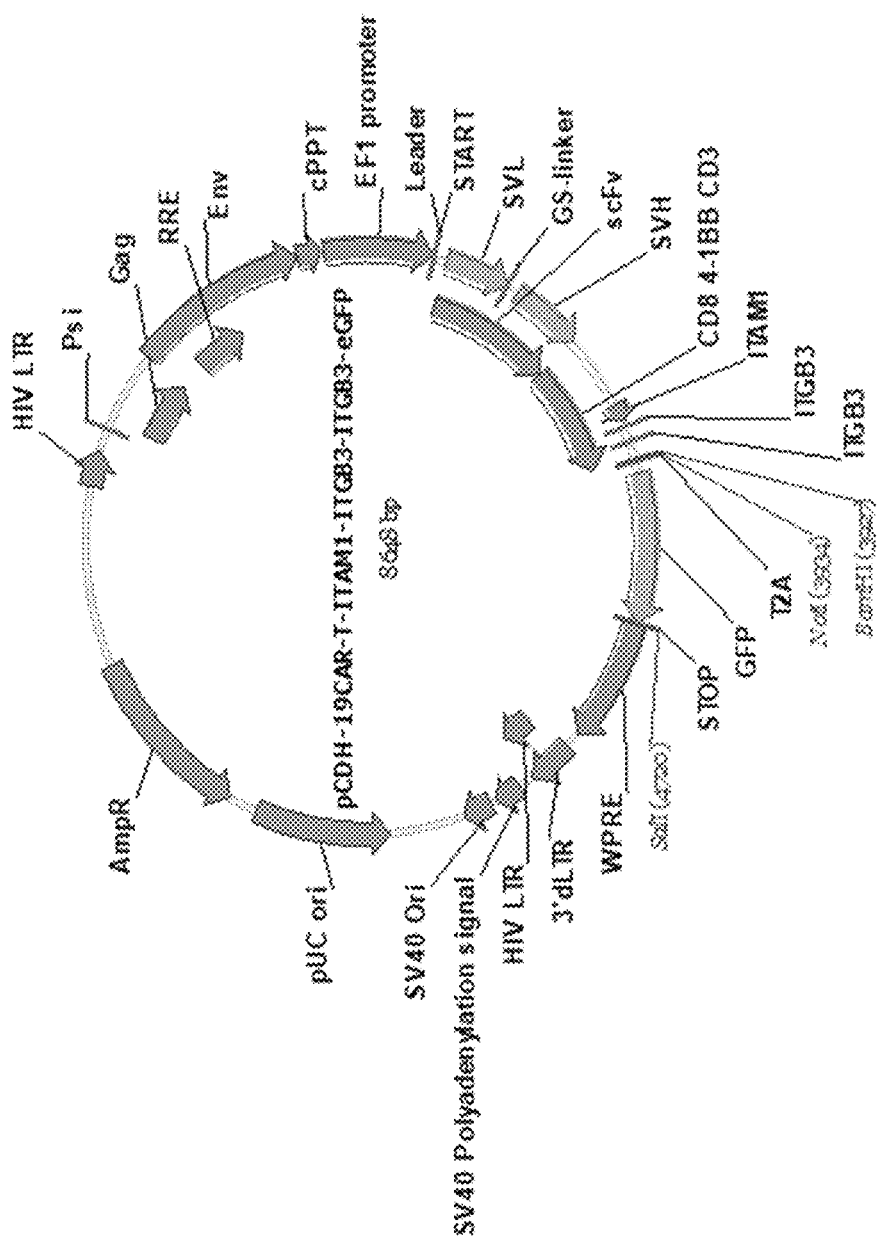
FIG. 5. Map of the vector pCDH-19CAR-T-ITAM1-ITGB3-ITGB3-eGFP.
Figure 7:
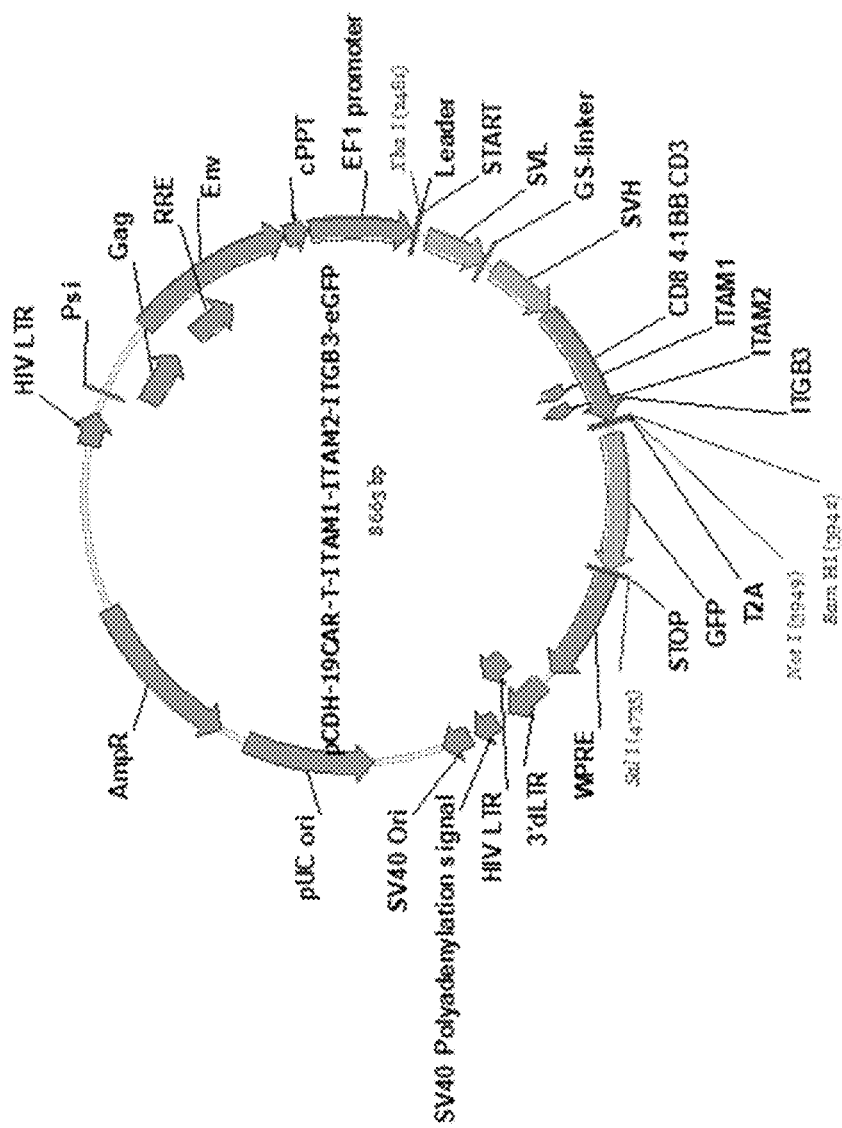
FIG. 7. Map of the vector pCDH-19CAR-T-ITAM1-ITAM2-ITGB3-eGFP.
Figure 11:
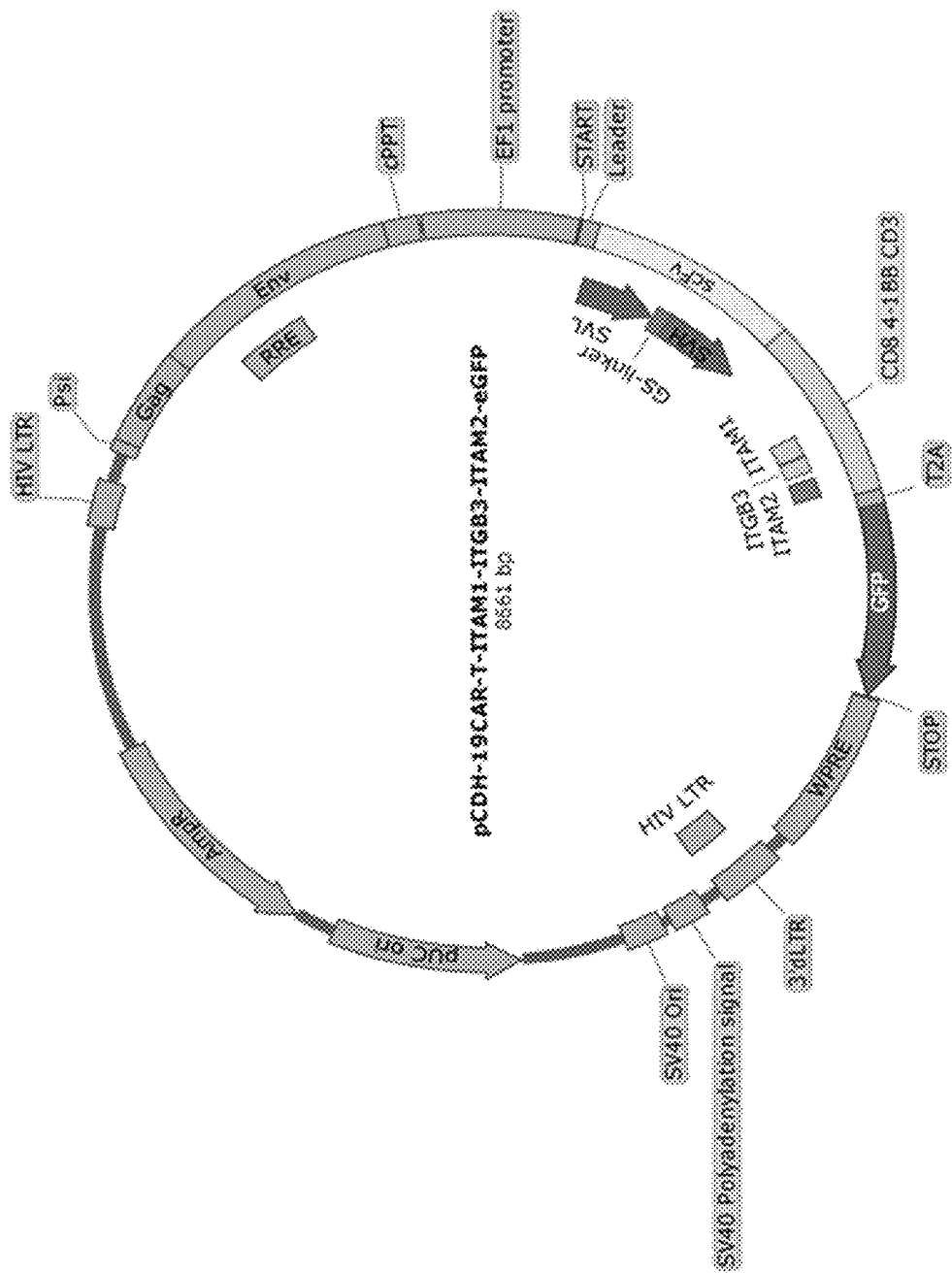
FIG. 11. Map of the vector pCDH-19CAR-T-ITAM1-ITGB3-ITAM2-eGFP.
Figure 13:
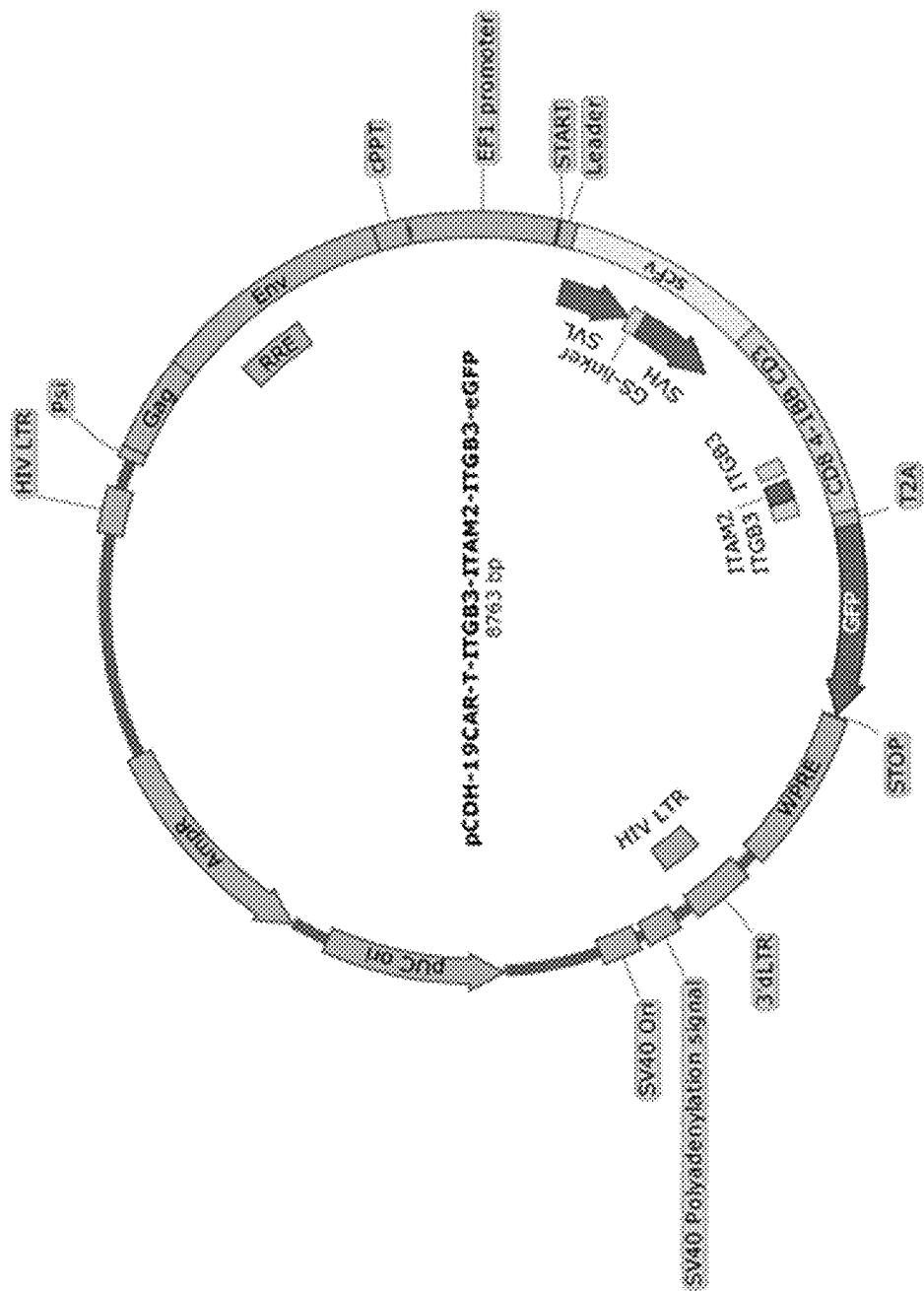
FIG. 13. Map of the vector pCDH-19CAR-T-ITGB3-ITAM2-ITGB3-eGFP.
Figure 15:
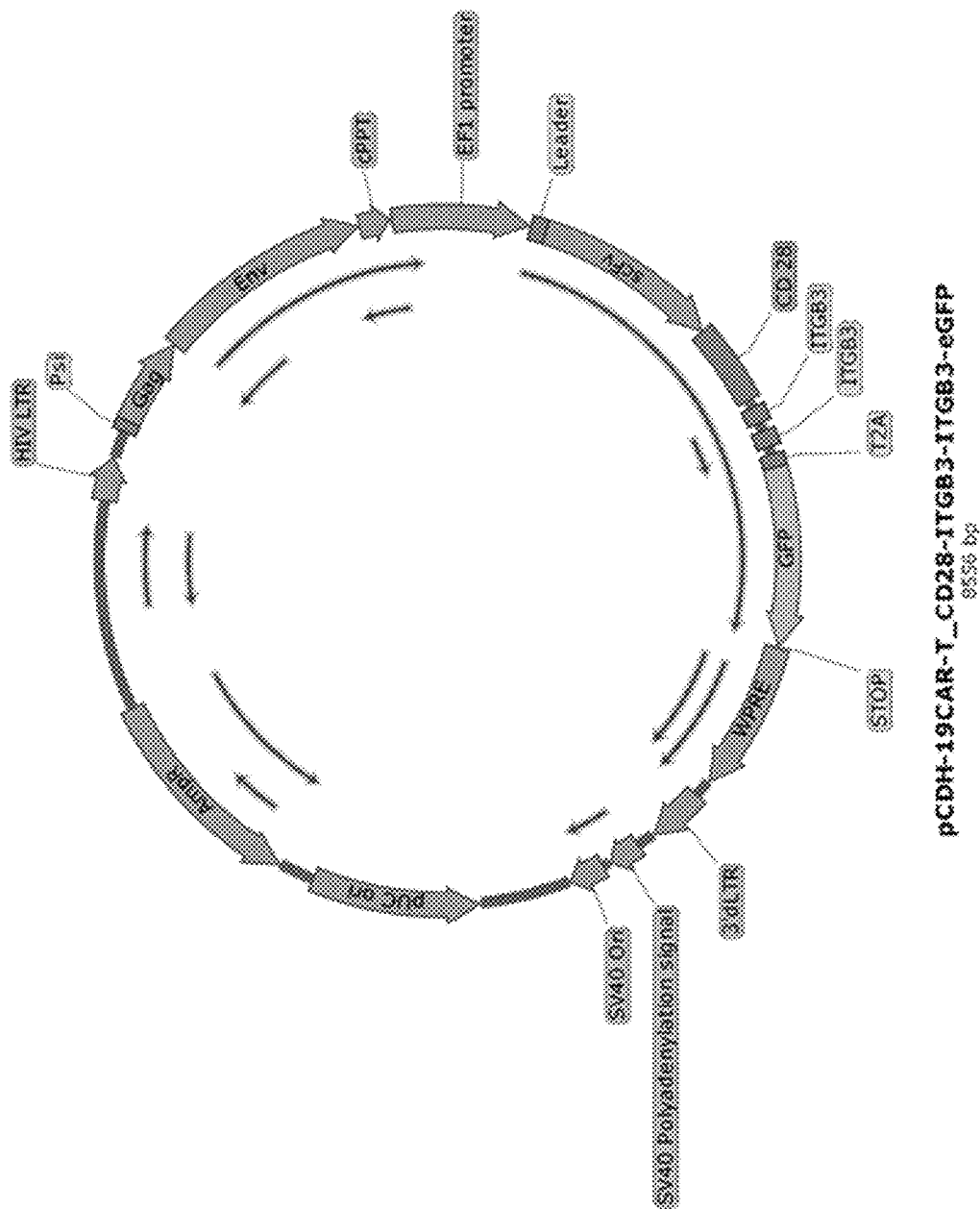
FIG. 15. Map of the vector pCDH-19CAR-T_CD28-ITGB3-ITGB3-eGFP.
Figure 17:
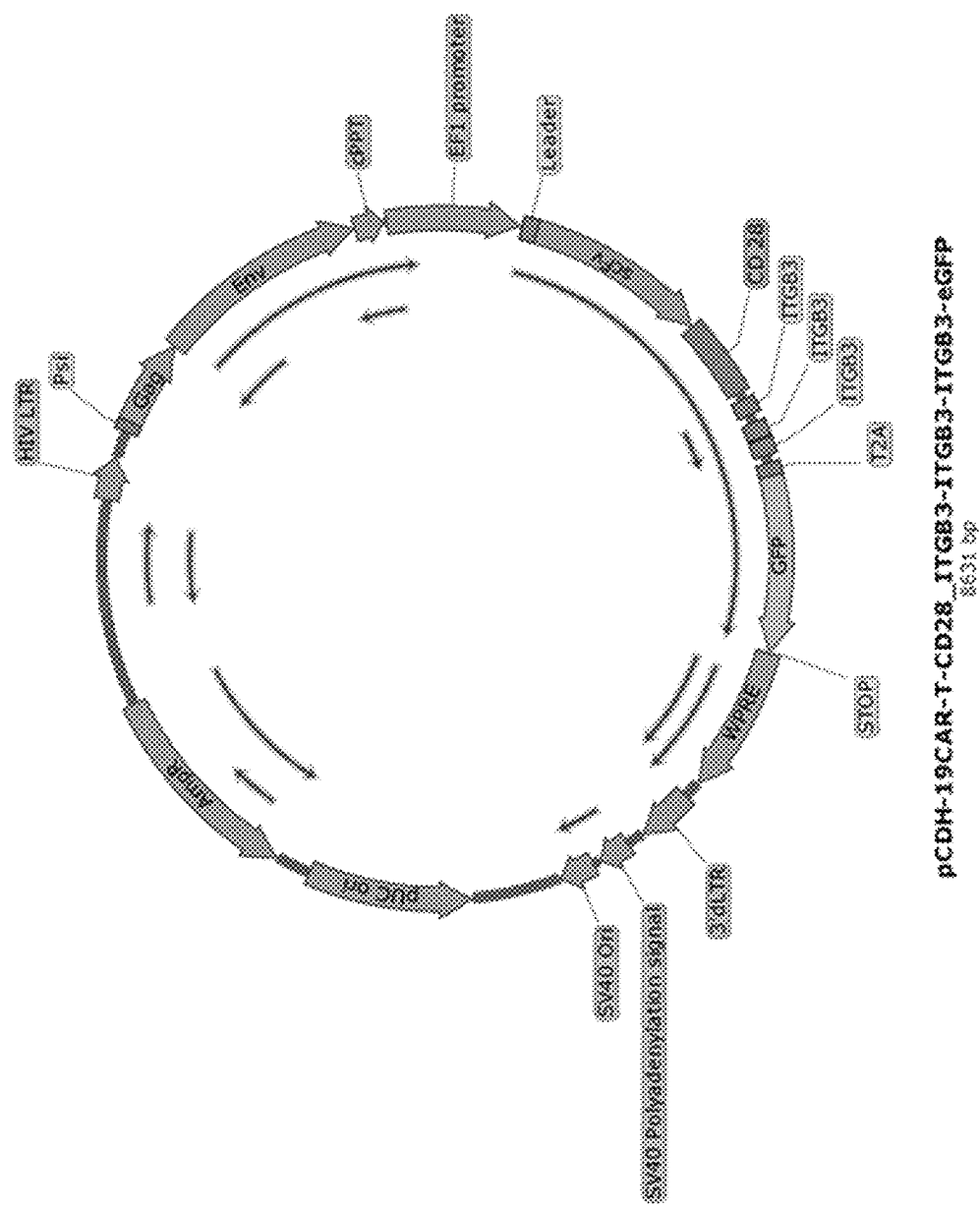
FIG. 17. Map of the vector pCDH-19CAR-T-CD28_ITGB3-ITGB3-ITGB3-eGFP.
Figure 19:
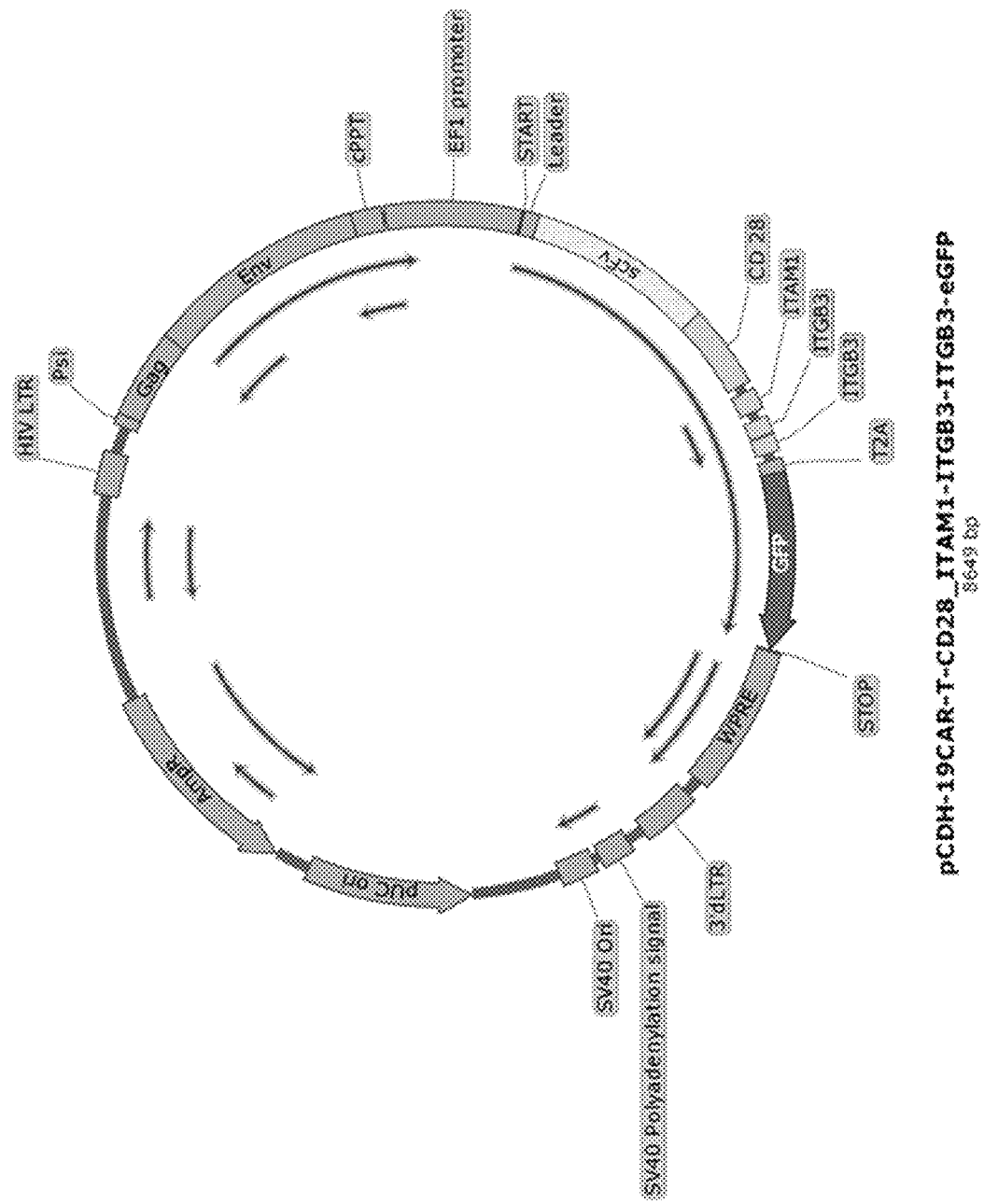
FIG. 19. Map of the vector pCDH-19CAR-T-CD28_ITAM1-ITGB3-ITGB3-eGFP.
Figure 21:
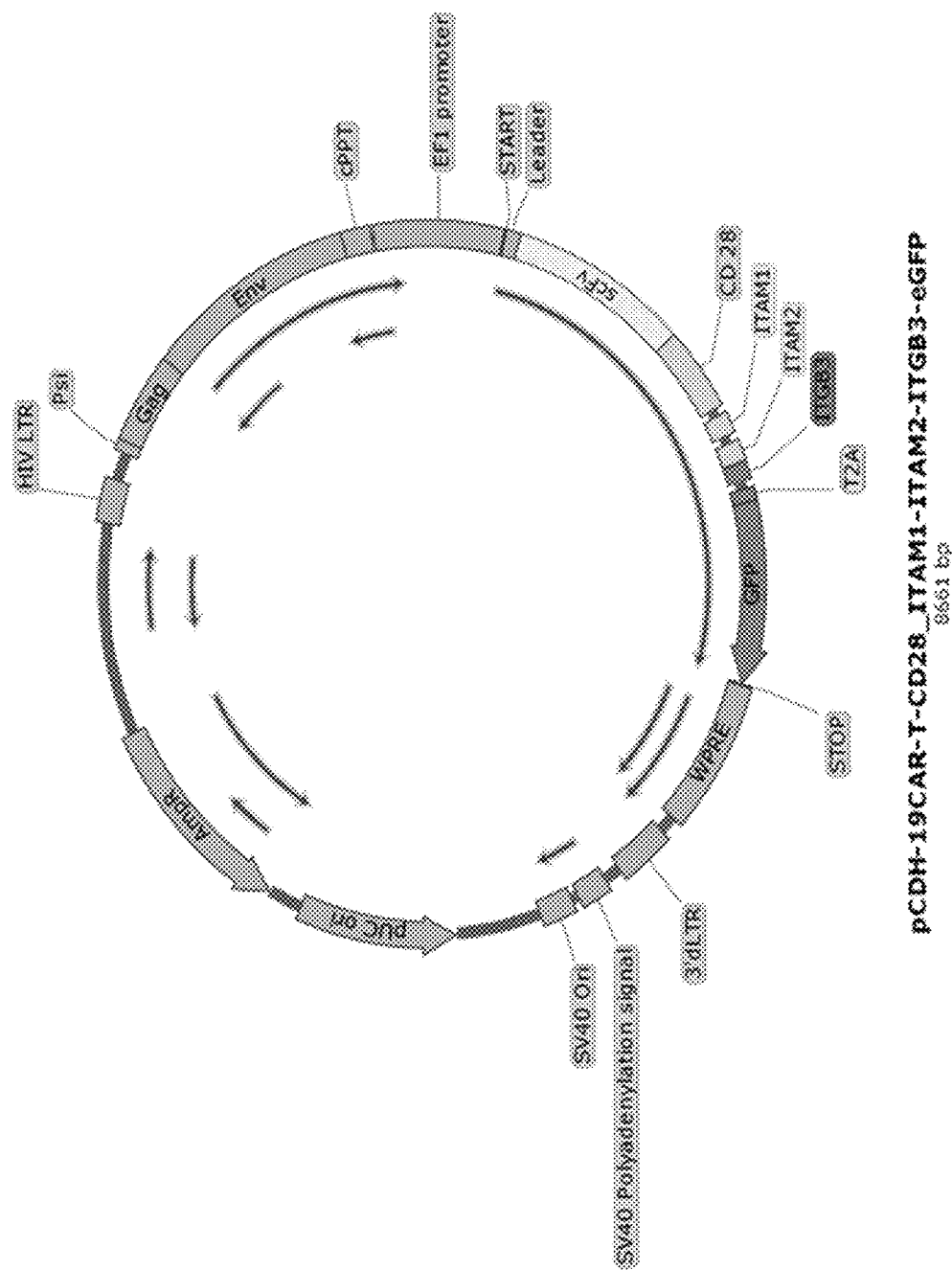
FIG. 21. Map of the vector pCDH-19CAR-T-CD28_ITAM1-ITAM2-ITGB3-eGFP.
Figure 23:
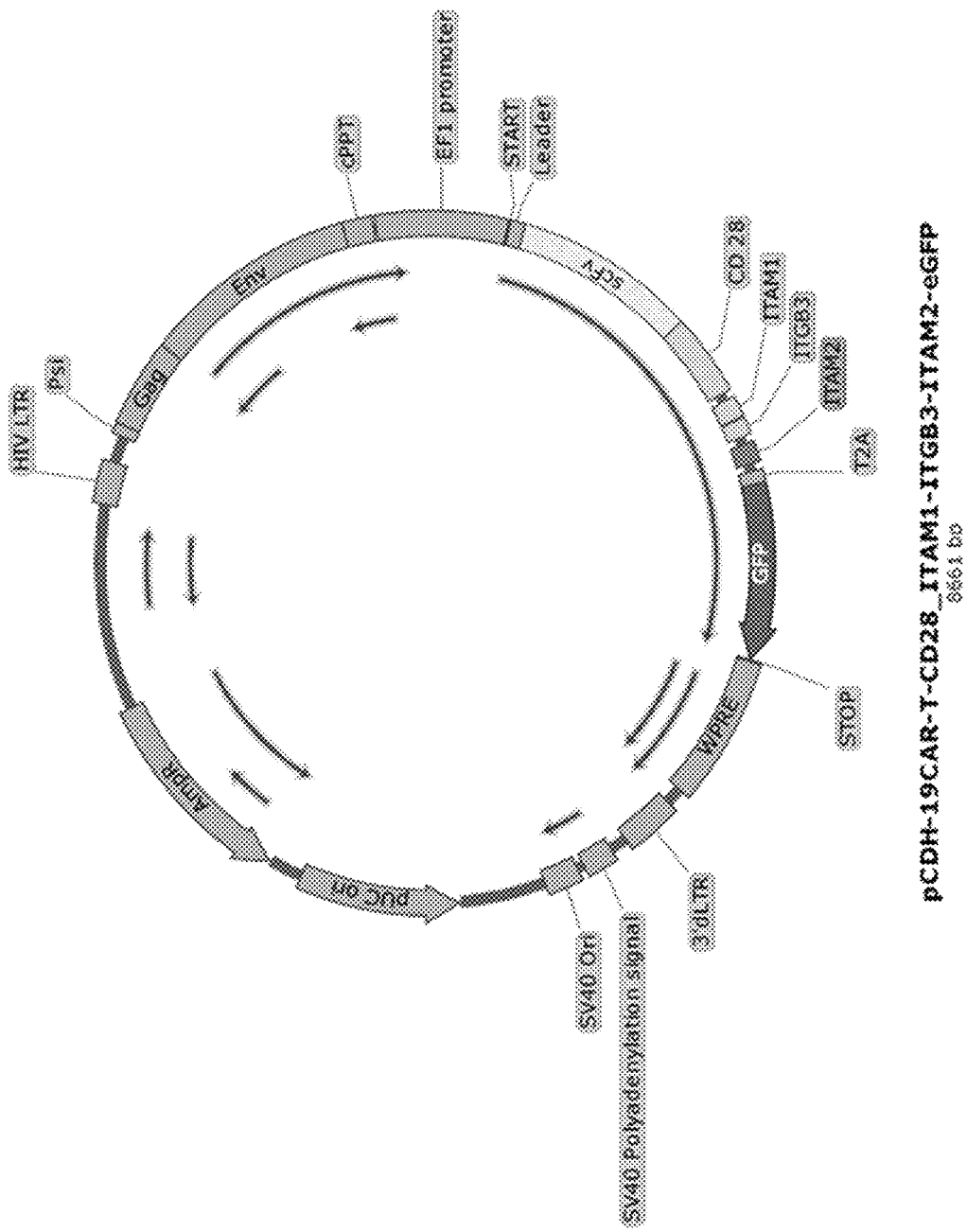
FIG. 23. Map of the vector pCDH-19CAR-T-CD28_ITAM1-ITGB3-ITAM2-eGFP.
Figure 25:
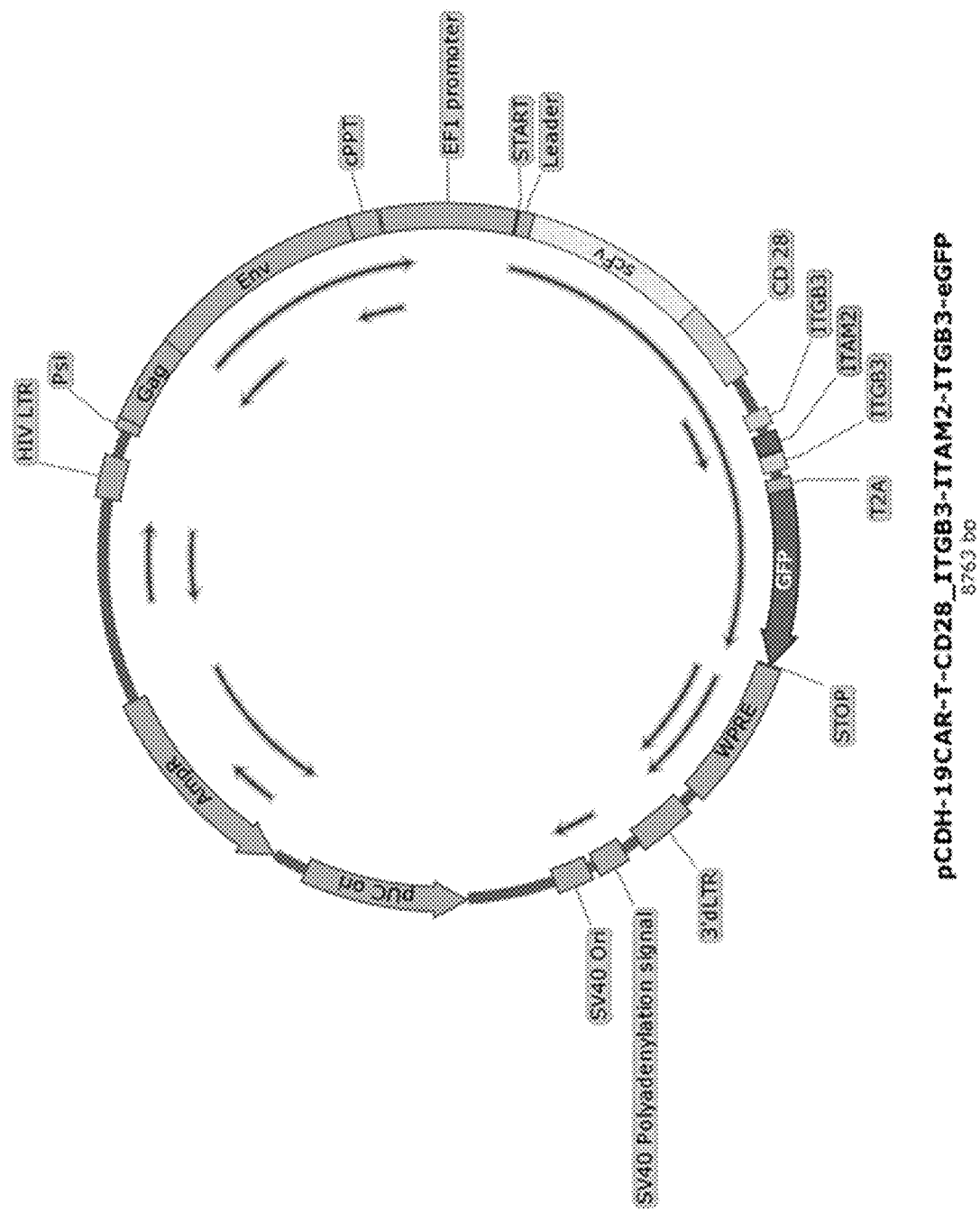
FIG. 25. Map of the vector pCDH-19CAR-T-CD28_ITGB3-ITAM2-ITGB3-eGFP.

As a result, vectors were produced where the CAR includes the costimulatory domain of 4-1BB and the alternative intracellular signaling domain of a chimeric antigen receptor with a different combination of ITGB3 and ITAM, in particular:
  vector pCDH-19CAR-T-ITGB3-ITGB3-eGFP (FIG. 1);
  vector pCDH-19CAR-T-ITGB3-ITGB3-ITGB3-eGFP (FIG. 3);
  vector pCDH-19CAR-T-ITAM1-ITGB3-ITGB3-eGFP (FIG. 5);
  vector pCDH-19CAR-T-ITAM1-ITAM2-ITGB3-eGFP (FIG. 7);
  vector pCDH-19CAR-T-ITAM1-ITGB3-ITAM2-eGFP (FIG. 11);
  vector pCDH-19CAR-T-ITGB3-ITAM2-ITGB3-eGFP (FIG. 13);

Further, vectors were produced where the CAR includes the costimulatory domain of CD28 and the alternative intracellular signaling domain of a chimeric antigen receptor with a different combination of ITGB3 and ITAM, in particular:
  vector pCDH-19CAR-T_CD28-ITGB3-ITGB3-eGFP (FIG. 15);
  vector pCDH-19CAR-T-CD28_ITGB3-ITGB3-ITGB3-eGFP (FIG. 17);
  vector pCDH-19CAR-T-CD28_ITAM1-ITGB3-ITGB3-eGFP (FIG. 19);
  vector pCDH-19CAR-T-CD28_ITAM1-ITAM2-ITGB3-eGFP (FIG. 21);
  vector pCDH-19CAR-T-CD28_ITAM1-ITGB3-ITAM2-eGFP (FIG. 23);
  vector pCDH-19CAR-T-CD28_ITGB3-ITAM2-ITGB3-eGFP (FIG. 25).

Example 4

Isolation and Activation of T Cells.

27 ml of venous peripheral blood was collected from a conditionally healthy voluntary donor in standard Vacutainer tubes containing a sterile solution of heparin sodium. To prepare a mononuclear cell fraction, 3 ml of a Ficoll solution (1.077 g/L density gradient) (PanEco, P052n), onto which venous blood was layered, was transferred into a sterile 15 ml centrifuge tube (Corning, 430791). The tubes were capped and centrifuged for 18 minutes at 1500 rpm at a temperature of 24° C. A mononuclear cell layer was collected from the phase interface. To obtain a population of T cells (CD3+), negative selection immunomagnetic separation was performed using the EasySep Human T Cell Enrichment Kit (Stemcell, 19051) according to the manufacturer's instructions. One round of immunomagnetic separation was performed.

The resulting T lymphocytes were concentrated in 1 ml of culture medium (RPMI-1640 supplemented with L-glutamine (Biolot, 1.3.4.1)+10% of fetal bovine serum (Gibco, 26140079)+100U IL2 (Ronkoleikin, LLC "NPK BIO-TECH"). T lymphocyte concentration was determined using a Countess® II FL cell counter and viability analyzer (Thermofisher, AMQAF1000). $12 \times 10^6$ T lymphocytes were transferred to a T75 culture flask for suspension cell cultures (Eppendorf, 0030711025) supplemented with 15 ml of culture medium. 300 ml of Dynabeads Human T-Activator CD3/CD28 for T Cell Expansion and Activation (Thermofisher, 11132D) was added to activate T lymphocytes. The culture vial was placed for 72 hours in a $CO_2$ incubator (37° S, 5% $CO_2$).

All works were carried out under sterile conditions in biosafety class 2 airflow cabinets.

Example 5

Transduction of Activated T-Lymphocytes by a Lentiviral Drug.

To transduce human T-lymphocytes, two lentiviral drugs were used: the first drug comprising the genes of anti-CD19-CAR-ITAMx3 and GFP (control) and the second drug (experimental drug), which is selected from the group of vectors produced in Example 3 (FIG. 1, FIG. 3, FIG. 5, FIG. 7, FIG. 11, FIG. 13, FIG. 15, FIG. 19, FIG. 21, FIG. 23, FIG. 25). The concentration of lentiviral particles (LVP/ml) in the both drugs was determined by ELISA. The transduction was performed in the format of a 15 ml bioreactor (TPP, 87017). Protamine sulfate (LLC Ellara) at a concentration of 50 μg/ml was used as a transduction activator. 5 $10^5$ activated T lymphocytes, lentiviral drug ($2 \times 10^5$ LVP/cell), protamine sulfate and 10 ml of culture medium were introduced into the bioreactor, the bioreactor was left for 5 hours in a Multitron shaker (110 RPM; 37° C.; 5% $CO_2$). After 5 hours, the bioreactor was taken out and centrifuged for 5 minutes at 1500 rpm, 24° C. The supernatant was removed, the precipitate was resuspended in 2 ml of culture medium, transferred to a culture 6-well plate for suspension cultures (Eppendorf, 0030720016) and placed in a $CO_2$ incubator (37° C., 5% $CO_2$). The transduction assay was performed after 72 hours. The efficiency of T lymphocyte transduction was determined based on the signal level of the GFP reporter protein, the efficiency was evaluated by flow cytometry. Propidium iodide dye was used to analyze cell viability.

The cytotoxic activity of the produced CAR T lymphocytes was determined in the presence of target cells expressing the CD19 receptor under direct co-cultivation. 10,000 CAR T lymphocytes and 5,000 target cells (Raji) were transferred to each well of a 48-well plate for suspension cultures (Eppendorf, 0030723015) in 1 ml of culture medium (RPMI-1640 supplemented with L-glutamine (Biolot, 1.3.4.1)+10% of fetal bovine serum (Gibco, 26140079)). The incubation time was 72 hours in a $CO_2$ incubator (37° C., 5% $CO_2$). The analysis was performed on a flow cytometer, the ratio of CD3 positive cells to CD3 negative cells was measured.

The BD Cytometric Bead Array (CBA) Human Th1/Th2 Cytokine Kit II (BD, 551809) was used to analyze the level of cytokines in the culture medium. The analysis was carried out according to the manufacturer's instructions.

The presence of CAR on the cell surface during interaction with the antigen causes the activation of the NFAT signaling cascade. Use of the Jurkat$^{\Delta TCRab}$ NFAT-GFP reporter cell line permitted to carry out screening of the genetic constructs of anti-CD19-CAR-ITAMx3 (control) and the drug of the experimental genetic construct, which is selected from the group of the vectors shown in FIG. 1, FIG. 3, FIG. 5, FIG. 7, FIG. 11, FIG. 13, FIG. 15, FIG. 17, FIG. 19, FIG. 21, FIG. 23, FIG. 25). The reporter cell line was transfected by electroporation (electroporation device: Neon, Thermo Scientific, USA). Raji cells were used as target cells expressing the CD19 receptor, incubation time was 6 hours in a $CO_2$ incubator (37° S, 5% $CO_2$). The analysis was performed on a flow cytometer, the intensity of the glow of the GFP reporter protein was measured (FIG. 27).

Example 6

Results.

By means of transduction by recombinant lentiviral vectors, we produced CAR T expressing the control CAR-ITAMx3, and experimental CAR T, which expressed one of the CAR variants (in accordance with a selected vector from the group of vectors shown in FIG. 1, FIG. 3, FIG. 5, FIG. 7, FIG. 11, FIG. 13, FIG. 15, FIG. 17, FIG. 19, FIG. 21, FIG. 23, FIG. 25), in particular:
  CAR-(costimulatory domain of 4-1BB)-(signaling domain with ITGB3x2);
  CAR-(costimulatory domain of 4-1BB)-(signaling domain with ITGB3x3);
  CAR-(costimulatory domain of 4-1BB)-(signaling domain with ITAMx2-ITGB3x1);
  CAR-(costimulatory domain of 4-1BB)-(signaling domain with ITAMx1-ITGB3x2);
  CAR-(costimulatory domain of CD28)-(signaling domain with ITGB3x2);
  CAR-(costimulatory domain of CD28)-(signaling domain with ITGB3x3);
  CAR-(costimulatory domain of CD28)-(signaling domain with ITAMx2-ITGB3x1);
  CAR-(costimulatory domain of CD28)-(signaling domain with ITAMx1-ITGB3x2).

The level of GFP expression in experimental cells (17.6%) was comparable to that of control GFP (15.63%).

Under direct co-cultivation of experimental CAR-Ts, where the CAR includes a signaling domain with only ITGB3x2 or only ITGB3x3 ("CAR-(costimulatory domain of 4-1BB)-(signaling domain with ITGB3x2)"; "CAR-(costimulatory domain of 4-1BB)-(signaling domain with ITGB3x3)"; "CAR-(costimulatory domain of CD28)-(signaling domain with ITGB3x2)"; "CAR-(costimulatory domain of CD28)-(signaling domain with ITGB3x3)") with CD19+ target cell of the Raji line (2:1), we observed low cytotoxic activity as compared to that of control CAR-ITAMx3.

Therefore, the above CAR-Ts, where the CAR includes a signaling domain with only ITGB3x2 or only ITGB3x3, were rejected and are not the subject of the present invention.

Under direct co-cultivation of various experimental CAR-ITAMx2-ITGB3x1 ("CAR-(costimulatory domain 4-1BB)-(signaling domain with ITAMx1-ITGB3x2)"; "CAR-(costimulatory domain CD28)-(signaling domain with ITAMx2-ITGB3x1)") with targetRaji CD19+ cells (2:1), a cytotoxic activity was observed comparable with respect to control CAR-ITAMx3. The cultivation of both variations of the CAR cells was accompanied by the secretion of proinflammatory cytokines IL-2 and IFN-γ that are characteristic of CAR-T lymphocytes (FIG. 28 (A, B, C)).

Similarly to the above, under direct co-cultivation of various experimental CAR-ITAMx1-ITGB3x2 ("CAR-(costimulatory domain 4-1BB)-(signaling domain with ITAMx1-ITGB3x2)"; "CAR-(costimulatory domain CD28)-(signaling domain with ITAMx1-ITGB3x2)") with target Raji CD19+ cells (2:1), a cytotoxic activity was observed comparable with respect to control CAR-ITAMx3.

Addition of the target (Raji CD19+) cells to the Jurkat$^{\Delta TCRab}$ NFAT-GFP reporter cell line expressing control CAR-ITAMx3 and various experimental CAR-ITAMx1-

ITGB3x2 ("CAR-(costimulatory domain 4-1BB)-(signaling domain with ITAMx1-ITGB3x2)"; "CAR-(costimulatory domain CD28)-(signaling domain with ITAMx1-ITGB3x2)") induces CAR-mediated activation of NFAT signaling cascade. Thus, the presence of a synthetic activation domain within the CAR receptor does not lead to a significant decrease in the CAR-dependent activation of cells expressing the corresponding genetic construct (FIG. 29).

Similarly to the above, addition of the target (Raji CD19+) cells to the Jurkat$^{\Delta TCRab}$ NFAT-GFP reporter cell line expressing control CAR-ITAMx3 and various experimental CAR-ITAMx1-ITGB3x2 ("CAR-(costimulatory domain 4-1BB)-(signaling domain with ITAMx1-ITGB3x2)"; "CAR-(costimulatory domain CD28)-(signaling domain with ITAMx1-ITGB3x2)") induces CAR-mediated activation of NFAT signaling cascade. Thus, the presence of a synthetic activation domain within the CAR receptor does not lead to a significant decrease in the CAR-dependent activation of cells expressing the corresponding genetic construct.

SEQUENCE LISTING

```
<160> NUMBER OF SEQ ID NOS: 35

<210> SEQ ID NO 1
<211> LENGTH: 29
<212> TYPE: PRT
<213> ORGANISM: Artificial sequence
<220> FEATURE:
<223> OTHER INFORMATION: Artificial ITAM1 sequence

<400> SEQUENCE: 1

Ala Pro Ala Tyr Lys Gln Gly Gln Asn Gln Leu Tyr Asn Glu Leu Asn
1               5                   10                  15

Leu Gly Arg Arg Glu Glu Tyr Asp Val Leu Asp Lys Arg
                20                  25

<210> SEQ ID NO 2
<211> LENGTH: 28
<212> TYPE: PRT
<213> ORGANISM: Artificial sequence
<220> FEATURE:
<223> OTHER INFORMATION: Artificial ITAM2 sequence

<400> SEQUENCE: 2

Pro Arg Arg Lys Asn Pro Gln Glu Gly Leu Tyr Asn Glu Leu Gln Lys
1               5                   10                  15

Asp Lys Met Ala Glu Ala Tyr Ser Glu Ile Gly Met
                20                  25

<210> SEQ ID NO 3
<211> LENGTH: 29
<212> TYPE: PRT
<213> ORGANISM: Artificial sequence
<220> FEATURE:
<223> OTHER INFORMATION: Artificial ITAM3 sequence

<400> SEQUENCE: 3

Glu Arg Arg Arg Gly Lys Gly His Asp Gly Leu Tyr Gln Gly Leu Ser
1               5                   10                  15

Thr Ala Thr Lys Asp Thr Tyr Asp Ala Leu His Met Gln
                20                  25

<210> SEQ ID NO 4
<211> LENGTH: 23
<212> TYPE: PRT
<213> ORGANISM: Artificial sequence
<220> FEATURE:
<223> OTHER INFORMATION: Artificial ITGB3 sequence

<400> SEQUENCE: 4

Asp Thr Ala Asn Asn Pro Leu Tyr Lys Glu Ala Thr Ser Thr Phe Thr
1               5                   10                  15

Asn Ile Thr Tyr Arg Gly Thr
                20
```

-continued

```
<210> SEQ ID NO 5
<211> LENGTH: 106
<212> TYPE: PRT
<213> ORGANISM: Artificial sequence
<220> FEATURE:
<223> OTHER INFORMATION: Artificial  ITAM1 - ITAM2 - ITGB3 sequence

<400> SEQUENCE: 5

Arg Val Lys Phe Ser Arg Ser Ala Asp Ala Pro Ala Tyr Lys Gln Gly
1               5                   10                  15

Gln Asn Gln Leu Tyr Asn Glu Leu Asn Leu Gly Arg Arg Glu Glu Tyr
            20                  25                  30

Asp Val Leu Asp Lys Arg Arg Gly Arg Asp Pro Glu Met Gly Gly Lys
        35                  40                  45

Pro Arg Arg Lys Asn Pro Gln Glu Gly Leu Tyr Asn Glu Leu Gln Lys
    50                  55                  60

Asp Lys Met Ala Glu Ala Tyr Ser Glu Ile Gly Met Lys Gly Asp Thr
65                  70                  75                  80

Ala Asn Asn Pro Leu Tyr Lys Glu Ala Thr Ser Thr Phe Thr Asn Ile
                85                  90                  95

Thr Tyr Arg Gly Thr Ala Leu Pro Pro Arg
            100                 105

<210> SEQ ID NO 6
<211> LENGTH: 106
<212> TYPE: PRT
<213> ORGANISM: Artificial sequence
<220> FEATURE:
<223> OTHER INFORMATION: Artificial  ITGB3 - ITAM2 - ITAM3 sequence

<400> SEQUENCE: 6

Arg Val Lys Phe Ser Arg Ser Ala Asp Thr Ala Asn Asn Pro Leu
1               5                   10                  15

Tyr Lys Glu Ala Thr Ser Thr Phe Thr Asn Ile Thr Tyr Arg Gly Thr
            20                  25                  30

Arg Gly Arg Asp Pro Glu Met Gly Gly Lys Pro Arg Arg Lys Asn Pro
        35                  40                  45

Gln Glu Gly Leu Tyr Asn Glu Leu Gln Lys Asp Lys Met Ala Glu Ala
    50                  55                  60

Tyr Ser Glu Ile Gly Met Lys Gly Glu Arg Arg Arg Gly Lys Gly His
65                  70                  75                  80

Asp Gly Leu Tyr Gln Gly Leu Ser Thr Ala Thr Lys Asp Thr Tyr Asp
                85                  90                  95

Ala Leu His Met Gln Ala Leu Pro Pro Arg
            100                 105

<210> SEQ ID NO 7
<211> LENGTH: 107
<212> TYPE: PRT
<213> ORGANISM: Artificial sequence
<220> FEATURE:
<223> OTHER INFORMATION: Artificial  ITGB3 - ITAM2 - ITAM3 sequence

<400> SEQUENCE: 7

Arg Val Lys Phe Ser Arg Ser Ala Asp Ala Pro Ala Tyr Lys Gln Gly
1               5                   10                  15

Gln Asn Gln Leu Tyr Asn Glu Leu Asn Leu Gly Arg Arg Glu Glu Tyr
            20                  25                  30

Asp Val Leu Asp Lys Arg Arg Gly Arg Asp Pro Glu Met Gly Gly Lys
```

```
            35                  40                  45
Asp Thr Ala Asn Asn Pro Leu Tyr Lys Glu Ala Thr Ser Thr Phe Thr
        50                  55                  60

Asn Ile Thr Tyr Arg Gly Thr Lys Gly Glu Arg Arg Gly Lys Gly
65                  70                  75                  80

His Asp Gly Leu Tyr Gln Gly Leu Ser Thr Ala Thr Lys Asp Thr Tyr
                85                  90                  95

Asp Ala Leu His Met Gln Ala Leu Pro Pro Arg
            100                 105

<210> SEQ ID NO 8
<211> LENGTH: 101
<212> TYPE: PRT
<213> ORGANISM: Artificial sequence
<220> FEATURE:
<223> OTHER INFORMATION: Artificial  ITAM1 - ITGB3 - ITGB3 sequence

<400> SEQUENCE: 8

Arg Val Lys Phe Ser Arg Ser Ala Asp Ala Pro Ala Tyr Lys Gln Gly
1               5                   10                  15

Gln Asn Gln Leu Tyr Asn Glu Leu Asn Leu Gly Arg Arg Glu Glu Tyr
            20                  25                  30

Asp Val Leu Asp Lys Arg Arg Gly Arg Asp Pro Glu Met Gly Gly Lys
        35                  40                  45

Asp Thr Ala Asn Asn Pro Leu Tyr Lys Glu Ala Thr Ser Thr Phe Thr
    50                  55                  60

Asn Ile Thr Tyr Arg Gly Thr Lys Gly Asp Thr Ala Asn Asn Pro Leu
65                  70                  75                  80

Tyr Lys Glu Ala Thr Ser Thr Phe Thr Asn Ile Thr Tyr Arg Gly Thr
                85                  90                  95

Ala Leu Pro Pro Arg
            100

<210> SEQ ID NO 9
<211> LENGTH: 100
<212> TYPE: PRT
<213> ORGANISM: Artificial sequence
<220> FEATURE:
<223> OTHER INFORMATION: Artificial ITGB3 - ITAM2 - ITGB3 sequence

<400> SEQUENCE: 9

Arg Val Lys Phe Ser Arg Ser Ala Asp Thr Ala Asn Asn Pro Leu
1               5                   10                  15

Tyr Lys Glu Ala Thr Ser Thr Phe Thr Asn Ile Thr Tyr Arg Gly Thr
            20                  25                  30

Arg Gly Arg Asp Pro Glu Met Gly Gly Lys Pro Arg Arg Lys Asn Pro
        35                  40                  45

Gln Glu Gly Leu Tyr Asn Glu Leu Gln Lys Asp Lys Met Ala Glu Ala
    50                  55                  60

Tyr Ser Glu Ile Gly Met Lys Gly Asp Thr Ala Asn Asn Pro Leu Tyr
65                  70                  75                  80

Lys Glu Ala Thr Ser Thr Phe Thr Asn Ile Thr Tyr Arg Gly Thr Ala
                85                  90                  95

Leu Pro Pro Arg
            100

<210> SEQ ID NO 10
<211> LENGTH: 101
```

```
<212> TYPE: PRT
<213> ORGANISM: Artificial sequence
<220> FEATURE:
<223> OTHER INFORMATION: Artificial  ITGB3-ITGB3 - ITAM3 sequence

<400> SEQUENCE: 10

Arg Val Lys Phe Ser Arg Ser Ala Asp Asp Thr Ala Asn Asn Pro Leu
1               5                   10                  15

Tyr Lys Glu Ala Thr Ser Thr Phe Thr Asn Ile Thr Tyr Arg Gly Thr
            20                  25                  30

Arg Gly Arg Asp Pro Glu Met Gly Gly Lys Asp Thr Ala Asn Asn Pro
        35                  40                  45

Leu Tyr Lys Glu Ala Thr Ser Thr Phe Thr Asn Ile Thr Tyr Arg Gly
50                  55                  60

Thr Lys Gly Glu Arg Arg Arg Gly Lys Gly His Asp Gly Leu Tyr Gln
65                  70                  75                  80

Gly Leu Ser Thr Ala Thr Lys Asp Thr Tyr Asp Ala Leu His Met Gln
                85                  90                  95

Ala Leu Pro Pro Arg
            100

<210> SEQ ID NO 11
<211> LENGTH: 245
<212> TYPE: PRT
<213> ORGANISM: Artificial sequence
<220> FEATURE:
<223> OTHER INFORMATION: Artificial sequence of an antigen-binding
      domain that is specific to the CD19 tumor antigen

<400> SEQUENCE: 11

Asp Ile Gln Met Thr Gln Thr Thr Ser Ser Leu Ser Ala Ser Leu Gly
1               5                   10                  15

Asp Arg Val Thr Ile Ser Cys Arg Ala Ser Gln Asp Ile Ser Lys Tyr
            20                  25                  30

Leu Asn Trp Tyr Gln Gln Lys Pro Asp Gly Thr Val Lys Leu Leu Ile
        35                  40                  45

Tyr His Thr Ser Arg Leu His Ser Gly Val Pro Ser Arg Phe Ser Gly
50                  55                  60

Ser Gly Ser Gly Thr Asp Tyr Ser Leu Thr Ile Ser Asn Leu Glu Gln
65                  70                  75                  80

Glu Asp Ile Ala Thr Tyr Phe Cys Gln Gln Gly Asn Thr Leu Pro Tyr
                85                  90                  95

Thr Phe Gly Gly Gly Thr Lys Leu Glu Ile Thr Gly Ser Thr Ser Gly
            100                 105                 110

Ser Gly Lys Pro Gly Ser Gly Glu Gly Ser Thr Lys Gly Glu Val Lys
        115                 120                 125

Leu Gln Glu Ser Gly Pro Gly Leu Val Ala Pro Ser Gln Ser Leu Ser
130                 135                 140

Val Thr Cys Thr Val Ser Gly Val Ser Leu Pro Asp Tyr Gly Val Ser
145                 150                 155                 160

Trp Ile Arg Gln Pro Pro Arg Lys Gly Leu Glu Trp Leu Gly Val Ile
            165                 170                 175

Trp Gly Ser Glu Thr Thr Tyr Tyr Asn Ser Ala Leu Lys Ser Arg Leu
        180                 185                 190

Thr Ile Ile Lys Asp Asn Ser Lys Ser Gln Val Phe Leu Lys Met Asn
    195                 200                 205

Ser Leu Gln Thr Asp Asp Thr Ala Ile Tyr Tyr Cys Ala Lys His Tyr
```

```
            210                 215                 220

Tyr Tyr Gly Gly Ser Tyr Ala Met Asp Tyr Trp Gly Gln Gly Thr Ser
225                 230                 235                 240

Val Thr Val Ser Ser
                245

<210> SEQ ID NO 12
<211> LENGTH: 24
<212> TYPE: PRT
<213> ORGANISM: Artificial sequence
<220> FEATURE:
<223> OTHER INFORMATION: Artificial sequence of the CD8 transmembrane
      domain

<400> SEQUENCE: 12

Ile Tyr Ile Trp Ala Pro Leu Ala Gly Thr Cys Gly Val Leu Leu Leu
1               5                   10                  15

Ser Leu Val Ile Thr Leu Tyr Cys
                20

<210> SEQ ID NO 13
<211> LENGTH: 222
<212> TYPE: PRT
<213> ORGANISM: Artificial sequence
<220> FEATURE:
<223> OTHER INFORMATION: Artificial sequence of the CD28 co-stimulatory
      domain

<400> SEQUENCE: 13

Ala Ala Ala Ile Glu Val Met Tyr Pro Pro Pro Tyr Leu Asp Asn Glu
1               5                   10                  15

Lys Ser Asn Gly Thr Ile Ile His Val Lys Gly Lys His Leu Cys Pro
                20                  25                  30

Ser Pro Leu Phe Pro Gly Pro Ser Lys Pro Phe Trp Val Leu Val Val
            35                  40                  45

Val Gly Gly Val Leu Ala Cys Tyr Ser Leu Leu Val Thr Val Ala Phe
50                  55                  60

Ile Ile Phe Trp Val Arg Ser Lys Arg Ser Arg Leu Leu His Ser Asp
65                  70                  75                  80

Tyr Met Asn Met Thr Pro Arg Arg Pro Gly Pro Thr Arg Lys His Tyr
                85                  90                  95

Gln Pro Tyr Ala Pro Pro Arg Asp Phe Ala Ala Tyr Arg Ser Arg Val
            100                 105                 110

Lys Phe Ser Arg Ser Ala Asp Ala Pro Ala Tyr Gln Gln Gly Gln Asn
        115                 120                 125

Gln Leu Tyr Asn Glu Leu Asn Leu Gly Arg Arg Glu Glu Tyr Asp Val
    130                 135                 140

Leu Asp Lys Arg Arg Gly Arg Asp Pro Glu Met Gly Gly Lys Pro Arg
145                 150                 155                 160

Arg Lys Asn Pro Gln Glu Gly Leu Tyr Asn Glu Leu Gln Lys Asp Lys
                165                 170                 175

Met Ala Glu Ala Tyr Ser Glu Ile Gly Met Lys Gly Glu Arg Arg Arg
            180                 185                 190

Gly Lys Gly His Asp Gly Leu Tyr Gln Gly Leu Ser Thr Ala Thr Lys
        195                 200                 205

Asp Thr Tyr Asp Ala Leu His Met Gln Ala Leu Pro Pro Arg
    210                 215                 220
```

```
<210> SEQ ID NO 14
<211> LENGTH: 42
<212> TYPE: PRT
<213> ORGANISM: Artificial sequence
<220> FEATURE:
<223> OTHER INFORMATION: Artificial sequence of the 4-1BB co-stimulatory
      domain

<400> SEQUENCE: 14

Lys Arg Gly Arg Lys Lys Leu Leu Tyr Ile Phe Lys Gln Pro Phe Met
1               5                   10                  15

Arg Pro Val Gln Thr Thr Gln Glu Glu Asp Gly Cys Ser Cys Arg Phe
            20                  25                  30

Pro Glu Glu Glu Glu Gly Gly Cys Glu Leu
        35                  40

<210> SEQ ID NO 15
<211> LENGTH: 669
<212> TYPE: PRT
<213> ORGANISM: Artificial sequence
<220> FEATURE:
<223> OTHER INFORMATION: Artificial 19CAR-T-CD28-cd3dzeta (ITGB3-ITAM2 -
      ITAM3) sequence

<400> SEQUENCE: 15

Met Leu Leu Leu Val Thr Ser Leu Leu Leu Cys Glu Leu Pro His Pro
1               5                   10                  15

Ala Phe Leu Leu Ile Pro Asp Ile Gln Met Thr Gln Thr Thr Ser Ser
            20                  25                  30

Leu Ser Ala Ser Leu Gly Asp Arg Val Thr Ile Ser Cys Arg Ala Ser
        35                  40                  45

Gln Asp Ile Ser Lys Tyr Leu Asn Trp Tyr Gln Gln Lys Pro Asp Gly
    50                  55                  60

Thr Val Lys Leu Leu Ile Tyr His Thr Ser Arg Leu His Ser Gly Val
65                  70                  75                  80

Pro Ser Arg Phe Ser Gly Ser Gly Ser Gly Thr Asp Tyr Ser Leu Thr
                85                  90                  95

Ile Ser Asn Leu Glu Gln Glu Asp Ile Ala Thr Tyr Phe Cys Gln Gln
            100                 105                 110

Gly Asn Thr Leu Pro Tyr Thr Phe Gly Gly Gly Thr Lys Leu Glu Ile
        115                 120                 125

Thr Gly Ser Thr Ser Gly Ser Gly Lys Pro Gly Ser Gly Glu Gly Ser
    130                 135                 140

Thr Lys Gly Glu Val Lys Leu Gln Glu Ser Gly Pro Gly Leu Val Ala
145                 150                 155                 160

Pro Ser Gln Ser Leu Ser Val Thr Cys Thr Val Ser Gly Val Ser Leu
                165                 170                 175

Pro Asp Tyr Gly Val Ser Trp Ile Arg Gln Pro Pro Arg Lys Gly Leu
            180                 185                 190

Glu Trp Leu Gly Val Ile Trp Gly Ser Glu Thr Thr Tyr Tyr Asn Ser
        195                 200                 205

Ala Leu Lys Ser Arg Leu Thr Ile Ile Lys Asp Asn Ser Lys Ser Gln
    210                 215                 220

Val Phe Leu Lys Met Asn Ser Leu Gln Thr Asp Asp Thr Ala Ile Tyr
225                 230                 235                 240

Tyr Cys Ala Lys His Tyr Tyr Tyr Gly Gly Ser Tyr Ala Met Asp Tyr
                245                 250                 255

Trp Gly Gln Gly Thr Ser Val Thr Val Ser Ser Thr Thr Thr Pro Ala
```

```
                    260                 265                 270
Pro Arg Pro Thr Pro Ala Pro Thr Ile Ala Ser Gln Pro Leu Ser
            275                 280                 285

Leu Arg Pro Glu Ala Cys Arg Pro Ala Ala Gly Gly Ala Val His Thr
290                 295                 300

Arg Gly Leu Asp Phe Ala Cys Asp Ile Tyr Ile Trp Ala Pro Leu Ala
305                 310                 315                 320

Gly Thr Cys Gly Val Leu Leu Leu Ser Leu Val Ile Thr Leu Tyr Cys
            325                 330                 335

Ala Ala Ala Ile Glu Val Met Tyr Pro Pro Tyr Leu Asp Asn Glu
            340                 345                 350

Lys Ser Asn Gly Thr Ile Ile His Val Lys Gly Lys His Leu Cys Pro
            355                 360                 365

Ser Pro Leu Phe Pro Gly Pro Ser Lys Pro Phe Trp Val Leu Val Val
370                 375                 380

Val Gly Gly Val Leu Ala Cys Tyr Ser Leu Leu Val Thr Val Ala Phe
385                 390                 395                 400

Ile Ile Phe Trp Val Arg Ser Lys Arg Ser Arg Leu Leu His Ser Asp
                405                 410                 415

Tyr Met Asn Met Thr Pro Arg Arg Pro Gly Pro Thr Arg Lys His Tyr
                420                 425                 430

Gln Pro Tyr Ala Pro Pro Arg Asp Phe Ala Ala Tyr Arg Ser Arg Val
            435                 440                 445

Lys Phe Ser Arg Ser Ala Asp Ala Pro Ala Tyr Gln Gln Gly Gln Asn
    450                 455                 460

Gln Leu Tyr Asn Glu Leu Asn Leu Gly Arg Arg Glu Glu Tyr Asp Val
465                 470                 475                 480

Leu Asp Lys Arg Arg Gly Arg Asp Pro Glu Met Gly Gly Lys Pro Arg
            485                 490                 495

Arg Lys Asn Pro Gln Glu Gly Leu Tyr Asn Glu Leu Gln Lys Asp Lys
            500                 505                 510

Met Ala Glu Ala Tyr Ser Glu Ile Gly Met Lys Gly Glu Arg Arg Arg
            515                 520                 525

Gly Lys Gly His Asp Gly Leu Tyr Gln Gly Leu Ser Thr Ala Thr Lys
            530                 535                 540

Asp Thr Tyr Asp Ala Leu His Met Gln Ala Leu Pro Pro Arg Arg Val
545                 550                 555                 560

Lys Phe Ser Arg Ser Ala Asp Asp Thr Ala Asn Asn Pro Leu Tyr Lys
            565                 570                 575

Glu Ala Thr Ser Thr Phe Thr Asn Ile Thr Tyr Arg Gly Thr Arg Gly
            580                 585                 590

Arg Asp Pro Glu Met Gly Gly Lys Pro Arg Arg Lys Asn Pro Gln Glu
            595                 600                 605

Gly Leu Tyr Asn Glu Leu Gln Lys Asp Lys Met Ala Glu Ala Tyr Ser
            610                 615                 620

Glu Ile Gly Met Lys Gly Glu Arg Arg Arg Gly Lys Gly His Asp Gly
625                 630                 635                 640

Leu Tyr Gln Gly Leu Ser Thr Ala Thr Lys Asp Thr Tyr Asp Ala Leu
            645                 650                 655

His Met Gln Ala Leu Pro Pro Arg Gly Ser Ala Ala Ala
            660                 665
```

<210> SEQ ID NO 16

<211> LENGTH: 670
<212> TYPE: PRT
<213> ORGANISM: Artificial sequence
<220> FEATURE:
<223> OTHER INFORMATION: Artificial 19KAR-T-CD28-cd3dzeta (ITAM1-ITGB3 - ITAM3) sequence

<400> SEQUENCE: 16

```
Met Leu Leu Leu Val Thr Ser Leu Leu Leu Cys Glu Leu Pro His Pro
1               5                   10                  15

Ala Phe Leu Leu Ile Pro Asp Ile Gln Met Thr Gln Thr Thr Ser Ser
                20                  25                  30

Leu Ser Ala Ser Leu Gly Asp Arg Val Thr Ile Ser Cys Arg Ala Ser
            35                  40                  45

Gln Asp Ile Ser Lys Tyr Leu Asn Trp Tyr Gln Gln Lys Pro Asp Gly
        50                  55                  60

Thr Val Lys Leu Leu Ile Tyr His Thr Ser Arg Leu His Ser Gly Val
65                  70                  75                  80

Pro Ser Arg Phe Ser Gly Ser Gly Ser Gly Thr Asp Tyr Ser Leu Thr
                85                  90                  95

Ile Ser Asn Leu Glu Gln Glu Asp Ile Ala Thr Tyr Phe Cys Gln Gln
            100                 105                 110

Gly Asn Thr Leu Pro Tyr Thr Phe Gly Gly Gly Thr Lys Leu Glu Ile
        115                 120                 125

Thr Gly Ser Thr Ser Gly Ser Gly Lys Pro Gly Ser Gly Glu Gly Ser
130                 135                 140

Thr Lys Gly Glu Val Lys Leu Gln Glu Ser Gly Pro Gly Leu Val Ala
145                 150                 155                 160

Pro Ser Gln Ser Leu Ser Val Thr Cys Thr Val Ser Gly Val Ser Leu
                165                 170                 175

Pro Asp Tyr Gly Val Ser Trp Ile Arg Gln Pro Pro Arg Lys Gly Leu
            180                 185                 190

Glu Trp Leu Gly Val Ile Trp Gly Ser Glu Thr Thr Tyr Tyr Asn Ser
        195                 200                 205

Ala Leu Lys Ser Arg Leu Thr Ile Ile Lys Asp Asn Ser Lys Ser Gln
    210                 215                 220

Val Phe Leu Lys Met Asn Ser Leu Gln Thr Asp Asp Thr Ala Ile Tyr
225                 230                 235                 240

Tyr Cys Ala Lys His Tyr Tyr Gly Gly Ser Tyr Ala Met Asp Tyr
                245                 250                 255

Trp Gly Gln Gly Thr Ser Val Thr Val Ser Ser Thr Thr Thr Pro Ala
            260                 265                 270

Pro Arg Pro Pro Thr Pro Ala Pro Thr Ile Ala Ser Gln Pro Leu Ser
        275                 280                 285

Leu Arg Pro Glu Ala Cys Arg Pro Ala Ala Gly Gly Ala Val His Thr
    290                 295                 300

Arg Gly Leu Asp Phe Ala Cys Asp Ile Tyr Ile Trp Ala Pro Leu Ala
305                 310                 315                 320

Gly Thr Cys Gly Val Leu Leu Leu Ser Leu Val Ile Thr Leu Tyr Cys
                325                 330                 335

Ala Ala Ala Ile Glu Val Met Tyr Pro Pro Tyr Leu Asp Asn Glu
            340                 345                 350

Lys Ser Asn Gly Thr Ile Ile His Val Lys Gly Lys His Leu Cys Pro
        355                 360                 365

Ser Pro Leu Phe Pro Gly Pro Ser Lys Pro Phe Trp Val Leu Val Val
```

```
                    370                 375                 380
Val Gly Gly Val Leu Ala Cys Tyr Ser Leu Leu Val Thr Val Ala Phe
385                 390                 395                 400

Ile Ile Phe Trp Val Arg Ser Lys Arg Ser Arg Leu Leu His Ser Asp
                405                 410                 415

Tyr Met Asn Met Thr Pro Arg Arg Pro Gly Pro Thr Arg Lys His Tyr
                420                 425                 430

Gln Pro Tyr Ala Pro Pro Arg Asp Phe Ala Ala Tyr Arg Ser Arg Val
                435                 440                 445

Lys Phe Ser Arg Ser Ala Asp Ala Pro Ala Tyr Gln Gln Gly Gln Asn
                450                 455                 460

Gln Leu Tyr Asn Glu Leu Asn Leu Gly Arg Arg Glu Glu Tyr Asp Val
465                 470                 475                 480

Leu Asp Lys Arg Arg Gly Arg Asp Pro Glu Met Gly Gly Lys Pro Arg
                485                 490                 495

Arg Lys Asn Pro Gln Glu Gly Leu Tyr Asn Glu Leu Gln Lys Asp Lys
                500                 505                 510

Met Ala Glu Ala Tyr Ser Glu Ile Gly Met Lys Gly Glu Arg Arg Arg
                515                 520                 525

Gly Lys Gly His Asp Gly Leu Tyr Gln Gly Leu Ser Thr Ala Thr Lys
                530                 535                 540

Asp Thr Tyr Asp Ala Leu His Met Gln Ala Leu Pro Pro Arg Arg Val
545                 550                 555                 560

Lys Phe Ser Arg Ser Ala Asp Ala Pro Ala Tyr Lys Gln Gly Gln Asn
                565                 570                 575

Gln Leu Tyr Asn Glu Leu Asn Leu Gly Arg Arg Glu Glu Tyr Asp Val
                580                 585                 590

Leu Asp Lys Arg Arg Gly Arg Asp Pro Glu Met Gly Gly Lys Asp Thr
                595                 600                 605

Ala Asn Asn Pro Leu Tyr Lys Glu Ala Thr Ser Thr Phe Thr Asn Ile
                610                 615                 620

Thr Tyr Arg Gly Thr Lys Gly Glu Arg Arg Gly Lys Gly His Asp
625                 630                 635                 640

Gly Leu Tyr Gln Gly Leu Ser Thr Ala Thr Lys Asp Thr Tyr Asp Ala
                645                 650                 655

Leu His Met Gln Ala Leu Pro Pro Arg Gly Ser Ala Ala Ala
                660                 665                 670

<210> SEQ ID NO 17
<211> LENGTH: 669
<212> TYPE: PRT
<213> ORGANISM: Artificial sequence
<220> FEATURE:
<223> OTHER INFORMATION: Artificial 19CAR-T-CD28-cd3dzeta (ITAM1-ITAM2 -
      ITGB3) sequence

<400> SEQUENCE: 17

Met Leu Leu Leu Val Thr Ser Leu Leu Leu Cys Glu Leu Pro His Pro
1               5                   10                  15

Ala Phe Leu Leu Ile Pro Asp Ile Gln Met Thr Gln Thr Thr Ser Ser
                20                  25                  30

Leu Ser Ala Ser Leu Gly Asp Arg Val Thr Ile Ser Cys Arg Ala Ser
            35                  40                  45

Gln Asp Ile Ser Lys Tyr Leu Asn Trp Tyr Gln Gln Lys Pro Asp Gly
        50                  55                  60
```

-continued

Thr Val Lys Leu Leu Ile Tyr His Thr Ser Arg Leu His Ser Gly Val
65                  70                  75                  80

Pro Ser Arg Phe Ser Gly Ser Gly Ser Gly Thr Asp Tyr Ser Leu Thr
            85                  90                  95

Ile Ser Asn Leu Glu Gln Glu Asp Ile Ala Thr Tyr Phe Cys Gln Gln
        100                 105                 110

Gly Asn Thr Leu Pro Tyr Thr Phe Gly Gly Gly Thr Lys Leu Glu Ile
        115                 120                 125

Thr Gly Ser Thr Ser Gly Ser Gly Lys Pro Gly Ser Gly Glu Gly Ser
130                 135                 140

Thr Lys Gly Glu Val Lys Leu Gln Glu Ser Gly Pro Gly Leu Val Ala
145                 150                 155                 160

Pro Ser Gln Ser Leu Ser Val Thr Cys Thr Val Ser Gly Val Ser Leu
            165                 170                 175

Pro Asp Tyr Gly Val Ser Trp Ile Arg Gln Pro Pro Arg Lys Gly Leu
            180                 185                 190

Glu Trp Leu Gly Val Ile Trp Gly Ser Glu Thr Thr Tyr Tyr Asn Ser
        195                 200                 205

Ala Leu Lys Ser Arg Leu Thr Ile Ile Lys Asp Asn Ser Lys Ser Gln
210                 215                 220

Val Phe Leu Lys Met Asn Ser Leu Gln Thr Asp Asp Thr Ala Ile Tyr
225                 230                 235                 240

Tyr Cys Ala Lys His Tyr Tyr Gly Gly Ser Tyr Ala Met Asp Tyr
            245                 250                 255

Trp Gly Gln Gly Thr Ser Val Thr Val Ser Ser Thr Thr Thr Pro Ala
        260                 265                 270

Pro Arg Pro Pro Thr Pro Ala Pro Thr Ile Ala Ser Gln Pro Leu Ser
        275                 280                 285

Leu Arg Pro Glu Ala Cys Arg Pro Ala Ala Gly Gly Ala Val His Thr
        290                 295                 300

Arg Gly Leu Asp Phe Ala Cys Asp Ile Tyr Ile Trp Ala Pro Leu Ala
305                 310                 315                 320

Gly Thr Cys Gly Val Leu Leu Leu Ser Leu Val Ile Thr Leu Tyr Cys
            325                 330                 335

Ala Ala Ala Ile Glu Val Met Tyr Pro Pro Tyr Leu Asp Asn Glu
            340                 345                 350

Lys Ser Asn Gly Thr Ile Ile His Val Lys Gly Lys His Leu Cys Pro
        355                 360                 365

Ser Pro Leu Phe Pro Gly Pro Ser Lys Pro Phe Trp Val Leu Val Val
370                 375                 380

Val Gly Gly Val Leu Ala Cys Tyr Ser Leu Leu Val Thr Val Ala Phe
385                 390                 395                 400

Ile Ile Phe Trp Val Arg Ser Lys Arg Ser Arg Leu Leu His Ser Asp
            405                 410                 415

Tyr Met Asn Met Thr Pro Arg Arg Pro Gly Pro Thr Arg Lys His Tyr
        420                 425                 430

Gln Pro Tyr Ala Pro Pro Arg Asp Phe Ala Ala Tyr Arg Ser Arg Val
        435                 440                 445

Lys Phe Ser Arg Ser Ala Asp Ala Pro Ala Tyr Gln Gln Gly Gln Asn
        450                 455                 460

Gln Leu Tyr Asn Glu Leu Asn Leu Gly Arg Arg Glu Glu Tyr Asp Val
465                 470                 475                 480

Leu Asp Lys Arg Arg Gly Arg Asp Pro Glu Met Gly Gly Lys Pro Arg

```
                        485                 490                 495
Arg Lys Asn Pro Gln Glu Gly Leu Tyr Asn Glu Leu Gln Lys Asp Lys
                500                 505                 510

Met Ala Glu Ala Tyr Ser Glu Ile Gly Met Lys Gly Glu Arg Arg
        515                 520                 525

Gly Lys Gly His Asp Gly Leu Tyr Gln Gly Leu Ser Thr Ala Thr Lys
        530                 535                 540

Asp Thr Tyr Asp Ala Leu His Met Gln Ala Leu Pro Pro Arg Arg Val
545                 550                 555                 560

Lys Phe Ser Arg Ser Ala Asp Ala Pro Ala Tyr Lys Gln Gly Gln Asn
                565                 570                 575

Gln Leu Tyr Asn Glu Leu Asn Leu Gly Arg Arg Glu Glu Tyr Asp Val
                580                 585                 590

Leu Asp Lys Arg Arg Gly Arg Asp Pro Glu Met Gly Gly Lys Pro Arg
                595                 600                 605

Arg Lys Asn Pro Gln Glu Gly Leu Tyr Asn Glu Leu Gln Lys Asp Lys
                610                 615                 620

Met Ala Glu Ala Tyr Ser Glu Ile Gly Met Lys Gly Asp Thr Ala Asn
625                 630                 635                 640

Asn Pro Leu Tyr Lys Glu Ala Thr Ser Thr Phe Thr Asn Ile Thr Tyr
                645                 650                 655

Arg Gly Thr Ala Leu Pro Pro Arg Gly Ser Ala Ala Ala
                660                 665

<210> SEQ ID NO 18
<211> LENGTH: 664
<212> TYPE: PRT
<213> ORGANISM: Artificial sequence
<220> FEATURE:
<223> OTHER INFORMATION: Artificial 19KAR-T-CD28-cd3dzeta (ITGB3-ITGB3 -
      ITAM3) sequence

<400> SEQUENCE: 18

Met Leu Leu Leu Val Thr Ser Leu Leu Leu Cys Glu Leu Pro His Pro
1               5                   10                  15

Ala Phe Leu Leu Ile Pro Asp Ile Gln Met Thr Gln Thr Thr Ser Ser
                20                  25                  30

Leu Ser Ala Ser Leu Gly Asp Arg Val Thr Ile Ser Cys Arg Ala Ser
            35                  40                  45

Gln Asp Ile Ser Lys Tyr Leu Asn Trp Tyr Gln Gln Lys Pro Asp Gly
        50                  55                  60

Thr Val Lys Leu Leu Ile Tyr His Thr Ser Arg Leu His Ser Gly Val
65                  70                  75                  80

Pro Ser Arg Phe Ser Gly Ser Gly Ser Gly Thr Asp Tyr Ser Leu Thr
                85                  90                  95

Ile Ser Asn Leu Glu Gln Glu Asp Ile Ala Thr Tyr Phe Cys Gln Gln
                100                 105                 110

Gly Asn Thr Leu Pro Tyr Thr Phe Gly Gly Gly Thr Lys Leu Glu Ile
            115                 120                 125

Thr Gly Ser Thr Ser Gly Ser Gly Lys Pro Gly Ser Gly Glu Gly Ser
        130                 135                 140

Thr Lys Gly Glu Val Lys Leu Gln Glu Ser Gly Pro Gly Leu Val Ala
145                 150                 155                 160

Pro Ser Gln Ser Leu Ser Val Thr Cys Thr Val Ser Gly Val Ser Leu
                165                 170                 175
```

-continued

Pro Asp Tyr Gly Val Ser Trp Ile Arg Gln Pro Pro Arg Lys Gly Leu
                180                 185                 190
Glu Trp Leu Gly Val Ile Trp Gly Ser Glu Thr Thr Tyr Tyr Asn Ser
            195                 200                 205
Ala Leu Lys Ser Arg Leu Thr Ile Ile Lys Asp Asn Ser Lys Ser Gln
        210                 215                 220
Val Phe Leu Lys Met Asn Ser Leu Gln Thr Asp Asp Thr Ala Ile Tyr
225                 230                 235                 240
Tyr Cys Ala Lys His Tyr Tyr Gly Gly Ser Tyr Ala Met Asp Tyr
                245                 250                 255
Trp Gly Gln Gly Thr Ser Val Thr Val Ser Ser Thr Thr Pro Ala
                260                 265                 270
Pro Arg Pro Pro Thr Pro Ala Pro Thr Ile Ala Ser Gln Pro Leu Ser
        275                 280                 285
Leu Arg Pro Glu Ala Cys Arg Pro Ala Ala Gly Gly Ala Val His Thr
        290                 295                 300
Arg Gly Leu Asp Phe Ala Cys Asp Ile Tyr Ile Trp Ala Pro Leu Ala
305                 310                 315                 320
Gly Thr Cys Gly Val Leu Leu Leu Ser Leu Val Ile Thr Leu Tyr Cys
                325                 330                 335
Ala Ala Ala Ile Glu Val Met Tyr Pro Pro Pro Tyr Leu Asp Asn Glu
                340                 345                 350
Lys Ser Asn Gly Thr Ile Ile His Val Lys Gly Lys His Leu Cys Pro
            355                 360                 365
Ser Pro Leu Phe Pro Gly Pro Ser Lys Pro Phe Trp Val Leu Val Val
370                 375                 380
Val Gly Gly Val Leu Ala Cys Tyr Ser Leu Leu Val Thr Val Ala Phe
385                 390                 395                 400
Ile Ile Phe Trp Val Arg Ser Lys Arg Ser Arg Leu Leu His Ser Asp
                405                 410                 415
Tyr Met Asn Met Thr Pro Arg Arg Pro Gly Pro Thr Arg Lys His Tyr
                420                 425                 430
Gln Pro Tyr Ala Pro Pro Arg Asp Phe Ala Ala Tyr Arg Ser Arg Val
        435                 440                 445
Lys Phe Ser Arg Ser Ala Asp Ala Pro Ala Tyr Gln Gln Gly Gln Asn
        450                 455                 460
Gln Leu Tyr Asn Glu Leu Asn Leu Gly Arg Arg Glu Glu Tyr Asp Val
465                 470                 475                 480
Leu Asp Lys Arg Arg Gly Arg Asp Pro Glu Met Gly Gly Lys Pro Arg
                485                 490                 495
Arg Lys Asn Pro Gln Glu Gly Leu Tyr Asn Glu Leu Gln Lys Asp Lys
            500                 505                 510
Met Ala Glu Ala Tyr Ser Glu Ile Gly Met Lys Gly Glu Arg Arg Arg
        515                 520                 525
Gly Lys Gly His Asp Gly Leu Tyr Gln Gly Leu Ser Thr Ala Thr Lys
        530                 535                 540
Asp Thr Tyr Asp Ala Leu His Met Gln Ala Leu Pro Pro Arg Arg Val
545                 550                 555                 560
Lys Phe Ser Arg Ser Ala Asp Asp Thr Ala Asn Asn Pro Leu Tyr Lys
                565                 570                 575
Glu Ala Thr Ser Thr Phe Thr Asn Ile Thr Tyr Arg Gly Thr Arg Gly
            580                 585                 590
Arg Asp Pro Glu Met Gly Gly Lys Asp Thr Ala Asn Asn Pro Leu Tyr

-continued

```
                595                 600                 605
Lys Glu Ala Thr Ser Thr Phe Thr Asn Ile Thr Tyr Arg Gly Thr Lys
    610                 615                 620

Gly Glu Arg Arg Gly Lys Gly His Asp Gly Leu Tyr Gln Gly Leu
625                 630                 635                 640

Ser Thr Ala Thr Lys Asp Thr Tyr Asp Ala Leu His Met Gln Ala Leu
                645                 650                 655

Pro Pro Arg Gly Ser Ala Ala Ala
                660

<210> SEQ ID NO 19
<211> LENGTH: 664
<212> TYPE: PRT
<213> ORGANISM: Artificial sequence
<220> FEATURE:
<223> OTHER INFORMATION: Artificial 19KAR-T-CD28-cd3dzeta (ITAM1-ITGB3 -
      ITGB3) sequence

<400> SEQUENCE: 19

Met Leu Leu Leu Val Thr Ser Leu Leu Leu Cys Glu Leu Pro His Pro
1               5                   10                  15

Ala Phe Leu Leu Ile Pro Asp Ile Gln Met Thr Gln Thr Thr Ser Ser
            20                  25                  30

Leu Ser Ala Ser Leu Gly Asp Arg Val Thr Ile Ser Cys Arg Ala Ser
        35                  40                  45

Gln Asp Ile Ser Lys Tyr Leu Asn Trp Tyr Gln Gln Lys Pro Asp Gly
    50                  55                  60

Thr Val Lys Leu Leu Ile Tyr His Thr Ser Arg Leu His Ser Gly Val
65                  70                  75                  80

Pro Ser Arg Phe Ser Gly Ser Gly Ser Gly Thr Asp Tyr Ser Leu Thr
                85                  90                  95

Ile Ser Asn Leu Glu Gln Glu Asp Ile Ala Thr Tyr Phe Cys Gln Gln
            100                 105                 110

Gly Asn Thr Leu Pro Tyr Thr Phe Gly Gly Gly Thr Lys Leu Glu Ile
        115                 120                 125

Thr Gly Ser Thr Ser Gly Ser Gly Lys Pro Gly Ser Gly Glu Gly Ser
    130                 135                 140

Thr Lys Gly Glu Val Lys Leu Gln Glu Ser Gly Pro Gly Leu Val Ala
145                 150                 155                 160

Pro Ser Gln Ser Leu Ser Val Thr Cys Thr Val Ser Gly Val Ser Leu
                165                 170                 175

Pro Asp Tyr Gly Val Ser Trp Ile Arg Gln Pro Pro Arg Lys Gly Leu
            180                 185                 190

Glu Trp Leu Gly Val Ile Trp Gly Ser Glu Thr Thr Tyr Tyr Asn Ser
        195                 200                 205

Ala Leu Lys Ser Arg Leu Thr Ile Ile Lys Asp Asn Ser Lys Ser Gln
    210                 215                 220

Val Phe Leu Lys Met Asn Ser Leu Gln Thr Asp Asp Thr Ala Ile Tyr
225                 230                 235                 240

Tyr Cys Ala Lys His Tyr Tyr Tyr Gly Gly Ser Tyr Ala Met Asp Tyr
                245                 250                 255

Trp Gly Gln Gly Thr Ser Val Thr Val Ser Ser Thr Thr Thr Pro Ala
            260                 265                 270

Pro Arg Pro Pro Thr Pro Ala Pro Thr Ile Ala Ser Gln Pro Leu Ser
        275                 280                 285
```

```
Leu Arg Pro Glu Ala Cys Arg Pro Ala Ala Gly Gly Ala Val His Thr
    290                 295                 300
Arg Gly Leu Asp Phe Ala Cys Asp Ile Tyr Ile Trp Ala Pro Leu Ala
305                 310                 315                 320
Gly Thr Cys Gly Val Leu Leu Leu Ser Leu Val Ile Thr Leu Tyr Cys
                325                 330                 335
Ala Ala Ala Ile Glu Val Met Tyr Pro Pro Tyr Leu Asp Asn Glu
            340                 345                 350
Lys Ser Asn Gly Thr Ile Ile His Val Lys Gly Lys His Leu Cys Pro
        355                 360                 365
Ser Pro Leu Phe Pro Gly Pro Ser Lys Pro Phe Trp Val Leu Val Val
370                 375                 380
Val Gly Gly Val Leu Ala Cys Tyr Ser Leu Leu Val Thr Val Ala Phe
385                 390                 395                 400
Ile Ile Phe Trp Val Arg Ser Lys Arg Ser Arg Leu Leu His Ser Asp
                405                 410                 415
Tyr Met Asn Met Thr Pro Arg Arg Pro Gly Pro Thr Arg Lys His Tyr
            420                 425                 430
Gln Pro Tyr Ala Pro Pro Arg Asp Phe Ala Ala Tyr Arg Ser Arg Val
        435                 440                 445
Lys Phe Ser Arg Ser Ala Asp Ala Pro Ala Tyr Gln Gln Gly Gln Asn
450                 455                 460
Gln Leu Tyr Asn Glu Leu Asn Leu Gly Arg Arg Glu Glu Tyr Asp Val
465                 470                 475                 480
Leu Asp Lys Arg Arg Gly Arg Asp Pro Glu Met Gly Gly Lys Pro Arg
                485                 490                 495
Arg Lys Asn Pro Gln Glu Gly Leu Tyr Asn Glu Leu Gln Lys Asp Lys
            500                 505                 510
Met Ala Glu Ala Tyr Ser Glu Ile Gly Met Lys Gly Glu Arg Arg Arg
        515                 520                 525
Gly Lys Gly His Asp Gly Leu Tyr Gln Gly Leu Ser Thr Ala Thr Lys
530                 535                 540
Asp Thr Tyr Asp Ala Leu His Met Gln Ala Leu Pro Pro Arg Arg Val
545                 550                 555                 560
Lys Phe Ser Arg Ser Ala Asp Ala Pro Ala Tyr Lys Gln Gly Gln Asn
                565                 570                 575
Gln Leu Tyr Asn Glu Leu Asn Leu Gly Arg Arg Glu Glu Tyr Asp Val
            580                 585                 590
Leu Asp Lys Arg Arg Gly Arg Asp Pro Glu Met Gly Gly Lys Asp Thr
        595                 600                 605
Ala Asn Asn Pro Leu Tyr Lys Glu Ala Thr Ser Thr Phe Thr Asn Ile
610                 615                 620
Thr Tyr Arg Gly Thr Lys Gly Asp Thr Ala Asn Asn Pro Leu Tyr Lys
625                 630                 635                 640
Glu Ala Thr Ser Thr Phe Thr Asn Ile Thr Tyr Arg Gly Thr Ala Leu
                645                 650                 655
Pro Pro Arg Gly Ser Ala Ala Ala
            660

<210> SEQ ID NO 20
<211> LENGTH: 663
<212> TYPE: PRT
<213> ORGANISM: Artificial sequence
<220> FEATURE:
<223> OTHER INFORMATION: Artificial 19KAR-T-CD28-cd3dzeta (ITGB3-ITAM2 -
```

ITGB3) sequence

<400> SEQUENCE: 20

```
Met Leu Leu Leu Val Thr Ser Leu Leu Leu Cys Glu Leu Pro His Pro
1               5                   10                  15
Ala Phe Leu Leu Ile Pro Asp Ile Gln Met Thr Gln Thr Thr Ser Ser
            20                  25                  30
Leu Ser Ala Ser Leu Gly Asp Arg Val Thr Ile Ser Cys Arg Ala Ser
        35                  40                  45
Gln Asp Ile Ser Lys Tyr Leu Asn Trp Tyr Gln Gln Lys Pro Asp Gly
    50                  55                  60
Thr Val Lys Leu Leu Ile Tyr His Thr Ser Arg Leu His Ser Gly Val
65                  70                  75                  80
Pro Ser Arg Phe Ser Gly Ser Gly Ser Gly Thr Asp Tyr Ser Leu Thr
                85                  90                  95
Ile Ser Asn Leu Glu Gln Glu Asp Ile Ala Thr Tyr Phe Cys Gln Gln
            100                 105                 110
Gly Asn Thr Leu Pro Tyr Thr Phe Gly Gly Gly Thr Lys Leu Glu Ile
        115                 120                 125
Thr Gly Ser Thr Ser Gly Ser Gly Lys Pro Gly Ser Gly Glu Gly Ser
    130                 135                 140
Thr Lys Gly Glu Val Lys Leu Gln Glu Ser Gly Pro Gly Leu Val Ala
145                 150                 155                 160
Pro Ser Gln Ser Leu Ser Val Thr Cys Thr Val Ser Gly Val Ser Leu
                165                 170                 175
Pro Asp Tyr Gly Val Ser Trp Ile Arg Gln Pro Pro Arg Lys Gly Leu
            180                 185                 190
Glu Trp Leu Gly Val Ile Trp Gly Ser Glu Thr Thr Tyr Tyr Asn Ser
        195                 200                 205
Ala Leu Lys Ser Arg Leu Thr Ile Ile Lys Asp Asn Ser Lys Ser Gln
    210                 215                 220
Val Phe Leu Lys Met Asn Ser Leu Gln Thr Asp Asp Thr Ala Ile Tyr
225                 230                 235                 240
Tyr Cys Ala Lys His Tyr Tyr Gly Gly Ser Tyr Ala Met Asp Tyr
                245                 250                 255
Trp Gly Gln Gly Thr Ser Val Thr Val Ser Ser Thr Thr Thr Pro Ala
            260                 265                 270
Pro Arg Pro Pro Thr Pro Ala Pro Thr Ile Ala Ser Gln Pro Leu Ser
        275                 280                 285
Leu Arg Pro Glu Ala Cys Arg Pro Ala Ala Gly Gly Ala Val His Thr
    290                 295                 300
Arg Gly Leu Asp Phe Ala Cys Asp Ile Tyr Ile Trp Ala Pro Leu Ala
305                 310                 315                 320
Gly Thr Cys Gly Val Leu Leu Leu Ser Leu Val Ile Thr Leu Tyr Cys
                325                 330                 335
Ala Ala Ala Ile Glu Val Met Tyr Pro Pro Tyr Leu Asp Asn Glu
            340                 345                 350
Lys Ser Asn Gly Thr Ile Ile His Val Lys Gly Lys His Leu Cys Pro
        355                 360                 365
Ser Pro Leu Phe Pro Gly Pro Ser Lys Pro Phe Trp Val Leu Val Val
    370                 375                 380
Val Gly Gly Val Leu Ala Cys Tyr Ser Leu Leu Val Thr Val Ala Phe
385                 390                 395                 400
```

```
Ile Ile Phe Trp Val Arg Ser Lys Arg Ser Arg Leu Leu His Ser Asp
                405                 410                 415
Tyr Met Asn Met Thr Pro Arg Arg Pro Gly Pro Thr Arg Lys His Tyr
            420                 425                 430
Gln Pro Tyr Ala Pro Pro Arg Asp Phe Ala Ala Tyr Arg Ser Arg Val
        435                 440                 445
Lys Phe Ser Arg Ser Ala Asp Ala Pro Ala Tyr Gln Gln Gly Gln Asn
    450                 455                 460
Gln Leu Tyr Asn Glu Leu Asn Leu Gly Arg Arg Glu Glu Tyr Asp Val
465                 470                 475                 480
Leu Asp Lys Arg Arg Gly Arg Asp Pro Glu Met Gly Gly Lys Pro Arg
                485                 490                 495
Arg Lys Asn Pro Gln Glu Gly Leu Tyr Asn Glu Leu Gln Lys Asp Lys
                500                 505                 510
Met Ala Glu Ala Tyr Ser Glu Ile Gly Met Lys Gly Glu Arg Arg Arg
            515                 520                 525
Gly Lys Gly His Asp Gly Leu Tyr Gln Gly Leu Ser Thr Ala Thr Lys
        530                 535                 540
Asp Thr Tyr Asp Ala Leu His Met Gln Ala Leu Pro Pro Arg Arg Val
545                 550                 555                 560
Lys Phe Ser Arg Ser Ala Asp Asp Thr Ala Asn Asn Pro Leu Tyr Lys
                565                 570                 575
Glu Ala Thr Ser Thr Phe Thr Asn Ile Thr Tyr Arg Gly Thr Arg Gly
                580                 585                 590
Arg Asp Pro Glu Met Gly Gly Lys Pro Arg Arg Lys Asn Pro Gln Glu
            595                 600                 605
Gly Leu Tyr Asn Glu Leu Gln Lys Asp Lys Met Ala Glu Ala Tyr Ser
        610                 615                 620
Glu Ile Gly Met Lys Gly Asp Thr Ala Asn Asn Pro Leu Tyr Lys Glu
625                 630                 635                 640
Ala Thr Ser Thr Phe Thr Asn Ile Thr Tyr Arg Gly Thr Ala Leu Pro
                645                 650                 655
Pro Arg Gly Ser Ala Ala Ala
            660
```

<210> SEQ ID NO 21
<211> LENGTH: 489
<212> TYPE: PRT
<213> ORGANISM: Artificial sequence
<220> FEATURE:
<223> OTHER INFORMATION: Artificial 19KAR-T-41bb-cd3dzeta (ITGB3-ITAM2 - ITAM3) sequence

<400> SEQUENCE: 21

```
Met Leu Leu Leu Val Thr Ser Leu Leu Cys Glu Leu Pro His Pro
1               5                   10                  15
Ala Phe Leu Leu Ile Pro Asp Ile Gln Met Thr Gln Thr Thr Ser Ser
            20                  25                  30
Leu Ser Ala Ser Leu Gly Asp Arg Val Thr Ile Ser Cys Arg Ala Ser
        35                  40                  45
Gln Asp Ile Ser Lys Tyr Leu Asn Trp Tyr Gln Gln Lys Pro Asp Gly
    50                  55                  60
Thr Val Lys Leu Leu Ile Tyr His Thr Ser Arg Leu His Ser Gly Val
65                  70                  75                  80
Pro Ser Arg Phe Ser Gly Ser Gly Ser Gly Thr Asp Tyr Ser Leu Thr
                85                  90                  95
```

Ile Ser Asn Leu Glu Gln Glu Asp Ile Ala Thr Tyr Phe Cys Gln Gln
            100                 105                 110

Gly Asn Thr Leu Pro Tyr Thr Phe Gly Gly Gly Thr Lys Leu Glu Ile
            115                 120                 125

Thr Gly Ser Thr Ser Gly Ser Gly Lys Pro Gly Ser Gly Glu Gly Ser
            130                 135                 140

Thr Lys Gly Glu Val Lys Leu Gln Glu Ser Gly Pro Gly Leu Val Ala
145                 150                 155                 160

Pro Ser Gln Ser Leu Ser Val Thr Cys Thr Val Ser Gly Val Ser Leu
                165                 170                 175

Pro Asp Tyr Gly Val Ser Trp Ile Arg Gln Pro Pro Arg Lys Gly Leu
            180                 185                 190

Glu Trp Leu Gly Val Ile Trp Gly Ser Glu Thr Thr Tyr Tyr Asn Ser
            195                 200                 205

Ala Leu Lys Ser Arg Leu Thr Ile Ile Lys Asp Asn Ser Lys Ser Gln
            210                 215                 220

Val Phe Leu Lys Met Asn Ser Leu Gln Thr Asp Asp Thr Ala Ile Tyr
225                 230                 235                 240

Tyr Cys Ala Lys His Tyr Tyr Gly Gly Ser Tyr Ala Met Asp Tyr
                245                 250                 255

Trp Gly Gln Gly Thr Ser Val Thr Val Ser Ser Thr Thr Thr Pro Ala
            260                 265                 270

Pro Arg Pro Pro Thr Pro Ala Pro Thr Ile Ala Ser Gln Pro Leu Ser
            275                 280                 285

Leu Arg Pro Glu Ala Cys Arg Pro Ala Ala Gly Gly Ala Val His Thr
            290                 295                 300

Arg Gly Leu Asp Phe Ala Cys Asp Ile Tyr Ile Trp Ala Pro Leu Ala
305                 310                 315                 320

Gly Thr Cys Gly Val Leu Leu Leu Ser Leu Val Ile Thr Leu Tyr Cys
                325                 330                 335

Lys Arg Gly Arg Lys Lys Leu Leu Tyr Ile Phe Lys Gln Pro Phe Met
            340                 345                 350

Arg Pro Val Gln Thr Thr Gln Glu Glu Asp Gly Cys Ser Cys Arg Phe
            355                 360                 365

Pro Glu Glu Glu Glu Gly Gly Cys Glu Leu Arg Val Lys Phe Ser Arg
            370                 375                 380

Ser Ala Asp Asp Thr Ala Asn Asn Pro Leu Tyr Lys Glu Ala Thr Ser
385                 390                 395                 400

Thr Phe Thr Asn Ile Thr Tyr Arg Gly Thr Arg Gly Arg Asp Pro Glu
                405                 410                 415

Met Gly Gly Lys Pro Arg Arg Lys Asn Pro Gln Glu Gly Leu Tyr Asn
            420                 425                 430

Glu Leu Gln Lys Asp Lys Met Ala Glu Ala Tyr Ser Glu Ile Gly Met
            435                 440                 445

Lys Gly Glu Arg Arg Arg Gly Lys Gly His Asp Gly Leu Tyr Gln Gly
            450                 455                 460

Leu Ser Thr Ala Thr Lys Asp Thr Tyr Asp Ala Leu His Met Gln Ala
465                 470                 475                 480

Leu Pro Pro Arg Gly Ser Ala Ala Ala
                485

<210> SEQ ID NO 22
<211> LENGTH: 490

```
<212> TYPE: PRT
<213> ORGANISM: Artificial sequence
<220> FEATURE:
<223> OTHER INFORMATION: Artificial 19KAR-T-41bb-cd3dzeta (ITAM1-ITGB3 -
      ITAM3) sequence

<400> SEQUENCE: 22
```

Met Leu Leu Leu Val Thr Ser Leu Leu Leu Cys Glu Leu Pro His Pro
1               5                   10                  15

Ala Phe Leu Leu Ile Pro Asp Ile Gln Met Thr Gln Thr Thr Ser Ser
            20                  25                  30

Leu Ser Ala Ser Leu Gly Asp Arg Val Thr Ile Ser Cys Arg Ala Ser
        35                  40                  45

Gln Asp Ile Ser Lys Tyr Leu Asn Trp Tyr Gln Gln Lys Pro Asp Gly
    50                  55                  60

Thr Val Lys Leu Leu Ile Tyr His Thr Ser Arg Leu His Ser Gly Val
65                  70                  75                  80

Pro Ser Arg Phe Ser Gly Ser Gly Ser Gly Thr Asp Tyr Ser Leu Thr
                85                  90                  95

Ile Ser Asn Leu Glu Gln Glu Asp Ile Ala Thr Tyr Phe Cys Gln Gln
            100                 105                 110

Gly Asn Thr Leu Pro Tyr Thr Phe Gly Gly Gly Thr Lys Leu Glu Ile
            115                 120                 125

Thr Gly Ser Thr Ser Gly Ser Gly Lys Pro Gly Ser Gly Glu Gly Ser
    130                 135                 140

Thr Lys Gly Glu Val Lys Leu Gln Glu Ser Gly Pro Gly Leu Val Ala
145                 150                 155                 160

Pro Ser Gln Ser Leu Ser Val Thr Cys Thr Val Ser Gly Val Ser Leu
                165                 170                 175

Pro Asp Tyr Gly Val Ser Trp Ile Arg Gln Pro Pro Arg Lys Gly Leu
            180                 185                 190

Glu Trp Leu Gly Val Ile Trp Gly Ser Glu Thr Thr Tyr Tyr Asn Ser
            195                 200                 205

Ala Leu Lys Ser Arg Leu Thr Ile Ile Lys Asp Asn Ser Lys Ser Gln
    210                 215                 220

Val Phe Leu Lys Met Asn Ser Leu Gln Thr Asp Asp Thr Ala Ile Tyr
225                 230                 235                 240

Tyr Cys Ala Lys His Tyr Tyr Tyr Gly Gly Ser Tyr Ala Met Asp Tyr
                245                 250                 255

Trp Gly Gln Gly Thr Ser Val Thr Val Ser Ser Thr Thr Thr Pro Ala
            260                 265                 270

Pro Arg Pro Pro Thr Pro Ala Pro Thr Ile Ala Ser Gln Pro Leu Ser
        275                 280                 285

Leu Arg Pro Glu Ala Cys Arg Pro Ala Ala Gly Gly Ala Val His Thr
    290                 295                 300

Arg Gly Leu Asp Phe Ala Cys Asp Ile Tyr Ile Trp Ala Pro Leu Ala
305                 310                 315                 320

Gly Thr Cys Gly Val Leu Leu Leu Ser Leu Val Ile Thr Leu Tyr Cys
                325                 330                 335

Lys Arg Gly Arg Lys Lys Leu Leu Tyr Ile Phe Lys Gln Pro Phe Met
            340                 345                 350

Arg Pro Val Gln Thr Thr Gln Glu Glu Asp Gly Cys Ser Cys Arg Phe
        355                 360                 365

Pro Glu Glu Glu Glu Gly Gly Cys Glu Leu Arg Val Lys Phe Ser Arg
    370                 375                 380

```
Ser Ala Asp Ala Pro Ala Tyr Lys Gln Gly Gln Asn Gln Leu Tyr Asn
385                 390                 395                 400

Glu Leu Asn Leu Gly Arg Arg Glu Glu Tyr Asp Val Leu Asp Lys Arg
            405                 410                 415

Arg Gly Arg Asp Pro Glu Met Gly Gly Lys Asp Thr Ala Asn Asn Pro
        420                 425                 430

Leu Tyr Lys Glu Ala Thr Ser Thr Phe Thr Asn Ile Thr Tyr Arg Gly
    435                 440                 445

Thr Lys Gly Glu Arg Arg Gly Lys Gly His Asp Gly Leu Tyr Gln
450                 455                 460

Gly Leu Ser Thr Ala Thr Lys Asp Thr Tyr Asp Ala Leu His Met Gln
465                 470                 475                 480

Ala Leu Pro Pro Arg Gly Ser Ala Ala Ala
                485                 490
```

<210> SEQ ID NO 23
<211> LENGTH: 489
<212> TYPE: PRT
<213> ORGANISM: Artificial sequence
<220> FEATURE:
<223> OTHER INFORMATION: Artificial 19KAR-T-41bb-cd3dzeta (ITAM1-ITAM2 - ITGB3) sequence

<400> SEQUENCE: 23

```
Met Leu Leu Leu Val Thr Ser Leu Leu Leu Cys Glu Leu Pro His Pro
1               5                   10                  15

Ala Phe Leu Leu Ile Pro Asp Ile Gln Met Thr Gln Thr Thr Ser Ser
            20                  25                  30

Leu Ser Ala Ser Leu Gly Asp Arg Val Thr Ile Ser Cys Arg Ala Ser
        35                  40                  45

Gln Asp Ile Ser Lys Tyr Leu Asn Trp Tyr Gln Gln Lys Pro Asp Gly
    50                  55                  60

Thr Val Lys Leu Leu Ile Tyr His Thr Ser Arg Leu His Ser Gly Val
65                  70                  75                  80

Pro Ser Arg Phe Ser Gly Ser Gly Ser Gly Thr Asp Tyr Ser Leu Thr
                85                  90                  95

Ile Ser Asn Leu Glu Gln Glu Asp Ile Ala Thr Tyr Phe Cys Gln Gln
            100                 105                 110

Gly Asn Thr Leu Pro Tyr Thr Phe Gly Gly Gly Thr Lys Leu Glu Ile
        115                 120                 125

Thr Gly Ser Thr Ser Gly Ser Gly Lys Pro Gly Ser Gly Glu Gly Ser
    130                 135                 140

Thr Lys Gly Glu Val Lys Leu Gln Glu Ser Gly Pro Gly Leu Val Ala
145                 150                 155                 160

Pro Ser Gln Ser Leu Ser Val Thr Cys Thr Val Ser Gly Val Ser Leu
                165                 170                 175

Pro Asp Tyr Gly Val Ser Trp Ile Arg Gln Pro Pro Arg Lys Gly Leu
            180                 185                 190

Glu Trp Leu Gly Val Ile Trp Gly Ser Glu Thr Thr Tyr Tyr Asn Ser
        195                 200                 205

Ala Leu Lys Ser Arg Leu Thr Ile Ile Lys Asp Asn Ser Lys Ser Gln
    210                 215                 220

Val Phe Leu Lys Met Asn Ser Leu Gln Thr Asp Asp Thr Ala Ile Tyr
225                 230                 235                 240

Tyr Cys Ala Lys His Tyr Tyr Tyr Gly Gly Ser Tyr Ala Met Asp Tyr
```

```
                    245                 250                 255
Trp Gly Gln Gly Thr Ser Val Thr Val Ser Ser Thr Thr Pro Ala
            260                 265                 270

Pro Arg Pro Pro Thr Pro Ala Pro Thr Ile Ala Ser Gln Pro Leu Ser
    275                 280                 285

Leu Arg Pro Glu Ala Cys Arg Pro Ala Ala Gly Gly Ala Val His Thr
290                 295                 300

Arg Gly Leu Asp Phe Ala Cys Asp Ile Tyr Ile Trp Ala Pro Leu Ala
305                 310                 315                 320

Gly Thr Cys Gly Val Leu Leu Leu Ser Leu Val Ile Thr Leu Tyr Cys
                325                 330                 335

Lys Arg Gly Arg Lys Lys Leu Leu Tyr Ile Phe Lys Gln Pro Phe Met
            340                 345                 350

Arg Pro Val Gln Thr Thr Gln Glu Glu Asp Gly Cys Ser Cys Arg Phe
        355                 360                 365

Pro Glu Glu Glu Glu Gly Gly Cys Glu Leu Arg Val Lys Phe Ser Arg
    370                 375                 380

Ser Ala Asp Ala Pro Ala Tyr Lys Gln Gly Gln Asn Gln Leu Tyr Asn
385                 390                 395                 400

Glu Leu Asn Leu Gly Arg Arg Glu Glu Tyr Asp Val Leu Asp Lys Arg
                405                 410                 415

Arg Gly Arg Asp Pro Glu Met Gly Gly Lys Pro Arg Arg Lys Asn Pro
            420                 425                 430

Gln Glu Gly Leu Tyr Asn Glu Leu Gln Lys Asp Lys Met Ala Glu Ala
        435                 440                 445

Tyr Ser Glu Ile Gly Met Lys Gly Asp Thr Ala Asn Asn Pro Leu Tyr
    450                 455                 460

Lys Glu Ala Thr Ser Thr Phe Thr Asn Ile Thr Tyr Arg Gly Thr Ala
465                 470                 475                 480

Leu Pro Pro Arg Gly Ser Ala Ala Ala
                485

<210> SEQ ID NO 24
<211> LENGTH: 484
<212> TYPE: PRT
<213> ORGANISM: Artificial sequence
<220> FEATURE:
<223> OTHER INFORMATION: Artificial 19KAR-T-41bb-cd3dzeta (ITGB3-ITGB3 -
      ITAM3) sequence

<400> SEQUENCE: 24

Met Leu Leu Leu Val Thr Ser Leu Leu Leu Cys Glu Leu Pro His Pro
1               5                   10                  15

Ala Phe Leu Leu Ile Pro Asp Ile Gln Met Thr Gln Thr Thr Ser Ser
            20                  25                  30

Leu Ser Ala Ser Leu Gly Asp Arg Val Thr Ile Ser Cys Arg Ala Ser
        35                  40                  45

Gln Asp Ile Ser Lys Tyr Leu Asn Trp Tyr Gln Gln Lys Pro Asp Gly
    50                  55                  60

Thr Val Lys Leu Leu Ile Tyr His Thr Ser Arg Leu His Ser Gly Val
65                  70                  75                  80

Pro Ser Arg Phe Ser Gly Ser Gly Ser Gly Thr Asp Tyr Ser Leu Thr
                85                  90                  95

Ile Ser Asn Leu Glu Gln Glu Asp Ile Ala Thr Tyr Phe Cys Gln Gln
            100                 105                 110
```

Gly Asn Thr Leu Pro Tyr Thr Phe Gly Gly Gly Thr Lys Leu Glu Ile
115                 120                 125

Thr Gly Ser Thr Ser Gly Ser Gly Lys Pro Ser Gly Glu Gly Ser
130                 135                 140

Thr Lys Gly Glu Val Lys Leu Gln Glu Ser Gly Pro Gly Leu Val Ala
145                 150                 155                 160

Pro Ser Gln Ser Leu Ser Val Thr Cys Thr Val Ser Gly Val Ser Leu
                165                 170                 175

Pro Asp Tyr Gly Val Ser Trp Ile Arg Gln Pro Pro Arg Lys Gly Leu
            180                 185                 190

Glu Trp Leu Gly Val Ile Trp Gly Ser Glu Thr Thr Tyr Tyr Asn Ser
        195                 200                 205

Ala Leu Lys Ser Arg Leu Thr Ile Ile Lys Asp Asn Ser Lys Ser Gln
210                 215                 220

Val Phe Leu Lys Met Asn Ser Leu Gln Thr Asp Asp Thr Ala Ile Tyr
225                 230                 235                 240

Tyr Cys Ala Lys His Tyr Tyr Gly Gly Ser Tyr Ala Met Asp Tyr
                245                 250                 255

Trp Gly Gln Gly Thr Ser Val Thr Val Ser Ser Thr Thr Thr Pro Ala
            260                 265                 270

Pro Arg Pro Pro Thr Pro Ala Pro Thr Ile Ala Ser Gln Pro Leu Ser
    275                 280                 285

Leu Arg Pro Glu Ala Cys Arg Pro Ala Ala Gly Gly Ala Val His Thr
    290                 295                 300

Arg Gly Leu Asp Phe Ala Cys Asp Ile Tyr Ile Trp Ala Pro Leu Ala
305                 310                 315                 320

Gly Thr Cys Gly Val Leu Leu Leu Ser Leu Val Ile Thr Leu Tyr Cys
                325                 330                 335

Lys Arg Gly Arg Lys Lys Leu Leu Tyr Ile Phe Lys Gln Pro Phe Met
                340                 345                 350

Arg Pro Val Gln Thr Thr Gln Glu Glu Asp Gly Cys Ser Cys Arg Phe
            355                 360                 365

Pro Glu Glu Glu Glu Gly Gly Cys Glu Leu Arg Val Lys Phe Ser Arg
    370                 375                 380

Ser Ala Asp Asp Thr Ala Asn Asn Pro Leu Tyr Lys Glu Ala Thr Ser
385                 390                 395                 400

Thr Phe Thr Asn Ile Thr Tyr Arg Gly Thr Arg Gly Arg Asp Pro Glu
                405                 410                 415

Met Gly Gly Lys Asp Thr Ala Asn Asn Pro Leu Tyr Lys Glu Ala Thr
                420                 425                 430

Ser Thr Phe Thr Asn Ile Thr Tyr Arg Gly Thr Lys Gly Glu Arg Arg
            435                 440                 445

Arg Gly Lys Gly His Asp Gly Leu Tyr Gln Gly Leu Ser Thr Ala Thr
    450                 455                 460

Lys Asp Thr Tyr Asp Ala Leu His Met Gln Ala Leu Pro Pro Arg Gly
465                 470                 475                 480

Ser Ala Ala Ala

<210> SEQ ID NO 25
<211> LENGTH: 484
<212> TYPE: PRT
<213> ORGANISM: Artificial sequence
<220> FEATURE:
<223> OTHER INFORMATION: Artificial 19KAR-T-41bb-cd3dzeta (ITAM1-ITGB3 -
    ITGB3) sequence

<400> SEQUENCE: 25

```
Met Leu Leu Leu Val Thr Ser Leu Leu Cys Glu Leu Pro His Pro
1               5                   10                  15

Ala Phe Leu Leu Ile Pro Asp Ile Gln Met Thr Gln Thr Ser Ser
            20                  25                  30

Leu Ser Ala Ser Leu Gly Asp Arg Val Thr Ile Ser Cys Arg Ala Ser
            35                  40                      45

Gln Asp Ile Ser Lys Tyr Leu Asn Trp Tyr Gln Gln Lys Pro Asp Gly
    50                  55                      60

Thr Val Lys Leu Leu Ile Tyr His Thr Ser Arg Leu His Ser Gly Val
65                  70                  75                  80

Pro Ser Arg Phe Ser Gly Ser Gly Ser Gly Thr Asp Tyr Ser Leu Thr
                85                  90                  95

Ile Ser Asn Leu Glu Gln Glu Asp Ile Ala Thr Tyr Phe Cys Gln Gln
                100                 105                 110

Gly Asn Thr Leu Pro Tyr Thr Phe Gly Gly Gly Thr Lys Leu Glu Ile
                115                 120                 125

Thr Gly Ser Thr Ser Gly Ser Gly Lys Pro Gly Ser Gly Glu Gly Ser
130                 135                 140

Thr Lys Gly Glu Val Lys Leu Gln Glu Ser Gly Pro Gly Leu Val Ala
145                 150                 155                 160

Pro Ser Gln Ser Leu Ser Val Thr Cys Thr Val Ser Gly Val Ser Leu
                165                 170                 175

Pro Asp Tyr Gly Val Ser Trp Ile Arg Gln Pro Pro Arg Lys Gly Leu
                180                 185                 190

Glu Trp Leu Gly Val Ile Trp Gly Ser Glu Thr Thr Tyr Tyr Asn Ser
                195                 200                 205

Ala Leu Lys Ser Arg Leu Thr Ile Ile Lys Asp Asn Ser Lys Ser Gln
210                 215                 220

Val Phe Leu Lys Met Asn Ser Leu Gln Thr Asp Asp Thr Ala Ile Tyr
225                 230                 235                 240

Tyr Cys Ala Lys His Tyr Tyr Tyr Gly Gly Ser Tyr Ala Met Asp Tyr
                245                 250                 255

Trp Gly Gln Gly Thr Ser Val Thr Val Ser Ser Thr Thr Thr Pro Ala
                260                 265                 270

Pro Arg Pro Pro Thr Pro Ala Pro Thr Ile Ala Ser Gln Pro Leu Ser
                275                 280                 285

Leu Arg Pro Glu Ala Cys Arg Pro Ala Ala Gly Gly Ala Val His Thr
                290                 295                 300

Arg Gly Leu Asp Phe Ala Cys Asp Ile Tyr Ile Trp Ala Pro Leu Ala
305                 310                 315                 320

Gly Thr Cys Gly Val Leu Leu Leu Ser Leu Val Ile Thr Leu Tyr Cys
                325                 330                 335

Lys Arg Gly Arg Lys Lys Leu Leu Tyr Ile Phe Lys Gln Pro Phe Met
                340                 345                 350

Arg Pro Val Gln Thr Thr Gln Glu Glu Asp Gly Cys Ser Cys Arg Phe
                355                 360                 365

Pro Glu Glu Glu Glu Gly Gly Cys Glu Leu Arg Val Lys Phe Ser Arg
                370                 375                 380

Ser Ala Asp Ala Pro Ala Tyr Lys Gln Gly Gln Asn Gln Leu Tyr Asn
385                 390                 395                 400

Glu Leu Asn Leu Gly Arg Arg Glu Glu Tyr Asp Val Leu Asp Lys Arg
```

```
                         405                 410                 415
Arg Gly Arg Asp Pro Glu Met Gly Gly Lys Asp Thr Ala Asn Asn Pro
            420                 425                 430

Leu Tyr Lys Glu Ala Thr Ser Thr Phe Thr Asn Ile Thr Tyr Arg Gly
            435                 440                 445

Thr Lys Gly Asp Thr Ala Asn Asn Pro Leu Tyr Lys Glu Ala Thr Ser
            450                 455                 460

Thr Phe Thr Asn Ile Thr Tyr Arg Gly Thr Ala Leu Pro Pro Arg Gly
465                 470                 475                 480

Ser Ala Ala Ala

<210> SEQ ID NO 26
<211> LENGTH: 483
<212> TYPE: PRT
<213> ORGANISM: Artificial sequence
<220> FEATURE:
<223> OTHER INFORMATION: Artificial 19KAR-T-41bb-cd3dzeta (ITGB3-ITAM2 -
      ITGB3) sequence

<400> SEQUENCE: 26

Met Leu Leu Leu Val Thr Ser Leu Leu Leu Cys Glu Leu Pro His Pro
1               5                   10                  15

Ala Phe Leu Leu Ile Pro Asp Ile Gln Met Thr Gln Thr Thr Ser Ser
            20                  25                  30

Leu Ser Ala Ser Leu Gly Asp Arg Val Thr Ile Ser Cys Arg Ala Ser
        35                  40                  45

Gln Asp Ile Ser Lys Tyr Leu Asn Trp Tyr Gln Gln Lys Pro Asp Gly
    50                  55                  60

Thr Val Lys Leu Leu Ile Tyr His Thr Ser Arg Leu His Ser Gly Val
65                  70                  75                  80

Pro Ser Arg Phe Ser Gly Ser Gly Ser Gly Thr Asp Tyr Ser Leu Thr
                85                  90                  95

Ile Ser Asn Leu Glu Gln Glu Asp Ile Ala Thr Tyr Phe Cys Gln Gln
            100                 105                 110

Gly Asn Thr Leu Pro Tyr Thr Phe Gly Gly Gly Thr Lys Leu Glu Ile
        115                 120                 125

Thr Gly Ser Thr Ser Gly Ser Gly Lys Pro Gly Ser Gly Glu Gly Ser
    130                 135                 140

Thr Lys Gly Glu Val Lys Leu Gln Glu Ser Gly Pro Gly Leu Val Ala
145                 150                 155                 160

Pro Ser Gln Ser Leu Ser Val Thr Cys Thr Val Ser Gly Val Ser Leu
                165                 170                 175

Pro Asp Tyr Gly Val Ser Trp Ile Arg Gln Pro Pro Arg Lys Gly Leu
            180                 185                 190

Glu Trp Leu Gly Val Ile Trp Gly Ser Glu Thr Thr Tyr Tyr Asn Ser
        195                 200                 205

Ala Leu Lys Ser Arg Leu Thr Ile Ile Lys Asp Asn Ser Lys Ser Gln
    210                 215                 220

Val Phe Leu Lys Met Asn Ser Leu Gln Thr Asp Asp Thr Ala Ile Tyr
225                 230                 235                 240

Tyr Cys Ala Lys His Tyr Tyr Tyr Gly Gly Ser Tyr Ala Met Asp Tyr
                245                 250                 255

Trp Gly Gln Gly Thr Ser Val Thr Val Ser Ser Thr Thr Thr Pro Ala
            260                 265                 270

Pro Arg Pro Pro Thr Pro Ala Pro Thr Ile Ala Ser Gln Pro Leu Ser
```

```
                275                 280                 285
Leu Arg Pro Glu Ala Cys Arg Pro Ala Gly Gly Ala Val His Thr
290                 295                 300
Arg Gly Leu Asp Phe Ala Cys Asp Ile Tyr Ile Trp Ala Pro Leu Ala
305                 310                 315                 320
Gly Thr Cys Gly Val Leu Leu Leu Ser Leu Val Ile Thr Leu Tyr Cys
                325                 330                 335
Lys Arg Gly Arg Lys Lys Leu Leu Tyr Ile Phe Lys Gln Pro Phe Met
                340                 345                 350
Arg Pro Val Gln Thr Thr Gln Glu Glu Asp Gly Cys Ser Cys Arg Phe
                355                 360                 365
Pro Glu Glu Glu Glu Gly Gly Cys Glu Leu Arg Val Lys Phe Ser Arg
370                 375                 380
Ser Ala Asp Asp Thr Ala Asn Asn Pro Leu Tyr Lys Glu Ala Thr Ser
385                 390                 395                 400
Thr Phe Thr Asn Ile Thr Tyr Arg Gly Thr Arg Gly Arg Asp Pro Glu
                405                 410                 415
Met Gly Gly Lys Pro Arg Arg Lys Asn Pro Gln Glu Gly Leu Tyr Asn
                420                 425                 430
Glu Leu Gln Lys Asp Lys Met Ala Glu Ala Tyr Ser Glu Ile Gly Met
                435                 440                 445
Lys Gly Asp Thr Ala Asn Asn Pro Leu Tyr Lys Glu Ala Thr Ser Thr
                450                 455                 460
Phe Thr Asn Ile Thr Tyr Arg Gly Thr Ala Leu Pro Pro Arg Gly Ser
465                 470                 475                 480

Ala Ala Ala

<210> SEQ ID NO 27
<211> LENGTH: 112
<212> TYPE: PRT
<213> ORGANISM: Artificial sequence
<220> FEATURE:
<223> OTHER INFORMATION: Artificial CD3 zeta sequence

<400> SEQUENCE: 27

Arg Val Lys Phe Ser Arg Ser Ala Asp Ala Pro Ala Tyr Lys Gln Gly
1               5                   10                  15
Gln Asn Gln Leu Tyr Asn Glu Leu Asn Leu Gly Arg Arg Glu Glu Tyr
                20                  25                  30
Asp Val Leu Asp Lys Arg Arg Gly Arg Asp Pro Glu Met Gly Gly Lys
                35                  40                  45
Pro Arg Arg Lys Asn Pro Gln Glu Gly Leu Tyr Asn Glu Leu Gln Lys
                50                  55                  60
Asp Lys Met Ala Glu Ala Tyr Ser Glu Ile Gly Met Lys Gly Glu Arg
65                  70                  75                  80
Arg Arg Gly Lys Gly His Asp Gly Leu Tyr Gln Gly Leu Ser Thr Ala
                85                  90                  95
Thr Lys Asp Thr Tyr Asp Ala Leu His Met Gln Ala Leu Pro Pro Arg
                100                 105                 110

<210> SEQ ID NO 28
<211> LENGTH: 45
<212> TYPE: PRT
<213> ORGANISM: Artificial sequence
<220> FEATURE:
<223> OTHER INFORMATION: Artificial CD8 hinge sequence
```

```
<400> SEQUENCE: 28

Thr Thr Thr Pro Ala Pro Arg Pro Pro Thr Pro Ala Pro Thr Ile Ala
1               5                   10                  15

Ser Gln Pro Leu Ser Leu Arg Pro Glu Ala Cys Arg Pro Ala Ala Gly
            20                  25                  30

Gly Ala Val His Thr Arg Gly Leu Asp Phe Ala Cys Asp
        35                  40                  45

<210> SEQ ID NO 29
<211> LENGTH: 22
<212> TYPE: PRT
<213> ORGANISM: Artificial sequence
<220> FEATURE:
<223> OTHER INFORMATION: Artificial sequence of a leader peptide

<400> SEQUENCE: 29

Met Leu Leu Leu Val Thr Ser Leu Leu Leu Cys Glu Leu Pro His Pro
1               5                   10                  15

Ala Phe Leu Leu Ile Pro
            20

<210> SEQ ID NO 30
<211> LENGTH: 107
<212> TYPE: PRT
<213> ORGANISM: Artificial sequence
<220> FEATURE:
<223> OTHER INFORMATION: Artificial sequence of the variable light chain
      domain (VL) of the antigen-binding domain, which is specific to
      the CD19 tumor antigen

<400> SEQUENCE: 30

Asp Ile Gln Met Thr Gln Thr Thr Ser Ser Leu Ser Ala Ser Leu Gly
1               5                   10                  15

Asp Arg Val Thr Ile Ser Cys Arg Ala Ser Gln Asp Ile Ser Lys Tyr
            20                  25                  30

Leu Asn Trp Tyr Gln Gln Lys Pro Asp Gly Thr Val Lys Leu Leu Ile
        35                  40                  45

Tyr His Thr Ser Arg Leu His Ser Gly Val Pro Ser Arg Phe Ser Gly
    50                  55                  60

Ser Gly Ser Gly Thr Asp Tyr Ser Leu Thr Ile Ser Asn Leu Glu Gln
65                  70                  75                  80

Glu Asp Ile Ala Thr Tyr Phe Cys Gln Gln Gly Asn Thr Leu Pro Tyr
                85                  90                  95

Thr Phe Gly Gly Gly Thr Lys Leu Glu Ile Thr
            100                 105

<210> SEQ ID NO 31
<211> LENGTH: 120
<212> TYPE: PRT
<213> ORGANISM: Artificial sequence
<220> FEATURE:
<223> OTHER INFORMATION: Artificial sequence of the variable domain of
      the heavy chain (VH) antigen-binding domain, which is specific to
      the CD19 tumor antigen

<400> SEQUENCE: 31

Glu Val Lys Leu Gln Glu Ser Gly Pro Gly Leu Val Ala Pro Ser Gln
1               5                   10                  15

Ser Leu Ser Val Thr Cys Thr Val Ser Gly Val Ser Leu Pro Asp Tyr
            20                  25                  30

Gly Val Ser Trp Ile Arg Gln Pro Pro Arg Lys Gly Leu Glu Trp Leu
```

```
                35                  40                  45
Gly Val Ile Trp Gly Ser Glu Thr Thr Tyr Tyr Asn Ser Ala Leu Lys
             50                  55                  60

Ser Arg Leu Thr Ile Ile Lys Asp Asn Ser Lys Ser Gln Val Phe Leu
 65                  70                  75                  80

Lys Met Asn Ser Leu Gln Thr Asp Asp Thr Ala Ile Tyr Tyr Cys Ala
                 85                  90                  95

Lys His Tyr Tyr Tyr Gly Gly Ser Tyr Ala Met Asp Tyr Trp Gly Gln
                100                 105                 110

Gly Thr Ser Val Thr Val Ser Ser
            115                 120

<210> SEQ ID NO 32
<211> LENGTH: 18
<212> TYPE: PRT
<213> ORGANISM: Artificial sequence
<220> FEATURE:
<223> OTHER INFORMATION: Artificial linker sequence

<400> SEQUENCE: 32

Gly Ser Thr Ser Gly Ser Gly Lys Pro Gly Ser Gly Glu Gly Ser Thr
 1               5                  10                  15

Lys Gly

<210> SEQ ID NO 33
<211> LENGTH: 18
<212> TYPE: PRT
<213> ORGANISM: Artificial sequence
<220> FEATURE:
<223> OTHER INFORMATION: Artificial T2A sequence

<400> SEQUENCE: 33

Glu Gly Arg Gly Ser Leu Leu Thr Cys Gly Asp Val Glu Glu Asn Pro
 1               5                  10                  15

Gly Pro

<210> SEQ ID NO 34
<211> LENGTH: 239
<212> TYPE: PRT
<213> ORGANISM: Artificial sequence
<220> FEATURE:
<223> OTHER INFORMATION: Artificial eGFP sequence

<400> SEQUENCE: 34

Met Val Ser Lys Gly Glu Glu Leu Phe Thr Gly Val Val Pro Ile Leu
 1               5                  10                  15

Val Glu Leu Asp Gly Asp Val Asn Gly His Lys Phe Ser Val Ser Gly
                 20                  25                  30

Glu Gly Glu Gly Asp Ala Thr Tyr Gly Lys Leu Thr Leu Lys Phe Ile
                 35                  40                  45

Cys Thr Thr Gly Lys Leu Pro Val Pro Trp Pro Thr Leu Val Thr Thr
             50                  55                  60

Leu Thr Tyr Gly Val Gln Cys Phe Ser Arg Tyr Pro Asp His Met Lys
 65                  70                  75                  80

Gln His Asp Phe Phe Lys Ser Ala Met Pro Glu Gly Tyr Val Gln Glu
                 85                  90                  95

Arg Thr Ile Phe Phe Lys Asp Asp Gly Asn Tyr Lys Thr Arg Ala Glu
                100                 105                 110

Val Lys Phe Glu Gly Asp Thr Leu Val Asn Arg Ile Glu Leu Lys Gly
```

```
                  115                 120                 125
Ile Asp Phe Lys Glu Asp Gly Asn Ile Leu Gly His Lys Leu Glu Tyr
    130                 135                 140

Asn Tyr Asn Ser His Asn Val Tyr Ile Met Ala Asp Lys Gln Lys Asn
145                 150                 155                 160

Gly Ile Lys Val Asn Phe Lys Ile Arg His Asn Ile Glu Asp Gly Ser
                165                 170                 175

Val Gln Leu Ala Asp His Tyr Gln Gln Asn Thr Pro Ile Gly Asp Gly
            180                 185                 190

Pro Val Leu Leu Pro Asp Asn His Tyr Leu Ser Thr Gln Ser Ala Leu
        195                 200                 205

Ser Lys Asp Pro Asn Glu Lys Arg Asp His Met Val Leu Leu Glu Phe
    210                 215                 220

Val Thr Ala Ala Gly Ile Thr Leu Gly Met Asp Glu Leu Tyr Lys
225                 230                 235

<210> SEQ ID NO 35
<211> LENGTH: 45
<212> TYPE: PRT
<213> ORGANISM: Artificial sequence
<220> FEATURE:
<223> OTHER INFORMATION: Artificial sequence of the CD8 hinge domain

<400> SEQUENCE: 35

Thr Thr Thr Pro Ala Pro Arg Pro Pro Thr Pro Ala Pro Thr Ile Ala
1               5                   10                  15

Ser Gln Pro Leu Ser Leu Arg Pro Glu Ala Cys Arg Pro Ala Ala Gly
            20                  25                  30

Gly Ala Val His Thr Arg Gly Leu Asp Phe Ala Cys Asp
            35                  40                  45
```

The invention claimed is:

1. An isolated alternative intracellular signaling domain of a chimeric antigen receptor (CAR), wherein immunoreceptor tyrosine-based activation motif ITAM3 is substituted with the amino acid sequence of integrin beta 3 (ITGB3).

2. The alternative intracellular signaling domain of the chimeric antigen receptor (CAR) as claimed in claim 1, comprising: the amino acid sequence as set forth in SEQ ID NO: 5.

3. An isolated nucleic acid that encodes the alternative intracellular signaling domain as claimed in claim 1.

4. An isolated chimeric antigen receptor (CAR) comprising the alternative intracellular signaling domain as claimed in claim 1.

5. The isolated chimeric antigen receptor (CAR) as claimed in claim 4, comprising:
   a) an antigen-binding domain that is specific for a tumor antigen;
   b) a transmembrane domain;
   c) a costimulatory domain; and
   d) an alternative intracellular signaling domain of a chimeric antigen receptor (CAR), wherein immunoreceptor tyrosine-based activation motif 3 (ITAM3) is substituted with the amino acid sequence of integrin beta 3 (ITGB3).

6. The isolated chimeric antigen receptor (CAR) as claimed in claim 5, wherein the antigen-binding domain that is specific for the tumor antigen is Fab or scFv.

7. The isolated chimeric antigen receptor (CAR) as claimed in claim 5, wherein the antigen-binding domain is specific for the tumor antigen selected from the group consisting of: CD19, CD20, CD123 and BCMA.

8. The isolated chimeric antigen receptor (CAR) as claimed in claim 4, further comprising a leader sequence.

9. The isolated chimeric antigen receptor (CAR) as claimed in claim 4, which comprises an amino acid sequence as set forth in SEQ ID NO: 17.

10. An isolated nucleic acid, which encodes the isolated chimeric antigen receptor (CAR) as claimed in claim 4.

11. An expression vector comprising the nucleic acid as claimed in claim 10.

12. The vector as claimed in claim 11, selected from a group consisting of DNA, RNA, plasmid, lentiviral vector, adeno-associated viral vector, adenoviral vector, and retroviral vector.

13. The vector as claimed in claim 12, further comprising a promoter.

14. The vector as claimed in claim 12, the vector being an in vitro transcribed vector.

15. The vector as claimed in claim 12, wherein the nucleic acid sequence further comprises a poly(A) sequence.

16. The vector as claimed in claim 12, wherein the nucleic acid sequence further comprises 3'UTR.

17. A method for producing a genetically modified cell that comprises a chimeric antigen receptor (CAR) comprising the alternative intracellular signaling domain, the method comprising transformation of the cell by the vector as claimed in claim 12.

18. A genetically modified cell comprising a chimeric antigen receptor (CAR) comprising the alternative intracellular signaling domain, said genetically modified cell being produced using the method as claimed in claim 17.

19. The cell as claimed in claim 18, wherein the cell is:
a T-lymphocyte;
a CD8+ T cell; or
an NK cell.

20. The cell as claimed in claim 18, which is used as a medicinal agent.

21. The cell as claimed in claim 20, which is used as a medicinal agent for tumor diseases.

22. The cell as claimed in claim 21, which is used as a medicinal agent for diseases, wherein the tumor is cancer.

* * * * *